(12) United States Patent
Sell et al.

(10) Patent No.: US 8,415,492 B2
(45) Date of Patent: Apr. 9, 2013

(54) METALLOCENE COMPOUNDS, CATALYSTS COMPRISING THEM, PROCESS FOR PRODUCING AN OLEFIN POLYMER BY USE OF THE CATALYSTS, AND OLEFIN HOMO- AND COPOLYMERS

(75) Inventors: Thorsten Sell, Worms (DE); Andreas Winter, Neuleininger (DE); Matthew Grant Thorn, Baton Rouge, LA (US); Anita Dimeska, Bad Durkheim (DE); Franz Langhauser, Ruppertsberg (DE)

(73) Assignee: Lummus Novolen Technology GmbH, Mannheim (DE)

( * ) Notice: Subject to any disclaimer, the term of this patent is extended or adjusted under 35 U.S.C. 154(b) by 0 days.

(21) Appl. No.: 13/107,594

(22) Filed: May 13, 2011

(65) Prior Publication Data

US 2011/0230630 A1 Sep. 22, 2011

Related U.S. Application Data

(63) Continuation of application No. PCT/US2008/014144, filed on Dec. 31, 2008, and a continuation-in-part of application No. 12/739,078, filed as application No. PCT/US2007/022614 on Oct. 25, 2007, now Pat. No. 8,299,287.

(51) Int. Cl.
C07F 17/00 (2006.01)
C08F 4/6592 (2006.01)
B01J 31/22 (2006.01)

(52) U.S. Cl. .......... 556/53; 502/103; 502/152; 526/160; 526/165; 526/348; 526/943

(58) Field of Classification Search .................. 556/53; 502/103, 152; 526/160, 165, 348, 943
See application file for complete search history.

(56) References Cited

U.S. PATENT DOCUMENTS

| | | | |
|---|---|---|---|
| 5,449,650 A | 9/1995 | Sugano et al. | |
| 6,107,230 A | 8/2000 | McDaniel et al. | |
| 6,121,182 A | 9/2000 | Okumura et al. | |
| 6,124,231 A | 9/2000 | Fritze et al. | |
| 6,255,531 B1 | 7/2001 | Fritz et al. | |
| 6,265,339 B1 | 7/2001 | Bidell et al. | |
| 6,271,164 B1 | 8/2001 | Fritze et al. | |
| 6,329,313 B1 | 12/2001 | Fritze et al. | |
| 6,350,829 B1 | 2/2002 | Lynch et al. | |
| 6,355,594 B1 | 3/2002 | McDaniel et al. | |
| 6,417,302 B1 | 7/2002 | Bohnen | |
| 6,444,603 B1 | 9/2002 | Tohi et al. | |
| 6,472,474 B2 | 10/2002 | Burkhardt et al. | |
| 6,482,902 B1 | 11/2002 | Bohnen et al. | |
| 6,492,292 B2 | 12/2002 | Wu et al. | |
| 6,589,905 B1 | 7/2003 | Fischer et al. | |
| 7,109,278 B2 | 9/2006 | Okumura et al. | |
| 7,122,498 B2 | 10/2006 | Hart et al. | |
| 7,157,591 B2 * | 1/2007 | Burkhardt et al. | 556/53 |
| 7,169,864 B2 | 1/2007 | Paczkowski et al. | |
| 7,193,100 B2 | 3/2007 | Sangokoya et al. | |
| 7,232,869 B2 * | 6/2007 | Sell et al. | 526/133 |
| 7,334,770 B2 | 2/2008 | Wang et al. | |
| 7,342,078 B2 | 3/2008 | Schottek et al. | |
| 7,355,058 B2 | 4/2008 | Luo et al. | |
| 7,468,416 B2 | 12/2008 | Sell et al. | |
| 2001/0053833 A1 | 12/2001 | Nakano et al. | |
| 2002/0165084 A1 | 11/2002 | Burkhardt et al. | |
| 2006/0116490 A1 | 6/2006 | Paczkowski et al. | |
| 2006/0252637 A1 | 11/2006 | Okumura | |

FOREIGN PATENT DOCUMENTS

| | | |
|---|---|---|
| EP | 0 302 424 A1 | 2/1989 |
| WO | 94/28034 A1 | 12/1994 |
| WO | 01/48034 A2 | 7/2001 |
| WO | 02/02576 A1 | 1/2002 |
| WO | 2009/054832 A1 | 4/2009 |

OTHER PUBLICATIONS

Written Opinion issued Mar. 14, 2012 in corresponding Singapore application No. 201104834-5 (11 pages).
Official Action (w/translation) issued Nov. 2, 2012 in corresponding Russian application No. 201170909/28 (6 pages).
Official Action (w/translation) issued Oct. 31, 2012 in corresponding Chinese application No. 200880132439.2 (10 pages).
International Search Report from PCT/US2008/014144 dated Aug. 26, 2009 (2 pages).
Written Opinion from PCT/US2008/014144 dated Aug. 26, 2009 (6 pages).

* cited by examiner

*Primary Examiner* — Caixia Lu
(74) *Attorney, Agent, or Firm* — Osha•Liang LLP

(57) ABSTRACT

Certain metallocene compounds are provided that, when used as a component in a supported polymerization catalyst under industrially relevant polymerization conditions, afford high molar mass homo polymers or copolymers like polypropylene or propylene/ethylene copolymers without the need for any α-branched substituent in either of the two available 2-positions of the indenyl ligands. The substituent in the 2-position of one indenyl ligand can be any radical comprising hydrogen, methyl, or any other $C_2$-$C_{40}$ hydrocarbon which is not branched in the α-position, and substituent in the 2-position of the other indenyl ligand can be any $C_5$-$C_{40}$ hydrocarbon radical with the proviso that this hydrocarbon radical is branched in the β-position and that the β-carbon atom is a quarternary carbon atom and part of a non-cyclic hydrocarbon system. This metallocene topology affords high melting point, very high molar mass homo polypropylene and very high molar mass propylene-based copolymers. Furthermore, the activity/productivity levels of catalysts comprising the metallocenes of the present invention are exceptionally high.

60 Claims, 2 Drawing Sheets

METALLOCENE COMPOUNDS, CATALYSTS COMPRISING THEM, PROCESS FOR PRODUCING AN OLEFIN POLYMER BY USE OF THE CATALYSTS, AND OLEFIN HOMO- AND COPOLYMERS

BACKGROUND

1. Field of the Invention

The present invention relates to novel metallocene compounds useful as components in polymerization catalysts, to catalysts comprising such metallocene compounds, to a process for the polymerization of olefins and to particularly propylene, and olefin homopolymers, random, and impact copolymers prepared by using the metallocene catalysts.

2. Background of the Art

One of the most important factors determining the success of a catalyst is its versatility, that is the possibility to use it for the broadest possible range of products. For a long time, the limitations for the development of metallocene catalysts for polypropylene has been their inability to produce propylene-ethylene copolymers of high molar mass, due to the fact that ethylene behaves as a chain transfer agent with most metallocenes. This effect has been observed for all basic metallocene structures, such as the syndiospecific $C_s$ symmetric $Me_2C(Cp)(Flu)ZrCl_2$, the aspecific $C_{2v}$ symmetric $Me_2Si(Flu)_2ZrCl_2$, and both the $C_2$ symmetric rac-$Me_2C(3$-iPr—Ind$)_2ZrCl_2$ and the fluxional $(2$-Ph-Ind$)_2ZrCl_2$ catalysts for elastomeric polypropylene. This effect has also been found for the isospecific $C_2$ symmetric rac-$Me_2Si(2$-Me-4,5-Benz-Ind$)_2ZrCl_2$ and rac-$Me_2Si(2$-Me-4-Ph-Ind$)_2ZrCl_2$ [L. Resconi, C. Fritze, "Metallocene Catalysts for Propylene Polymerization" In Polypropylene Handbook (N. Pasquini, Ed.), ch. 2.2, Hanser Publishers, Munic 2005]. While the 2-Me substitution of this catalyst family suppresses the β-hydrogen transfer to the propylene monomer and thus prevents the formation of low molar mass polymer, it fails to prevent the β-hydrogen transfer to the ethylene comonomer in case of the latter's presence. This β-hydrogen transfer to the ethylene comonomer becomes the favored chain termination mechanism and leads to the formation of low molar mass propylene-ethylene copolymers [A. Tynys et al., Macromol. Chem. Phys. 2005, vol. 206, pp. 1043-1056: "Ethylene-Propylene Copolymerizations: Effect of Metallocene Structure on Termination Reactions and Polymer Microstructure"]. Exceptions have been found in some zirconocenes with highly bulky ligands, such as rac-$Me_2C(3$-tBu-Ind$)_2ZrCl_2$, which show a marked increase in molar masses by ethylene incorporation. This catalyst, however, has shortcomings in terms of homopolymer molar mass and activity.

Another key requirement of a metallocene catalyst is its capability to produce polypropylene with a high melting point. This is equivalent with a catalyst that has a very high stereospecificity and regioselectivity. Within the rao-$Alk_2Si$(2-Alk-Ind$)_2ZrCl_2$ catalyst family, the stereospecificity and regioselectivity has continuously been improved during the last 15 years. EP-A1 834 519 relates to metallocenes of the rac-$Me_2Si(2$-Me-4-Ar—Ind$)_2ZrCl_2$ for the production of high rigid, high Tm polypropylenes with very high stereoregularity and very low amounts of regio errors. Although not tested for their copolymerization performance, the metallocenes disclosed in EP-A1 834 519 anticipated substitution patterns in 2-position that would later be identified as particularly suitable for the production of propylene/ethylene random copolymers when combined with additional substituents in certain positions. However, the highly stereo- and regio regular polypropylenes were not obtained under commercially relevant process conditions and suffered from too low activity/productivity levels.

US-A1 2001/0053833 discloses metallocenes having substituents in 2-position consisting of an unsubstituted heteroaromatic ring or a heteroaromatic ring having at least one substituent bonded to the ring. Such catalysts afford C3/C2 copolymers with reasonably high molar mass, but fail to produce high $T_m$ homopolymers under conditions typical for commercial scale production, i.e. on a support and at temperatures from 60 deg C. and higher. Also, the productivities of this catalyst family are unsatisfactory.

WO 01/058970 relates to impact copolymers having a high melting point and a high rubber molar mass, produced by catalysts comprising metallocenes of the rao-$Me_2Si(2$-Alk-4-Ar—Ind$)_2ZrCl_2$ family. High molar masses in the propylene/ethylene rubber were achieved when both Alk substituents were i-propyl groups. WO 02/002576 discloses bridged metallocenes of the (2-R-4-Ph-Ind$)_2ZrCl_2$ family having particular combinations of substituents in the 2-positions of the indenyl ligands and substituents in the benzene ring. A high polypropylene (PP) melting point is favored if the Ph group exhibits a substitution pattern in the 3 and 5 positions, particularly in case of butyl substituents. A combination of high homopolymer melting point and high copolymer molar mass is achieved if both substituents R in 2-position are isopropyl groups. The major shortcoming is the very low activity/productivity of the rac-$Me_2Si(2$-R-4-Ar—Ind$)_2ZrCl_2$ catalysts if both ligands R are branched in the α-position. WO 03/002583 discloses bridged metallocenes of the (2-R-4-Ph-Ind$)_2ZrCl_2$ family having particular combinations of substituents in the 2-positions of the indenyl ligands and the 4-Ph substituents. A high PP melting point is favored if the Ph group exhibits a substitution pattern in the 2-position, particularly in case of biphenyl substituents. A combination of high homopolymer melting point and high copolymer molar mass is achieved if both substituents R in 2-position of the indenyl ligand are isopropyl groups. One major shortcoming is the very low activity/productivity of the rac-$Me_2Si(2$-R-4-Ar—Ind$)_2$ $ZrCl_2$ catalysts if both ligands R are branched in the α-position. Moreover, the highest possible molar masses of the homopolymers produced by using such catalysts are relatively low which corresponds to relatively high melt flow rates. This, in turn excludes such metallocenes from catering applications such as pipe, blown film, cast film and injection stretch blow molding.

EP-A2 1 250 365, WO 97/40075 and WO 03/045551 relate to metallocenes having substituents in the 2-positions of either of the indenyl ligands with the imperative that at least one of the ligands in 2-position is branched or cyclicized in the α-position. WO 04/106351 relates to metallocenes having substituents in the 2-positions of the indenyl ligands with the proviso that one ligand is unbranched or bound via an $sp^2$-hybridized carbon atom and the other ligand is branched in the α-position. Such catalysts afford high Tm homopolymers and high molar mass propylene/ethylene copolymers. However, there still are limitations with regard to catalyst activity/productivity and lowest achievable homopolymer melt flow rate.

PCT/US2007/022614, a co-pending applications by the present inventors, demonstrated that metallocenes having ligands being β-branched in the 2-position created surprising increases in activity of the metallocene catalyst and also created products with unexpectedly superior properties than previously known metallocenes. The inventors now have discovered a species of the previously revealed genus that unexpectedly produces even significantly higher increases in catalyst activity and improvements in product properties.

In summary, the main deficiency of supported catalyst systems comprising metallocenes of the above mentioned prior art, is that so far no catalyst has been found that, when used for the homopolymerization of propylene, affords isotactic polypropylene with a high melting point and very high molar mass (or very low melt flow rate) and that, when used for the copolymerization of propylene with ethylene, affords high molar mass propylene/ethylene copolymers, all at very high catalyst productivity. As a consequence, when compared to Ziegler/Natta catalysts, the industrial usefulness of these catalysts is limited because certain applications that require a combination of a high melting point, a very low melt flow rate, and/or a high molar mass copolymer or copolymer component, such as in impact copolymers, are not available at cost competitive productivities.

An object of the present invention is to address this shortcoming of the state of the art metallocene compounds and to provide metallocenes that increase desirable characteristics such as high melting point, high molar mass homopolymers and high molar mass copolymers, and do so at higher productivities when used as components of supported catalysts under industrially relevant polymerization conditions at temperatures of from 50° C. to 100° C. In addition, the inventions of the current example provide these advantages by using a metallocene with symmetrically substituted 2 positions on the indenyl group. This is significantly more cost effective, and therefore far more desirable, than the comparative examples that have asymmetric substitution.

Another objective of the present invention is to provide a process for the polymerization of olefins, particularly propylene, ethylene, and optionally one or more higher 1-olefins.

Furthermore, it is an objective of the present invention to provide olefin polymers, particularly propylene homopolymers, random copolymers of propylene with ethylene and/or higher 1-olefins, impact copolymers comprised of propylene, ethylene and/or optionally higher 1-olefins, and random impact copolymers comprised of propylene, ethylene and/or optionally higher 1-olefins.

SUMMARY

Certain metallocene compounds are provided that, when used as a component in a supported polymerization catalyst under industrially relevant polymerization conditions, afford high molar mass homo polymers or copolymers like polypropylene or propylene/ethylene copolymers without the need for any α-branched substituent in either of the two available 2-positions of the indenyl ligands. The substituent in the 2-position of one indenyl ligand can be any radical comprising hydrogen, methyl, or any other $C_2$-$C_{40}$ hydrocarbon which is not branched in the α-position, and the substituent in the 2-position of the other indenyl ligand can be any $C_5$-$C_{40}$ hydrocarbon radical with the proviso that this hydrocarbon radical is branched in the β-position and that the β-carbon atom is a quarternary carbon atom and part of a mono-cyclic hydrocarbon system. It is even more preferred, that the substituents in the 2-position of both indenyl ligands are identical and are any $C_5$-$C_{40}$ hydrocarbon radical with the proviso that this hydrocarbon radical is branched in the β-position and that the β-carbon atom is a quarternary carbon atom and part of a mono-cyclic hydrocarbon system. This metallocene topology affords high melting point, very high molar mass homo polypropylene and very high molar mass propylene-based copolymers. Furthermore, the activity/productivity levels of catalysts comprising the metallocenes of the present invention are exceptionally high.

While various metallocenes are described, for example, in U.S. Publication No. 2006/0116490, the improvement in olefin polymerization achieved by the metallocene topology of the present invention is new and unexpected.

One embodiment described herein is a bridged metallocene having the general Formula 1 shown below:

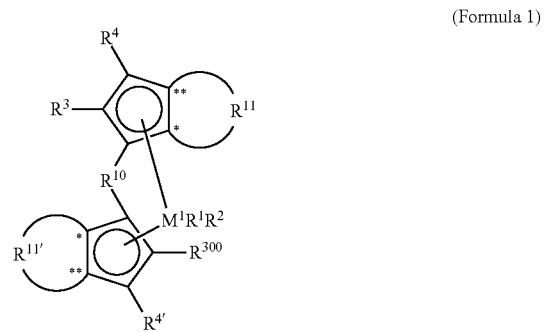

(Formula 1)

where $M^1$ is a metal of Group IVb of the Periodic Table of the Elements, $R^1$ and $R^2$ are identical or different and are selected from the group consisting of a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms and an aryl group of from 6 to about 14 carbon atoms, and wherein $R^1$ and $R^2$ may form one or more ring system(s), $R^4$ and $R^{4'}$ are identical or different and are selected from the group consisting of a hydrogen atom and a linear, cyclic or branched hydrocarbon group optionally containing one or more hetero atoms selected from the group consisting of Si, B, Al, O, S, N, P, F, Cl and Br, $R^{10}$ is a bridging group wherein $R^{10}$ is selected from:

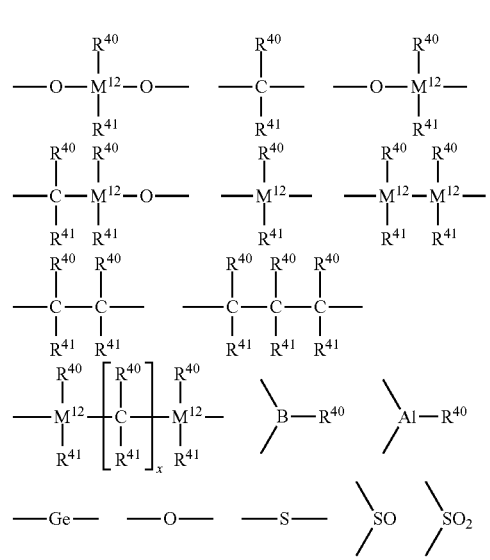

-continued

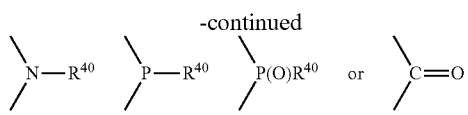

where

R⁴⁰ and R⁴¹, even when bearing the same index, can be identical or different and can optionally contain heteroatoms selected from the group consisting of Si, B, Al, O, S, N, P, Cl and Br, and are selected from the group consisting of a hydrogen atom, an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, an alkyl(aryl)silyl group, an arylsilyl group, and an arylalkenyl group of from 8 to about 40 carbon atoms, and wherein R⁴⁰ and R⁴¹ together with the atoms connecting them can form one or more cyclic systems, x is an integer from 1 to 18, $M^{12}$ is silicon, germanium or tin, and $R^{10}$ can optionally link two units of the formula 1 to one another, $R^{11}$ and $R^{11'}$ are identical or different and are each a divalent $C_2$-$C_{40}$ group which together with the cyclopentadienyl ring forms a further saturated or unsaturated ring system having a ring size of from 5 to 7 atoms, where $R^{11}$ and $R^{11'}$ optionally contain the heteroatoms Si, Ge, N, P, O or S within the ring system fused onto the cyclopentadienyl ring, and $R^{300}$ has the structure

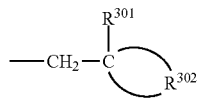

where $R^{301}$ is a linear, cyclic or branched hydrocarbon group selected from the group consisting of an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group and an arylsilyl group, wherein each of the groups may contain one or more hetero atoms like Si, B, Al, O, S, N or P, and/or may contain halogen atoms like F, Cl or Br, and where $R^{302}$ is a hydrocarbon group selected from the group consisting of a substituted or unsubstituted alkyl group of from 2 to about 20 carbon atoms, and an substituted or unsubstituted alkenyl group of from 3 to about 20 carbon atoms, and wherein those groups may contain one or more hetero atoms like Si, B, Al, O, S, N or P, and/or may contain halogen atoms like F, Cl or Br, and further wherein $R^{302}$ forms a monocyclic ring with the β carbon atom.

$R^3$ has the meaning of $R^{300}$, but $R^3$ need not be identical to $R^{300}$, or $R^3$ is a linear, cyclic or branched hydrocarbon group which optionally can contain one or more hetero atoms selected from the group consisting of Si, B, Al, O, S, N, P, F, Cl or Br, or $R^3$ is selected from the group consisting of an alkyl group of from 1 to about 20 carbon atoms, an alkylalkenyl group of from 3 to about 20 carbon atoms, an alkylaryl group of from 7 to about 40 carbon atoms, and an alkylarylalkenyl group of from 9 to about 40 carbon atoms, with the proviso that, in any case, $R^3$ is not branched in the α-position.

Another embodiment described herein is a process for olefin polymerisation comprising contacting one or more olefins each having from 2 to about 20 carbon atoms under olefin polymerisation reaction conditions with a catalyst system including a bridged metallocene component having Formula 1 shown above.

Yet another embodiment described herein is a bridged metallocene having the general Formula 1a shown below:

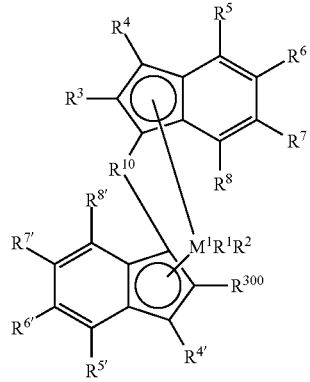

Formula 1a where $M^1$ is a metal of Group IVb of the Periodic Table of the Elements, $R^1$ and $R^2$ are identical or different and are selected from the group consisting of a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms and an aryl group of from 6 to about 14 carbon atoms and $R^1$ and $R^2$ may form one or more ring system(s), $R^4$ and $R^{4'}$ are identical or different and are selected from the group consisting of a hydrogen atom and a linear, cyclic or branched hydrocarbon group optionally containing one or more hetero atoms selected from the group consisting of Si, B, Al, O, S, N, P, F, Cl and Br, $R^{10}$ is a bridging group wherein $R^{10}$ is selected from:

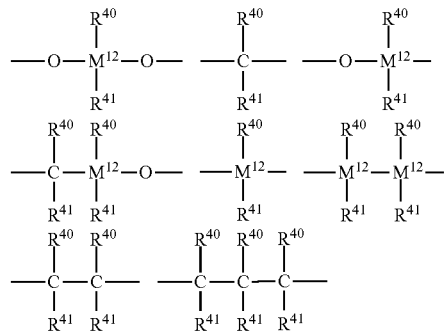

-continued

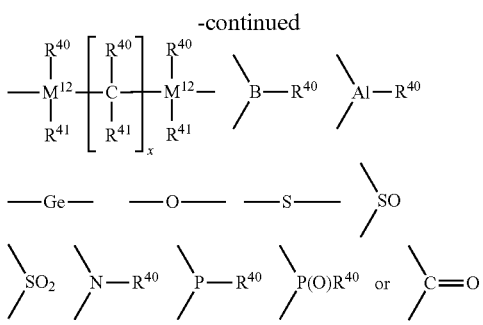

where $R^{40}$ and $R^{41}$, even when bearing the same index, can be identical or different and can optionally contain heteroatoms selected from the group consisting of Si, B, Al, O, S, N, P, Cl and Br, and are each selected from the group consisting of a hydrogen atom, an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, an alkyl(aryl)silyl group, an arylsilyl group, or an arylalkenyl group of from 8 to about 40 carbon atoms and wherein $R^{40}$ and $R^{41}$ together with the atoms connecting them may form one or more cyclic systems, x is an integer from 1 to 18, $M^{12}$ is silicon, germanium or tin, and $R^{10}$ can optionally link two units of the formula 1 to one another, and $R^{300}$ has the structure:

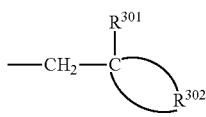

where $R^{301}$ is a linear, cyclic or branched hydrocarbon group selected from the group consisting of an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group and an arylsilyl group, wherein the groups may contain one or more hetero atoms like Si, B, Al, O, S, N or P, and/or may contain halogen atoms like F, Cl or Br, and where $R^{302}$ is a hydrocarbon group selected from the group consisting of a substituted or unsubstituted alkyl group of from 2 to about 20 carbon atoms, and an substituted or unsubstituted alkenyl group of from 3 to about 20 carbon atoms, and the groups may contain one or more hetero atoms like Si, B, Al, O, S, N or P, and/or may contain halogen atoms like F, Cl or Br, wherein $R^{302}$ forms a monocyclic ring with the β carbon atom.

$R^3$ has the meaning of $R^{300}$, but $R^3$ need not be identical to $R^{300}$, or $R^3$ is a linear, cyclic or branched hydrocarbon group which optionally can contain one or more hetero atoms selected from the group consisting of Si, B, Al, O, S, N, P, F, Cl or Br or $R^3$ is selected from the group consisting of an alkyl group of from 1 to about 20 carbon atoms, an alkylalkenyl group of from 3 to about 20 carbon atoms, an alkylaryl group of from 7 to about 40 carbon atoms, and an alkylarylalkenyl group of from 9 to about 40 carbon atoms, with the proviso that $R^3$, in any case, is not branched in the α-position, and where $R^5$, $R^6$, $R^7$ and $R^8$ and also $R^{5'}$, $R^{6'}$, $R^{7'}$ and $R^{8'}$ are identical or different and are each selected from the group consisting of a hydrogen atom, a linear, cyclic or branched hydrocarbon group or a substituted or unsubstituted alkylsilyl group, an alkyl(aryl)silyl group and an arylsilyl group and wherein each of the groups may contain one or more hetero atoms like Si, B, Al, O, S, N or P, and/or may contain halogen atoms like F, Cl or Br, and further wherein adjacent radicals $R^5$, $R^6$ or $R^6$, $R^7$ or $R^7$, $R^8$ and also $R^{5'}$, $R^{6'}$ or $R^{6'}$, $R^{7'}$ or $R^{7'}$, $R^{8'}$ in each case may form a hydrocarbon ring system.

DETAILED DESCRIPTION

Figure 1:
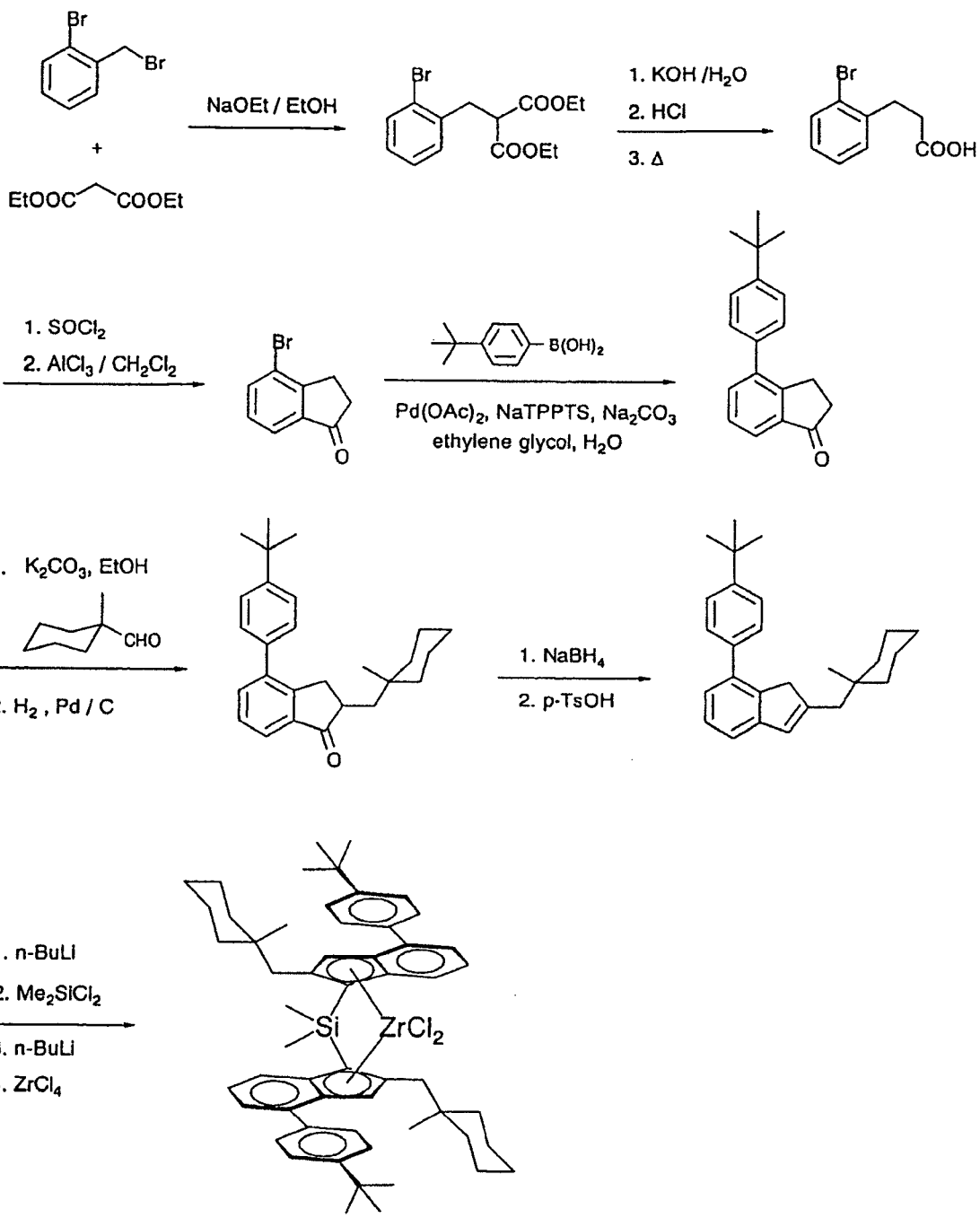
FIG. 1 illustrates individual steps of the process for producing transition metal compounds of the bridged metallocene compound of the invention.

We have found that this object is achieved by a supported catalyst system comprising at least one specifically substituted and bridged metallocene, at least one cocatalyst, at least one support and, if desired, at least one metal compound and a further additive component. According to the present invention, the catalyst system is prepared by mixing at least one specifically substituted and bridged metallocene, at least one cocatalyst, at least one support and if desired at least one metal compound and a further additive component.

The first embodiment of the invention relates to a substituted, bridged metallocene component of the general Formula 1 below,

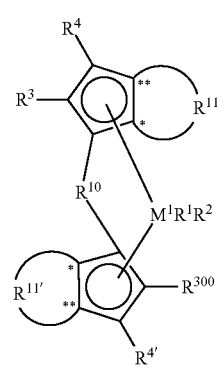

(Formula 1)

where $M^1$ is a metal of Group IVb of the Periodic Table of the Elements, preferably zirconium or hafnium, and particularly preferably zirconium.

$R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms and $R^1$ and $R^2$ may form one or more ring system(s). Preferably, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, or $R^1$ and $R^2$ together may form one or more ring system(s). Particularly preferably, $R^1$ and $R^2$ are identical or different and are methyl, chlorine or phenolate.

$R^4$ and $R^{4'}$ are identical or different and are each a hydrogen atom, a linear, cyclic or branched hydrocarbon group, for example an alkyl group of from 1 to 20 carbon atoms, an alkenyl group of from 2 to 20 carbon atoms, an aryl group of from 6 to 20 carbon atoms, an arylalkyl group of from 7 to 40 carbon atoms, an alkylaryl group of from 8 to about 40 carbon atoms, or an arylalkenyl group of from 8 to about 40 carbon atoms or a substituted or unsubstituted alkylsilyl group, an alkyl(aryl)silyl group or an arylsilyl group. The group may contain one or more hetero atoms like Si, B, Al, O, S, N or P, and/or may contain halogen atoms like F, Cl or Br. Preferably, $R^4$ and $R^{4'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 8 to about 20 carbon atoms, or an arylalkenyl group of from 8 to about 20 carbon atoms or a substituted or unsubstituted alkylsilyl group, an alkyl(aryl)silyl group or an arylsilyl group. The groups may be halogenated. Particularly preferably, $R^4$ and $R^{4'}$ are both hydrogen.

$R^{10}$ is a bridging group wherein $R^{10}$ is selected from:

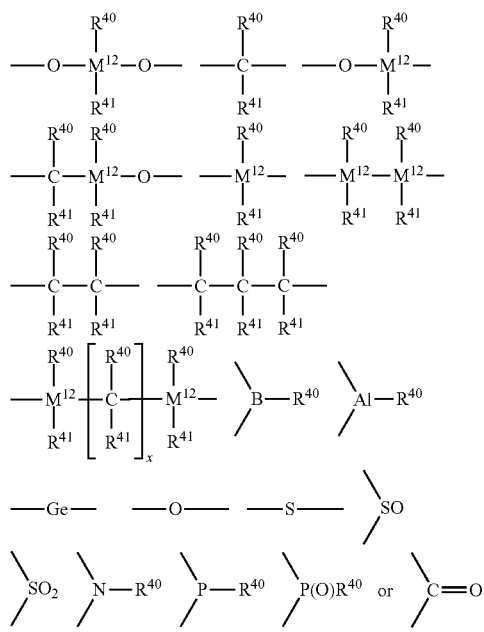

where
$R^{40}$ and $R^{41}$, even when bearing the same index, can be identical or different and are each a hydrogen atom, a $C_1$-$C_{40}$ group such as an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, or an arylalkenyl group of from 8 to about 40 carbon atoms. $R^{40}$ and $R^{41}$ together with the atoms connecting them can form one or more cyclic systems or $R^{40}$ and/or $R^{41}$ can contain additional hetero atoms (i.e., non-carbon atoms) like Si, B, Al, O, S, N or P or halogen atoms like Cl or Br, x is an integer from 1 to 18, $M^{12}$ is silicon, germanium or tin, and $R^{10}$ may also link two units of the formula 1 to one another.

Preferably, $R^{10}$ is $R^{40}R^{41}Si=$, $R^{40}R^{41}Ge=$, $R^{40}R^{41}C=$ or $-(R^{40}R^{41}C-CR^{40}R^{41})$ where $R^{40}$ and $R^{41}$ are identical or different and are each a hydrogen atom, a hydrocarbon group of from 1 to about 30 carbon atoms, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, an alkyl(aryl)silyl or an arylsilyl group.

Particularly preferably, the bridging unit $R^{10}$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, naphthyl, benzyl, trimethylsilyl or 3,3,3-trifluoropropyl.

$R^{11}$ and $R^{11'}$ are identical or different and are each a divalent $C_2$-$C_{40}$ group which together with the cyclopentadienyl ring forms a further saturated or unsaturated ring system having a ring size of from 5 to 7 atoms, where $R^{11}$ and $R^{11'}$ may contain the heteroatoms Si, Ge, N, P, O or S within the ring system fused onto the cyclopentadienyl ring. Preferably, the groups $R^{11}$ and $R^{11'}$ are identical or different and are each a divalent group selected from those given in Formulae 1 αβ, γ, δ, φ, and ν and Formulae 1 αβ', γ', δ', Φ', and ν', respectively. The asterisks "*" and "**" in Formula 1 and Formulae 1α-ν and 1α'-ν', respectively, denote the chemical bonds joining $R^{11}$ and $R^{11'}$ to the cyclopentadienyl rings. For illustration, if $R^{11}$ is represented by Formula 1γ and $R^{11'}$ is represented by Formula 1γ', then the structure given in Formula 1a (see below) is obtained. Particularly preferably, $R^{11}$ and $R^{11'}$ are identical or different and $R^{11}$ is a divalent group according to Formula 1γ and $R^{11'}$ is selected from the divalent groups in Formulae 1α', β', and γ' or $R^{11}$ and $R^{11'}$ are identical or different and are divalent groups according to Formula 1α and 1α' or Formula 1β and 1β' or Formula 1γ and 1γ' or Formula 1δ and 1δ' or Formula 1φ and 1φ' or Formula 1ν and 1ν', respectively, Formula 1α

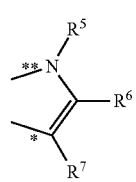

-continued

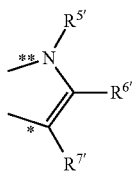
Formula 1α'

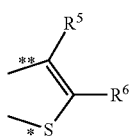
Formula 1β

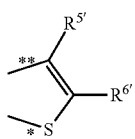
Formula 1β'

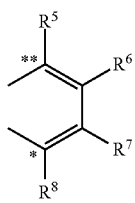
Formula 1γ

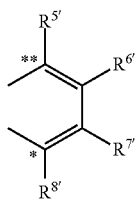
Formula 1γ'

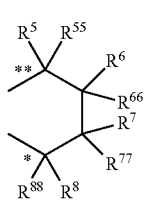
Formula 1δ

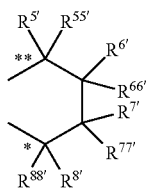
Formula 1δ'

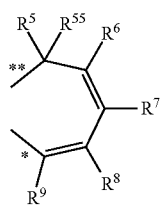
Formula 1φ

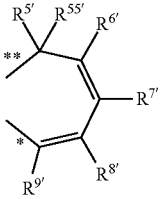
Formula 1φ'

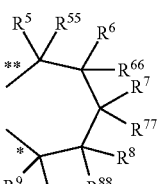
Formula 1ν

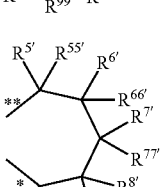
Formula 1ν'

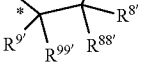

$R^5$, $R^6$, $R^7$, $R^8$, and $R^9$ and also $R^{5'}$, $R^{6'}$, $R^{7'}$, $R^{8'}$ and $R^{9'}$ as well as $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are identical or different and are each a hydrogen atom, a linear, cyclic or branched hydrocarbon group, for example an alkyl group of from 2 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl)silyl group or an arylsilyl group. Two adjacent radicals $R^5$, $R^6$ or $R^{5'}$, $R^{6'}$ or $R^6$, $R^7$ or $R^{6'}$, $R^{7'}$ or $R^7$, $R^8$ or $R^{7'}$, $R^{8'}$ or $R^8$, $R^9$ or $R^{8'}$, $R^{9'}$ as well as $R^{55}$, $R^{66}$ or $R^{55'}$, $R^{66'}$ or $R^{66}$, $R^{77}$ or $R^{66'}$, $R^{77'}$ or $R^{77}$, $R^{88}$ or $R^{77'}$, $R^{88'}$ or $R^{88}$, $R^{99}$ or $R^{88'}$, $R^{99'}$ in each case may form a saturated or unsaturated hydrocarbon ring system. The groups may contain one or more hetero atoms like Si, B, Al, O, S, N or P, and/or may contain halogen atoms like F, Cl or Br.

Preferably, $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are each a hydrogen atom and $R^5$, $R^6$, $R^7$, $R^8$ and $R^9$ and also $R^{5'}$, $R^{6'}$, $R^{7'}$, $R^{8'}$ and $R^{9'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 40 carbon atoms and the groups may contain one or more hetero atoms like Si, B, Al, O, S, N or P, and/or may contain halogen atoms like F, Cl or Br. The two adjacent radicals $R^5/R^6$ and also $R^{5'}/R^{6'}$ may form a hydrocarbon ring system or $R^5$ and $R^{5'}$ are identical or different and are each a substituted or unsubstituted aryl group of from 6 to about 40 carbon atoms.

Particularly preferably, $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are each a hydrogen atom and $R^5$, $R^6$, $R^7$, $R^8$ and $R^9$ and also $R^{5'}$, $R^{6'}$, $R^{7'}$, $R^{8'}$ and $R^{9'}$ are identical or different and are each a hydrogen atom or a linear, cyclic or branched alkyl group of from 1 to about 10 carbon atoms, or an aryl group of from 6 to about 40 carbon atoms. The two adjacent radicals $R^5$, $R^6$ and also $R^{5'}$, $R^{6'}$ together may form a ring system or $R^5$ and $R^{5'}$ are identical or different and are each a substituted or unsubstituted aryl group of from 6 to about 40 carbon atoms.

$R^{300}$ is a

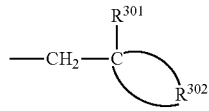

group, where $R^{301}$ is a linear, cyclic or branched hydrocarbon group, for example an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group or an arylsilyl group, and the groups may contain one or more hetero atoms like Si, B, Al, O, S, N or P, and/or may contain halogen atoms like F, Cl or Br.

Preferably R301 is a is a linear, cyclic or branched hydrocarbon group, for example an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 7 to about 20 carbon atoms, or an arylalkenyl group of from 8 to about 20 carbon atoms, an alkoxy group of from 1 to about 10 carbon atoms, an aryloxy group of from 6 to about 10 carbon atoms, or a substituted or unsubstituted alkylsilyl group, an alkyl(aryl)silyl group or an arylsilyl group, and the groups may contain one or more hetero atoms like Si, B, Al, O, S, N or P, and/or may contain halogen atoms like F, Cl or Br.

Particular preferably R301 is a is a linear, cyclic or branched hydrocarbon group, for example an alkyl group of from 1 to about 4 carbon atoms, an aryl group of from 6 to about 10 carbon atoms, an arylalkyl group of from 7 to about 20 carbon atoms, an alkylaryl group of from 7 to about 20 carbon atoms, an alkoxy group of from 1 to about 10 carbon atoms, an aryloxy group of from 6 to about 10 carbon atoms, and the groups may contain one or more hetero atoms like Si, B, Al, O, S, N or P, and/or may contain halogen atoms like F, Cl or Br.

Most particular preferably R301 is a linear or branched hydrocarbon group, for example an alkyl group of from 1 to about 4 carbon atoms, $R^{302}$ is a hydrocarbon group which is building a mono-cyclic ring with the β-carbon atom, for example a substituted or unsubstituted alkyl group of from 2 to about 20 carbon atoms, an substituted or unsubstituted alkenyl group of from 3 to about 20 carbon atoms, and the groups may contain one or more hetero atoms like Si, B, Al, O, S, N or P, and/or may contain halogen atoms like F, Cl or Br.

Preferably R302 is a hydrocarbon group which is building a mono-cyclic ring with the β-carbon atom, for example a substituted or unsubstituted alkyl group of from 2 to about 10 carbon atoms, and the groups may contain one or more hetero atoms like Si, B, Al, O, S, N or P, and/or may contain halogen atoms like F, Cl or Br.

Particularly preferably R302 is a hydrocarbon group which is building a mono-cyclic ring with the β-carbon atom, for example a substituted or unsubstituted alkyl group of from 3 to about 7 carbon atoms, and the groups may contain one or more hetero atoms like Si, B, Al, O, S, N or P, and/or may contain halogen atoms like F, Cl or Br, with the proviso that $R^{300}$ contain more than 6 carbon atoms.

$R^3$ may be chosen from the same set that described $R^{300}$ (but $R^3$ need not be identical to $R^{300}$) or $R^3$ is a hydrogen atom, a linear, cyclic or branched hydrocarbon group which may be halogenated and/or may contain one or more hetero atoms like Si, B, Al, O, S, N or P, for example an alkyl group of from 1 to about 20 carbon atoms, an alkylalkenyl group of from 3 to about 20 carbon atoms, an alkylaryl group of from 7 to about 40 carbon atoms, or an alkylarylalkenyl group of from 9 to about 40 carbon atoms, with the proviso that $R^3$ is not cyclic or branched in α-position.

Preferably, $R^3$ is chosen from the same set that described $R^{300}$ (but $R^3$ need not be identical to $R^{300}$) or $R^3$ is a linear, cyclic or branched hydrocarbon group of from 1 to about 20 carbon atoms, for example an alkyl group of from 1 to 20 carbon atoms, an alkylaryl group of from 7 to about 20 carbon atoms, an alkylalkenyl group of from 3 to about 20 carbon atoms or an alkylarylalkenyl group of from 9 to about 20 carbon atoms with the proviso that $R^3$ is not cyclic or branched in α-position.

More preferably, $R^3$ and $R^{300}$ are identical or $R^3$ is a methyl group or a linear, cyclic or branched hydrocarbon group of from 7 to about 10 carbon atoms which may be halogenated, an alkylaryl group of from 7 to about 10 carbon atoms or an alkylalkenyl group of from 7 to about 10 carbon atoms with the proviso that $R^3$ is not cyclic or branched in α-position.

Particularly preferably, $R^3$ and $R^{300}$ are identical with the proviso that $R^3$ and $R^{300}$ contain more than 6 carbon atoms.

Preferable, either of $R^3$ and $R^{300}$, or both are not cyclic or, in the alternative, are not branched in the α-carbon position.

Preferably, the specifically substituted, bridged metallocene component of the first embodiment of the invention is as given in Formula 1a below.

Formula 1a

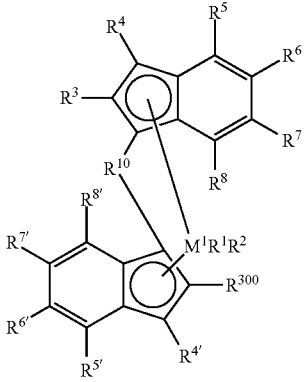

$M^1$, $R^1$, $R^2$, $R^3$, $R^4$, $R^{4'}$, $R^{10}$ and $R^{300}$ have the meaning set forth above with respect to Formula 1.

For the substituents $R^5$, $R^6$, $R^7$ and $R^8$ and also $R^{5'}$, $R^{6'}$, $R^{7'}$ and $R^{8'}$ of Formula 1a, there are two equitable substitution patterns.

In the first substitution pattern, $R^5$, $R^6$, $R^7$ and $R^8$ and also $R^{5'}$, $R^{6'}$, $R^{7'}$ and $R^{8'}$ are identical or different and are each a hydrogen atom, a linear, cyclic or branched hydrocarbon group, for example an alkyl group of from 1 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl)silyl group or an arylsilyl group. The groups may contain one or more hetero atoms like Si, B, Al, O, S, N or P, and/or may contain halogen atoms like F, Cl or Br, and/or two adjacent radicals $R^5$, $R^6$ or $R^6$, $R^7$ or $R^7$, $R^8$ and also $R^{5'}$, $R^{6'}$ or $R^{6'}$, $R^{7'}$ or $R^{7'}$, $R^{8'}$ in each case may form a hydrocarbon ring system.

Preferably, $R^5$, $R^6$, $R^7$ and $R^8$ and also $R^{5'}$, $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 40 carbon atoms, which may contain one or more hetero atoms like Si, B, Al, O, S, N or P, and/or may contain halogen atoms like F, Cl or Br, and/or the two adjacent radicals $R^5$, $R^6$ and also $R^{5'}$, $R^{6'}$ may form a saturated or unsaturated hydrocarbon ring system.

Particularly preferably, $R^5$, $R^6$, $R^7$ and $R^8$ and also $R^{5'}$, $R^{6'}$, $R^{7'}$ and $R^{8'}$ are identical or different and are each a hydrogen atom or a linear, cyclic or branched alkyl group of from 1 to about 10 carbon atoms, or an aryl group of from 6 to about 40 carbon atoms and/or the two adjacent radicals $R^5$, $R^6$ and also $R^{5'}$, $R^{6'}$ together may form a saturated or unsaturated ring system.

In the second substitution pattern, $R^6$, $R^7$, $R^8$ and also $R^{6'}$, $R^{7'}$ and $R^{8'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl)silyl group or an arylsilyl group. Two adjacent radicals $R^6$, $R^7$ or $R^7$, $R^8$ as well as $R^{6'}$, $R^{7'}$ or $R^{7'}$, $R^{8'}$ in each case may form a hydrocarbon ring system. The groups may contain one or more hetero atoms like Si, B, Al, O, S, N or P, and/or may contain halogen atoms like F, Cl or Br. $R^5$ and $R^{5'}$ are identical or different and are each a substituted or unsubstituted aryl group of from 6 to about 40 carbon atoms. They may contain one or more hetero atoms like Si, B, Al, O, S, N or P, and/or may contain halogen atoms like F, Cl or Br.

Preferably, $R^6$, $R^7$ and $R^8$ and also $R^{6'}$, $R^{7'}$ and $R^{8'}$ are identical or different and ate each a hydrogen atom, a substituted or unsubstituted alkylsilyl or arylsilyl group, a linear, cyclic or branched alkyl group of from 1 to about 10 carbon atoms, or an aryl group of from 6 to about 10 carbon atoms, which may contain one or more hetero atoms like Si, B, Al, O, S, N or P, and/or may contain halogen atoms like F, Cl or Br. $R^5$ and $R^{5'}$ are identical or different and are each a substituted or unsubstituted aryl group of from 6 to about 40 carbon atoms.

Particularly preferably, $R^6$, $R^7$ and $R^8$ and also $R^{6'}$, $R^{7'}$ and $R^{8'}$ are identical or different and are each a hydrogen atom or a linear, cyclic or branched alkyl group of from 1 to about 10 carbon atoms, or an aryl group of from 6 to about 10 carbon atoms. $R^5$ and $R^{5'}$ are identical or different and are each naphthyl, 4-($C_1$-$C_{10}$-alkyl)phenyl or 4-($C_6$-$C_{20}$-aryl)phenyl such as 4-methyl-phenyl, 4-biphenyl, 4-ethyl-phenyl, 4-n-propyl-phenyl, 4-isopropyl-phenyl, 4-tert-butyl-phenyl, 4-sec-butyl-phenyl, 4-cyclohexyl-phenyl, 4-trimethylsilyl-phenyl, 4-adamantyl-phenyl, 4-($C_1$-$C_{10}$-fluoroalkyl)-phenyl, 3-($C_1$-$C_{10}$-alkyl)-phenyl, 3-($C_1$-$C_{10}$-fluoroalkyl)-phenyl, 3-($C_6$-$C_{20}$-aryl)phenyl like 3-biphenyl, 3,5-di-($C_1$-$C_{10}$-alkyl)-phenyl such as 3,5-dimethyl-phenyl, 3,5-di-($C_1$-$C_{10}$-fluoroalkyl)-phenyl, such as 3,5-di(trifluoromethyl)-phenyl or 3,5-($C_6$-$C_{20}$-aryl)phenyl like 3,5-terphenyl.

Non-limiting examples for the particularly preferred metallocene compounds according to Formula 1 and 1a are given below:

Dimethylsilandiylbis[2-[(1-methylcyclohexyl)methyl]-4-(tert-butylphenyl)-1-indenyl]-zirconium dichloride
Dimethylsilandiylbis[2-[(1-methylcyclopentyl)methyl]-4-(tert-butylphenyl)-1-indenyl]-zirconium dichloride
Dimethylsilandiylbis[2-[(1-methylcycloheptyl)methyl]-4-(tert-butylphenyl)-1-indenyl]-zirconium dichloride
Dimethylsilandiylbis[2-[(1-methylcyclononyl)methyl]-4-(tert-butylphenyl)-1-indenyl]-zirconium dichloride
Dimethylsilandiylbis[2-[(1-methylcyclooctyl)methyl]-4-(tert-butylphenyl)-1-indenyl]-zirconium dichloride
Dimethylsilandiylbis[2-[(1-ethylcyclohexyl)methyl]-4-(tert-butylphenyl)-1-indenyl]-zirconium dichloride
Dimethylsilandiylbis[2-[(1-ethylcyclopentyl)methyl]-4-(tert-butylphenyl)-1-indenyl]-zirconium dichloride
Dimethylsilandiylbis[2-[(1-ethylcycloheptyl)methyl]-4-(tert-butylphenyl)-1-indenyl]-zirconium dichloride
Dimethylsilandiylbis[2-[(1-ethylcyclononyl)methyl]-4-(tert-butylphenyl)-1-indenyl]-zirconium dichloride
Dimethylsilandiylbis[2-[(1-ethylcyclooctyl)methyl]-4-(tert-butylphenyl)-1-indenyl]-zirconium dichloride
Dimethylsilandiylbis[2-[(1-ethylcyclobutyl)methyl]-4-(tert-butylphenyl)-1-indenyl]-zirconium dichloride
Dimethylsilandiylbis[2-[(1-propylcyclohexyl)methyl]-4-(tert-butyl phenyl)-1-indenyl]-zirconium dichloride
Dimethylsilandiylbis[2-[(1-propylcyclopentyl)methyl]-4-(tert-butyl phenyl)-1-indenyl]-zirconium dichloride
Dimethylsilandiylbis[2-[(1-propylcycloheptyl)methyl]-4-(tert-butylphenyl)-1-indenyl]-zirconium dichloride
Dimethylsilandiylbis[2-[(1-propylcyclononyl)methyl]-4-(tert-butylphenyl)-1-indenyl]-zirconium dichloride
Dimethylsilandiylbis[2-[(1-propylcyclooctyl)methyl]-4-(tert-butylphenyl)-1-indenyl]-zirconium dichloride
Dimethylsilandiylbis[2-[(1-propylcyclobutyl)methyl]-4-(tert-butylphenyl)-1-indenyl]-zirconium dichloride
Dimethylsilandiylbis[2-[(1-propylcyclopropyl)methyl]-4-(tert-butylphenyl)-1-indenyl]-zirconium dichloride
Dimethylsilandiylbis[2-[(1-methylcyclohexyl)methyl]-4-(1-naphthyl)-1-indenyl]-zirconium dichloride
Dimethylsilandiylbis[2-[(1-methylcyclopentyl)methyl]-4-(1-naphthyl)-1-indenyl]-zirconium dichloride
Dimethylsilandiylbis[2-[(1-methylcycloheptyl)methyl]-4-(1-naphthyl)-1-indenyl]-zirconium dichloride
Dimethylsilandiylbis[2-[(1-methylcyclononyl)methyl]-4-(1-naphthyl)-1-indenyl]-zirconium dichloride
Dimethylsilandiylbis[2-[(1-methylcyclooctyl)methyl]-4-(1-naphthyl)-1-indenyl]-zirconium dichloride
Dimethylsilandiylbis[2-[(1-ethylcyclohexyl)methyl]-4-(1-naphthyl)-1-indenyl]-zirconium dichloride
Dimethylsilandiylbis[2-[(1-ethylcyclopentyl)methyl]-4-(1-naphthyl)-1-indenyl]-zirconium dichloride
Dimethylsilandiylbis[2-[(1-ethylcycloheptyl)methyl]-4-(1-naphthyl)-1-indenyl]-zirconium dichloride
Dimethylsilandiylbis[2-[(1-ethylcyclononyl)methyl]-4-(1-naphthyl)-1-indenyl]-zirconium dichloride
Dimethylsilandiylbis[2-[(1-ethylcyclooctyl)methyl]-4-(1-naphthyl)-1-indenyl]-zirconium dichloride
Dimethylsilandiylbis[2-[(1-ethylcyclobutyl)methyl]-4-(1-naphthyl)-1-indenyl]-zirconium dichloride
Dimethylsilandiylbis[2-[(1-propylcyclohexyl)methyl]-4-(1-naphthyl)-1-indenyl]-zirconium dichloride
Dimethylsilandiylbis[2-[(1-propylcyclopentyl)methyl]-4-(1-naphthyl)-1-indenyl]-zirconium dichloride Dimethylsilandiylbis[2-[(1-propylcycloheptyl)methyl]-4-(1-naphthyl)-1-indenyl]-zirconium dichloride
Dimethylsilandiylbis[2-[(1-propylcyclononyl)methyl]-4-(1-naphthyl)-1-indenyl]-zirconium dichloride
Dimethylsilandiylbis[2-[(1-propylcyclooctyl)methyl]-4-(1-naphthyl)-1-indenyl]-zirconium dichloride
Dimethylsilandiylbis[2-[(1-propylcyclobutyl)methyl]-4-(1-naphthyl)-1-indenyl]-zirconium dichloride
Dimethylsilandiylbis[2-[(1-propylcyclopropyl)methyl]-4-(1-naphthyl)-1-indenyl]-zirconium dichloride
Dimethylsilandiylbis[2-[(1-methylcyclohexyl)methyl]-4-phenyl-1-indenyl]-zirconium dichloride
Dimethylsilandiylbis[2-[(1-methylcyclopentyl)methyl]-4-phenyl-1-indenyl]-zirconium dichloride
Dimethylsilandiylbis[2-[(1-methylcycloheptyl)methyl]-4-phenyl-1-indenyl]-zirconium dichloride
Dimethylsilandiylbis[2-[(1-methylcyclononyl)methyl]-4-phenyl-1-indenyl]-zirconium dichloride
Dimethylsilandiylbis[2-[(1-methylcyclooctyl)methyl]-4-phenyl-1-indenyl]-zirconium dichloride
Dimethylsilandiylbis[2-[(1-ethylcyclohexyl)methyl]-4-phenyl-1-indenyl]-zirconium dichloride
Dimethylsilandiylbis[2-[(1-ethylcyclopentyl)methyl]-4-phenyl-1-indenyl]-zirconium dichloride
Dimethylsilandiylbis[2-[(1-ethylcycloheptyl)methyl]-4-phenyl-1-indenyl]-zirconium dichloride
Dimethylsilandiylbis[2-[(1-ethylcyclononyl)methyl]-4-phenyl-1-indenyl]-zirconium dichloride
Dimethylsilandiylbis[2-[(1-ethylcyclooctyl)methyl]-4-phenyl-1-indenyl]-zirconium dichloride
Dimethylsilandiylbis[2-[(1-ethylcyclobutyl)methyl]-4-phenyl-1-indenyl]-zirconium dichloride
Dimethylsilandiylbis[2-[(1-propylcyclohexyl)methyl]-4-phenyl-1-indenyl]-zirconium dichloride
Dimethylsilandiylbis[2-[(1-propylcyclopentyl)methyl]-4-phenyl-1-indenyl]-zirconium dichloride
Dimethylsilandiylbis[2-[(1-propylcycloheptyl)methyl]-4-phenyl-1-indenyl]-zirconium dichloride
Dimethylsilandiylbis[2-[(1-propylcyclononyl)methyl]-4-phenyl-1-indenyl]-zirconium dichloride
Dimethylsilandiylbis[2-[(1-propylcyclooctyl)methyl]-4-phenyl-1-indenyl]-zirconium dichloride
Dimethylsilandiylbis[2-[(1-propylcyclobutyl)methyl]-4-phenyl-1-indenyl]-zirconium dichloride
Dimethylsilandiylbis[2-[(1-propylcyclopropyl)methyl]-4-phenyl-1-indenyl]-zirconium dichloride
Dimethylsilandiylbis[2-[(1-methylcyclohexyl)methyl]-4-(2-naphthyl)-1-indenyl]-zirconium dichloride
Dimethylsilandiylbis[2-[(1-methylcyclopentyl)methyl]-4-(2-naphthyl)-1-indenyl]-zirconium dichloride
Dimethylsilandiylbis[2-[1-methylcycloheptyl)methyl]-4-(2-naphthyl)-1-indenyl]-zirconium dichloride
Dimethylsilandiylbis[2-[(1-methylcyclononyl)methyl]-4-(2-naphthyl)-1-indenyl]-zirconium dichloride
Dimethylsilandiylbis[2-[(1-methylcyclooctyl)methyl]-4-(2-naphthyl)-1-indenyl]-zirconium dichloride
Dimethylsilandiylbis[2-[(1-ethylcyclohexyl)methyl]-4-(2-naphthyl)-1-indenyl]-zirconium dichloride
Dimethylsilandiylbis[2-[(1-ethylcyclopentyl)methyl]-4-(2-naphthyl)-1-indenyl]-zirconium dichloride
Dimethylsilandiylbis[2-[(1-ethylcycloheptyl)methyl]-4-(2-naphthyl)-1-indenyl]-zirconium dichloride
Dimethylsilandiylbis[2-[(1-ethylcyclononyl)methyl]-4-(2-naphthyl)-1-indenyl]-zirconium dichloride
Dimethylsilandiylbis[2-[(1-ethylcyclooctyl)methyl]-4-(2-naphthyl)-1-indenyl]-zirconium dichloride
Dimethylsilandiylbis[2-[(1-ethylcyclobutyl)methyl]-4-(2-naphthyl)-1-indenyl]zirconium dichloride
Dimethylsilandiylbis[2-[(1-propylcyclohexyl)methyl]-4-(2-naphthyl)-1-indenyl]-zirconium dichloride
Dimethylsilandiylbis[2-[(1-propylcyclopentyl)methyl]-4-(2-naphthyl)-1-indenyl]-zirconium dichloride
Dimethylsilandiylbis[2-[(1-propylcycloheptyl)methyl]-4-(2-naphthyl)-1-indenyl]-zirconium dichloride
Dimethylsilandiylbis[2-[(1-propylcyclononyl)methyl]-4-(2-naphthyl)-1-indenyl]-zirconium dichloride
Dimethylsilandiylbis[2-[(1-propylcyclooctyl)methyl]-4-(2-naphthyl)-1-indenyl]-zirconium dichloride
Dimethylsilandiylbis[2-[(1-propylcyclobutyl)methyl]-4-(2-naphthyl)-1-indenyl]-zirconium dichloride
Dimethylsilandiylbis[2-[(1-propylcyclopropyl)methyl]-4-(2-naphthyl)-1-indenyl]-zirconium dichloride
Dimethylsilandiylbis[2-[(1-methylcyclohexyl)methyl]-4-(4-methyl-phenyl)-1-indenyl]-zirconium dichloride
Dimethylsilandiylbis[2-[(1-methylcyclopentyl)methyl]-4-(4-methyl-phenyl)-1-indenyl]-zirconium dichloride
Dimethylsilandiylbis[2-[(1-methylcycloheptyl)methyl]-4-(4-methyl-phenyl)-1-indenyl]-zirconium dichloride
Dimethylsilandiylbis[2-[(1-methylcyclononyl)methyl]-4-(4-methyl-phenyl)-1-indenyl]-zirconium dichloride
Dimethylsilandiylbis[2-[(1-methylcyclooctyl)methyl]-4-(4-methyl-phenyl)-1-indenyl]-zirconium dichloride
Dimethylsilandiylbis[2-[(1-ethylcyclohexyl)methyl]-4-(4-methyl-phenyl)-1-indenyl]-zirconium dichloride
Dimethylsilandiylbis[2-[(1-ethylcyclopentyl)methyl]-4-(4-methyl-phenyl)-1-indenyl]-zirconium dichloride
Dimethylsilandiylbis[2-[(1-ethylcycloheptyl)methyl]-4-(4-methyl-phenyl)-1-indenyl]-zirconium dichloride
Dimethylsilandiylbis[2-[(1-ethylcyclononyl)methyl]-4-(4-methyl-phenyl)-1-indenyl]-zirconium dichloride
Dimethylsilandiylbis[2-[(1-ethylcyclooctyl)methyl]-4-(4-methyl-phenyl)-1-indenyl]-zirconium dichloride
Dimethylsilandiylbis[2-[(1-ethylcyclobutyl)methyl]-4-(4-methyl-phenyl)-1-indenyl]-zirconium dichloride
Dimethylsilandiylbis[2-[(1-propylcyclohexyl)methyl]-4-(4-methyl-phenyl)-1-indenyl]-zirconium dichloride
Dimethylsilandiylbis[2-[(1-propylcyclopentyl)methyl]-4-(4-methyl-phenyl)-1-indenyl]-zirconium dichloride
Dimethylsilandiylbis[2-[(1-propylcycloheptyl)methyl]-4-(4-methyl-phenyl)-1-indenyl]-zirconium dichloride
Dimethylsilandiylbis[2-[(1-propylcyclononyl)methyl]-4-(4-methyl-phenyl)-1-indenyl]-zirconium dichloride
Dimethylsilandiylbis[2-[(1-propylcyclooctyl)methyl]-4-(4-methyl-phenyl)-1-indenyl]-zirconium dichloride
Dimethylsilandiylbis[2-[(1-propylcyclobutyl)methyl]-4-(4-methyl-phenyl)-1-indenyl]-zirconium dichloride
Dimethylsilandiylbis[2-[(1-propylcyclopropyl)methyl]-4-(4-methyl-phenyl)-1-indenyl]-zirconium dichloride
Dimethylsilandiylbis[2-[(1-methylcyclohexyl)methyl]-4-(3,5-dimethyl-phenyl)-1-indenyl]-zirconium dichloride
Dimethylsilandiylbis[2-[(1-methylcyclopentyl)methyl]-4-(3,5-dimethyl-phenyl)-1-indenyl]-zirconium dichloride
Dimethylsilandiylbis[2-[(1-methylcycloheptyl)methyl]-4-(3,5-dimethyl-phenyl)-1-indenyl]-zirconium dichloride
Dimethylsilandiylbis[2-[(1-methylcyclononyl)methyl]-4-(3,5-dimethyl-phenyl)-1-indenyl]-zirconium dichloride
Dimethylsilandiylbis[2-[(1-methylcyclooctyl)methyl]-4-(3,5-dimethyl-phenyl)-1-indenyl]-zirconium dichloride
Dimethylsilandiylbis[2-[(1-ethylcyclohexyl)methyl]-4-(3,5-dimethyl-phenyl)-1-indenyl]-zirconium dichloride
Dimethylsilandiylbis[2-[(1-ethylcyclopentyl)methyl]-4-(3,5-dimethyl-phenyl)-1-indenyl]-zirconium dichloride Dimethylsilandiylbis[2-[(1-ethylcycloheptyl)methyl]-4-(3,5-dimethyl-phenyl)-1-indenyl]-zirconium dichloride
Dimethylsilandiylbis[2-[(1-ethylcyclononyl)methyl]-4-(3,5-dimethyl-phenyl)-1-indenyl]-zirconium dichloride
Dimethylsilandiylbis[2-[(1-ethylcyclooctyl)methyl]-4-(3,5-dimethyl-phenyl)-1-indenyl]-zirconium dichloride
Dimethylsilandiylbis[2-[(1-ethylcyclobutyl)methyl]-4-(3,5-dimethyl-phenyl)-1-indenyl]-zirconium dichloride
Dimethylsilandiylbis[2-[(1-propylcyclohexyl)methyl]-4-(3,5-dimethyl-phenyl)-1-indenyl]-zirconium dichloride
Dimethylsilandiylbis[2-[(1-propylcyclopentyl)methyl-4-(3,5-dimethyl-phenyl)-1-indenyl]-zirconium dichloride
Dimethylsilandiylbis[2-[(1-propylcycloheptyl)methyl]-4-(3,5-dimethyl-phenyl)-1-indenyl]-zirconium dichloride
Dimethylsilandiylbis[2-[(1-propylcyclononyl)methyl]-4-(3,5-dimethyl-phenyl)-1-indenyl]-zirconium dichloride
Dimethylsilandiylbis[2-[(1-propylcyclooctyl)methyl]-4-(3,5-dimethyl-phenyl)-1-indenyl]-zirconium dichloride
Dimethylsilandiylbis[2-[(1-propylcyclobutyl)methyl]-4-(3,5-dimethyl-phenyl)-1-indenyl]-zirconium dichloride
Dimethylsilandiylbis[2-[(1-propylcyclopropyl)methyl]-4-(3,5-dimethyl-phenyl)-1-indenyl]-zirconium dichloride
Dimethylsilandiylbis[2-[(1-methylcyclohexyl)methyl]-4-(4-trimethylsilyl-phenyl)-1-indenyl]-zirconium dichloride
Dimethylsilandiylbis[2-[(1-methylcyclopentyl)methyl]-4-(4-trimethylsilyl-phenyl)-1-indenyl]-zirconium dichloride
Dimethylsilandiylbis[2-[(1-methylcycloheptyl)methyl]-4-(4-trimethylsilyl-phenyl)-1-indenyl]-zirconium dichloride
Dimethylsilandiylbis[2-[(1-methylcyclononyl)methyl]-4-(4-trimethylsilyl-phenyl)-1-indenyl]-zirconium dichloride
Dimethylsilandiylbis[2-[(1-methylcyclooctyl)methyl]-4-(4-trimethylsilyl-phenyl)-1-indenyl]-zirconium dichloride
Dimethylsilandiylbis[2-[(1-ethylcyclohexyl)methyl]-4-(4-trimethylsilyl-phenyl)-1-indenyl]-zirconium dichloride
Dimethylsilandiylbis[2-[(1-ethylcyclopentyl)methyl]-4-(4-trimethylsilyl-phenyl)-1-indenyl]-zirconium dichloride
Dimethylsilandiylbis[2-[(1-ethylcycloheptyl)methyl]-4-(4-trimethylsilyl-phenyl)-1-indenyl]-zirconium dichloride
Dimethylsilandiylbis[2-[(1-ethylcyclononyl)methyl]-4-(4-trimethylsilyl-phenyl)-1-indenyl]-zirconium dichloride
Dimethylsilandiylbis[2-[(1-ethylcyclooctyl)methyl]-4-(4-trimethylsilyl-phenyl)-1-indenyl]-zirconium dichloride
Dimethylsilandiylbis[2-[(1-ethylcyclobutyl)methyl]-4-(4-trimethylsilyl-phenyl)-1-indenyl]-zirconium dichloride
Dimethylsilandiylbis[2-[(1-propylcyclohexyl)methyl]-4-(4-trimethylsilyl-phenyl)-1-indenyl]-zirconium dichloride
Dimethylsilandiylbis[2-[(1-propylcyclopentyl)methyl]-4-(4-trimethylsilyl-phenyl)-1-indenyl]-zirconium dichloride
Dimethylsilandiylbis[2-[(1-propylcycloheptyl)methyl]-4-(4-trimethylsilyl-phenyl)-1-indenyl]-zirconium dichloride
Dimethylsilandiylbis[2-[(1-propylcyclononyl)methyl]-4-(4-trimethylsilyl-phenyl)-1-indenyl]-zirconium dichloride
Dimethylsilandiylbis[2-[(1-propyl-cyclooctyl)methyl]-4-(4-trimethylsilyl-phenyl)-1-indenyl]-zirconium dichloride
Dimethylsilandiylbis[2-[(1-propylcyclobutyl)methyl]-4-(4-trimethylsilyl-phenyl)-1-indenyl]-zirconium dichloride
Dimethylsilandiylbis[2-[(1-propylcyclopropyl)methyl]-4-(4-trimethylsilyl-phenyl)-1-indenyl]-zirconium dichloride
Dimethylsilandiylbis[2-[(1-methylcyclohexyl)methyl]-4-(4-ethyl-phenyl)-1-indenyl]-zirconium dichloride
Dimethylsilandiylbis[2-[(1-methylcyclopentyl)methyl]-4-(4-ethyl-phenyl)-1-indenyl]-zirconium dichloride
Dimethylsilandiylbis[2-[(1-methylcycloheptyl)methyl]-4-(4-ethyl-phenyl)-1-indenyl]-zirconium dichloride
Dimethylsilandiylbis[2-[(1-methylcyclononyl)methyl]-4-(4-ethyl-phenyl)-1-indenyl]-zirconium dichloride
Dimethylsilandiylbis[2-[(1-methylcyclooctyl)methyl]-4-(4-ethyl-phenyl)-1-indenyl]-zirconium dichloride
Dimethylsilandiylbis[2-[(1-ethylcyclohexyl)methyl]-4-(4-ethyl-phenyl)-1-indenyl]-zirconium dichloride
Dimethylsilandiylbis[2-[(1-ethylcyclopentyl)methyl]-4-(4-ethyl-phenyl)-1-indenyl]-zirconium dichloride
Dimethylsilandiylbis[2-[(1-ethylcycloheptyl)methyl]-4-(4-ethyl-phenyl)-1-indenyl]-zirconium dichloride
Dimethylsilandiylbis[2-[(1-ethylcyclononyl)methyl]-4-(4-ethyl-phenyl)-1-indenyl]-zirconium dichloride
Dimethylsilandiylbis[2-[(1-ethylcyclooctyl)methyl]-4-(4-ethyl-phenyl)-1-indenyl]-zirconium dichloride
Dimethylsilandiylbis[2-[(1-ethylcyclobutyl)methyl]-4-(4-ethyl-phenyl)-1-indenyl]zirconium dichloride
Dimethylsilandiylbis[2-[(1-propylcyclohexyl)methyl]-4-(4-ethyl-phenyl)-1-indenyl]-zirconium dichloride
Dimethylsilandiylbis[2-[(1-propylcyclopentyl)methyl]-4-(4-ethyl-phenyl)-1-indenyl]-zirconium dichloride
Dimethylsilandiylbis[2-[1-propylcycloheptyl)methyl]-4-(4-ethyl-phenyl)-1-indenyl]-zirconium dichloride
Dimethylsilandiylbis[2-[(1-propylcyclononyl)methyl]-4-(4-ethyl-phenyl)-1-indenyl]-zirconium dichloride
Dimethylsilandiylbis[2-[(1-propylcyclooctyl)methyl]-4-(4-ethyl-phenyl)-1-indenyl]-zirconium dichloride
Dimethylsilandiylbis[2-[(1-propylcyclobutyl)methyl]-4-(4-ethyl-phenyl)-1-indenyl]-zirconium dichloride
Dimethylsilandiylbis[2-[(1-propylcyclopropyl)methyl]-4-(4-ethyl-phenyl)-1-indenyl]-zirconium dichloride
Dimethylsilandiylbis[2-[(5-methyl-1,3-dioxan-5-yl)methyl]-4-(tert-butylphenyl)-1-indenyl]-zirconium dichloride
Dimethylsilandiylbis[2-[(5-ethyl-1,3-dioxan-5-yl)methyl]-4-(tert-butylphenyl)-1-indenyl]-zirconium dichloride
Dimethylsilandiylbis[2-[(2,2,5-trimethyl-1,3-dioxan-5-yl)methyl]-4-(tert-butylphenyl)-1-indenyl]-zirconium dichloride
Dimethylsilandiylbis[2-[(2,2-dimethyl-5-ethyl-1,3-dioxan-5-yl)methyl]-4-(tert-butylphenyl)-1-indenyl]-zirconium dichloride
Dimethylsilandiylbis[2-[(3-methyl-oxetan-3-yl)methyl]-4-(tert-butylphenyl)-1-indenyl]-zirconium dichloride
Dimethylsilandiylbis[2-[(3-ethyl-oxetan-3-yl)methyl]-4-(tert-butylphenyl)-1-indenyl]-zirconium dichloride
Dimethylsilandiylbis[2-[(1-methylcyclohex-3-en-1-yl)methyl]-4-(tert-butylphenyl)-1-indenyl]-zirconium dichloride
Dimethylsilandiylbis[2-[(1-ethylcyclohex-3-en-1-yl)methyl]-4-(tert-butylphenyl)-1-indenyl]-zirconium dichloride as well as the analogous zirconiumdimethyl-compounds and zirconium-biphenolates and zirconium-bisphenolates.

Instead of the preferred pure chiral bridged racemic or pseudoracemic metallocene compounds of formulas 1 and 1a, mixtures of the metallocenes of formulas 1 and 1a and the corresponding meso or pseudomeso metallocenes may be used in the catalyst preparation. However, the preparation of the isomerically pure racemic form is especially preferred for the use of metallocenes in the polymerization of olefins to isotactic polyolefins, since the corresponding meso form may produce undesired atactic polypropylene ("PP"). The "isomerically pure" racemic form is understood to mean a rac: meso ratio of greater than 5:1 preferably of at least 10:1, more preferred of at least 15:1 and most preferred of at least 20:1.

As used herein the term "racemic" (or "rac") includes "pseudoracemic" (or "pseudorac"), and the term "meso" includes "pseudomeso."

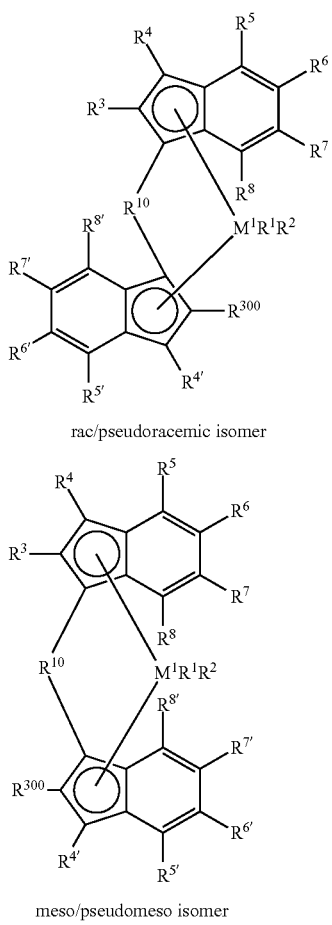

rac/pseudoracemic isomer meso/pseudomeso isomer

The present invention also includes a process for producing the transition-metal compounds of formulas 1 and 1a of the invention.

An object of the invention is thus a process for producing compounds of formula 1a,

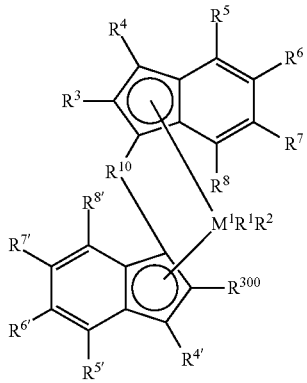

(Formula 1a)

in which the variables R and $M^1$ have the meaning specified above, including the preferred embodiments, comprising the steps of:

a) Deprotonation of the compound of formula 2:

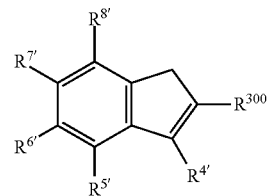

(Formula 2)

with a base, in which $R^{300}$, $R^{4'}$, $R^{5'}$, $R^{6'}$, $R^{7'}$, and $R^{8'}$ have the meaning specified above.

b) If $R^{10}$ has the meaning $M^{12}R^{40}R^{41}$, where $M^{12}$, $R^{40}$, and $R^{41}$ have the meanings specified above, then the further production proceeds by the reaction of the deprotonated compounds from step (a) with $R^{40}R^{41}M^{12}X_2$ to form the compound of formula 3 or formula 4, depending on the quantitative proportions used, where $R^{40}$, $R^{41}$, and $M^{12}$ have the meanings specified above, and X may be the same or different and means a halogen atom, preferably chlorine, bromine, or iodine, or another leaving group, preferably triflate, tosylate, or mesylate.

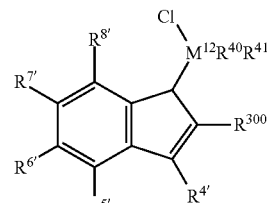

(Formula 3)

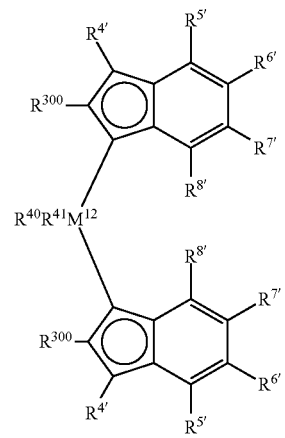

(Formula 4)

c) After the production of chlorosilane indenes or chlorogermane indenes of formula 3, these are reacted with a metal-indene compound of formula 5

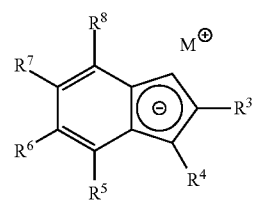

(Formula 5)

in which M stands for Li, Na, or K, and $R^3$, $R^4$, $R^5$, $R^6$, $R^7$, and $R^8$ have the meanings specified above, to obtain the compound of formula 6.

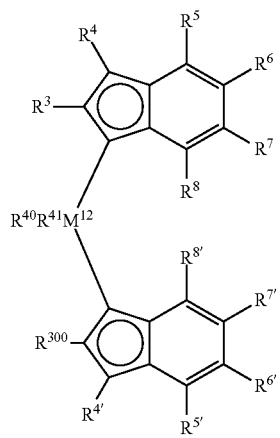

(Formula 6)

d) Reaction of the compound of formula 4 or 6 with a base and addition of $M^1Cl_4$, in which $M^1$ stands for zirconium, titanium, or hafnium, to form the compound of formula 1a.

In step (a), the compound of formula 2, for example, 2-(1-methyl-cyclohexylmethyl)-7-(4-tert-Butyl-phenyl)-1H-indene in an inert solvent, which consists of one or more aromatic or aliphatic hydrocarbons and/or one or more polar, aprotic solvents, is deprotonated with a strong base, for example, n-butyllithium. The deprotonation is carried out at temperatures of –70° C. to 80° C., and preferably 0° C. to 80° C. The resulting metal salt is then reacted directly, without further isolation, in step (b) with a silicon compound or germanium compound that contains two leaving groups. Preferential production of the compound of formula 3 or the compound of formula 4 can be achieved by adjustment of the quantitative proportions. Compounds of formula 3 are reacted in step (c) with a metal-indenyl compound of formula 5. In the following step (d), the bis(indenyl)silanes of formula 4 or 6 are doubly deprotonated with a strong base, such as n-butyllithium, in an inert solvent, which consists of one or more aromatic or aliphatic hydrocarbons and/or one or more polar, aprotic solvents, and the bislithium salt formed in this way is reacted, without isolation, directly with a source of Ti, Zr, or Hf to obtain the compound of formula 1a. The deprotonation is carried out at temperatures of –70° C. to 80° C., and preferably 0° C. to 80° C. Depending on the nature of the ligand system of formula 4 or 6, the metallocenes can be isolated either directly from the reaction mixture with rac:meso ratios or pseudo-rac:meso ratios of greater than 5:1 preferably of at least 10:1, more preferred of at least 15:1 and most preferred of at least 20:1 or further rac:meso separation steps have to be applied to reach rac:meso ratios or pseudo-rac:meso ratios of at least 5:1 preferably of at least 10:1, more preferred of at least 15:1 and most preferred of at least 20:1 to obtain a suitable catalyst.

In FIG. 1, the individual steps of the process of the invention for producing transition-metal compounds of formulas 1a are shown once again for the example of a preferred embodiment.

In addition, the present invention relates to a catalyst system comprising at least one compound of formulas 1 or 1a and at least one cocatalyst.

A suitable cocatalyst component which may be present according to the present invention in the catalyst system comprises at least one compound of the type of an aluminoxane, a Lewis acid or an ionic compound which reacts with a metallocene to convert the latter into a cationic compound.

Aluminoxanes are oligomeric or polymeric aluminum oxy compounds, which may exist in the form of linear, cyclic, caged or polymeric structures. Although the exact structure(s) of aluminoxanes is still unknown, it is well accepted that alkylaluminoxanes have the general formula 7.

$$(R\text{—}Al\text{—}O)_p$$ (Formula 7).

Examples for cyclic, linear or cage structures of aluminoxanes are depicted in the formulas 8, 9 and 10:

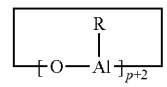

(Formula 8)

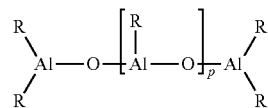

(Formula 9)

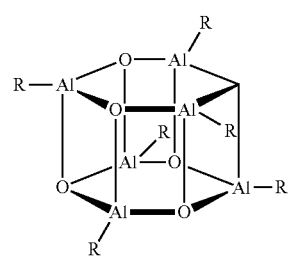

(Formula 10)

The radicals R in the formulas (7), (8), (9) and (10) can be identical or different and are each a $C_1$-$C_{20}$ group such as an alkyl group of from 1 to about 6 carbon atoms, an aryl group of from 6 to about 18 carbon atoms, benzyl or hydrogen and p is an integer from 2 to 50, preferably from 10 to 35.

Preferably, the radicals R are identical and are methyl, isobutyl, n-butyl, phenyl or benzyl, particularly preferably methyl.

If the radicals R are different, they are preferably methyl and hydrogen, methyl and isobutyl or methyl and n-butyl, with hydrogen, isobutyl or n-butyl preferably being present in a proportion of from 0.01 to 40% (number of radicals R).

The aluminoxane can be prepared in various ways by known methods. One of the methods comprises the reaction of an aluminum-hydrocarbon compound and/or a hydridoaluminum-hydrocarbon compound with water, which may be gaseous, solid, liquid or bound as water of crystallization, in an inert solvent such as toluene. To prepare an aluminoxane having different alkyl groups R, two different trialkylaluminums ($AlR_3+AlR'_3$) corresponding to the desired composition and reactivity are reacted with water, cf. S. Pasynkiewicz, Polyhedron 9 (1990) 429 and EP-A-0 302 424.

Regardless of the method of preparation, all aluminoxane solutions have in common a variable content of unreacted aluminum starting compound which is present in free form or as an adduct.

Furthermore, instead of the aluminoxane compounds of the formulas 7, 8, 9 or 10, it is also possible to use modified aluminoxanes in which the hydrocarbon radicals or hydrogen atoms have been partly replaced by alkoxy, aryloxy, siloxy or amide radicals.

The amounts of aluminoxane and metallocene used in the preparation of the supported catalyst system can be varied within a wide range. However, it has been found to be advantageous to use the metallocene compound of formulas 1 or 1a and the aluminoxane compounds in such amounts that the atomic ratio of aluminum from the aluminoxane compounds to the transition metal from the metallocene compound is in the range from 10:1 to 1000:1, preferably from 20:1 to 500:1 and in particular in the range from 30:1 to 400:1. In the case of methylaluminoxane, preference is given to using ≧30% strength toluene solutions, but the use of 10% strength solutions is also possible.

As Lewis acid, preference is given to using compounds of the formula 11

$$M^2X^1X^2X^3 \quad \text{(Formula 11)}$$

where $M^2$ is an element of Group 13 of the Periodic Table of Elements, in particular B, Al or Ga, preferably B or Al, $X^1$, $X^2$ and $X^3$ are the same or different and each are a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for $X^1$, $X^2$ and $X^3$ are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl.

Preferred Lewis acids are trimethylaluminum, triethylaluminum, triisobutylaluminum, tributylaluminum, trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl) borane, tris(tolyl)borane, tris(3,5-dimethyl-phenyl)borane, tris(3,5-difluorophenyl)borane and/or tris(3,4,5-trifluorophenyl)borane.

Particular preference is given to tris(pentafluorophenyl) borane.

As ionic cocatalysts, preference is given to using compounds which contain a non-coordinating anion such as tetrakis(pentafluorophenyl)borate, tetraphenylborate, $SbF_6^-$, $CF_3SO_3^-$ or $ClO_4^-$. Suitable counterions are either Lewis acid or Broensted acid cation.

As Broensted acids, particular preference is given to protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium, N,N-dimethylbenzylammonium, N,N-dimethylcyclohexylammonium, Suitable Lewis-acid cations are cations of the formula 12

$$[(Y^{a+})Q_1Q_2\ldots Q_z]^{d+} \quad \text{(Formula 12)}$$

where Y is an element of Groups 1 to 16 of the Periodic Table of the Elements, $Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, cycloalkyl groups of from 3 to about 10 carbon atoms, which may in turn bear alkyl groups of from 1 to about 10 carbon atoms as substitutents, halogen, alkoxy groups of from 1 to 28 carbon atoms, aryloxy groups of from 6 to 15 carbon atoms, silyl or mercaptyl groups, a is an integer from 1-6,
z is an integer from 0 to 5 and
d corresponds to the difference a-z, but d is larger than or equal to 1.

Particularly suitable cations are carbonium cations such as triphenylcarbenium, oxonium cations, sulfonium cations such as tetrahydrothiophenium, phosphonium cations such as triethylphosphonium, triphenylphosphonium and diphenylphosphonium, and also cationic transition metal complexes such as the silver cation and the 1,1'-dimethylferrocenium cation.

Preferred ionic compounds which can be used according to the present invention include:
triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tributylammoniumtetra(pentaffluorophenyl)aluminate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl) borate
N,N-dimethylaniliniumtetra(phenyl)borate,
N,N-diethylaniliniumtetra(phenyl)borate,
N,N-dimethylaniliniumtetrakis(pentafluorophenyl)borate,
N,N-dimethylaniliniumtetrakis(pentafluorophenyl)aluminate,
di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
triphenylcarbeniumtetrakis(pentafluorophenyl)aluminate,
triphenylcarbeniumtetrakis(phenyl)aluminate,
ferroceniumtetrakis(pentafluorophenyl)borate and/or
ferroceniumtetrakis(pentafluorophenyl)aluminate.

Preference is given to triphenylcarbeniumtetrakis(pentafluorophenyl)borate, N,N-dimethylcyclohexylammoniumtetrakis(pentafluorophenyl)borate or N,N-dimethylbenzylammoniumtetrakis(pentafluorophenyl)borate.

It is also possible to use mixtures of all of the above and below mentioned cation-forming compounds. Preferred mixtures comprise aluminoxanes and an ionic compound, and/or a Lewis acid.

Other useful cocatalyst components are likewise borane or carborane compounds such as
7,8-dicarbaundecaborane(13),
undecahydrido-7,8-dimethyl-7,8-dicarbaundecaborane,
dodecahydrido-1-phenyl-1,3-dicarbanonaborane,
tri(butyl)ammoniumun decahydrido-8-ethyl-7,9-dicarbaundecaborate,
4-carbanonaborane(14),
bis(tri(butyl)ammonium)nonaborate,
bis(tri(butyl)ammonium)undecaborate,
bis(tri(butyl)ammonium)dodecaborate,
bis(tri(butyl)ammonium)decachlorodecaborate,
tri(butyl)ammonium-1-carbadecaborate,
tri(butyl)ammonium-1-carbadodecaborate,
tri(butyl)ammonium-1-trimethylsilyl-1-carbadecaborate, tri(buyl)ammoniumbis(nonahydrido-1,3-dicarbanoborato)cobaltate(III), tri(butyl)ammonium bis(undecahydrido-7,8-dicarbaundecaborato)ferrate(III).

The amount of Lewis acids or ionic compounds having Lewis-acid or Broensted-acid cations is preferably from 0.1 to 20 equivalents, preferably from 1 to 10 equivalents, based on the metallocene compound of the formulas 1 or 1a.

Combinations of at least one Lewis base with bimetallic compounds of the type $R_i^{17}M^3(\text{—O-}M^3R_j^{18})_v$ or $R_i^{18}M^3(\text{—O-}M^3R_j^{17})_v$ (formula 13), as described in Patent Application WO 99/40129, are likewise important as cocatalyst systems.

In this regard, $R^{17}$ and $R^{18}$ are the same or different and represent a hydrogen atom, a halogen atom, a $C_1$-$C_{40}$ carbon-containing group, especially an alkyl group of from 1 to about 20 carbon atoms, haloalkyl of from 1 to about 20 carbon atoms, alkoxy of from 1 to about 10 carbon atoms, aryl of from 6 to about 20 carbon atoms, haloaryl of from 6 to about 20 carbon atoms, aryloxy of from 6 to about 20 carbon atoms, arylalkyl of from 7 to about 40 carbon atoms, haloarylalkyl of from 7 to about 40 carbon atoms, alkylaryl of from 7 to about 40 carbon atoms, or haloalkylaryl of from 7 to about 40 carbon atoms. $R^{17}$ may also be an —$OSiR^{51}_3$ group, in which the $R^{51}$ groups are the same or different and have the same meaning as $R^{17}$, $M^3$ is the same or different and represents an element of main group III of the periodic table of elements, i, j, and v each stands for a whole number 0, 1, or 2, and i+j+v is not equal to 0.

Suitable cocatalyst systems according to formula 13 are compounds of formulas (A) and (B)

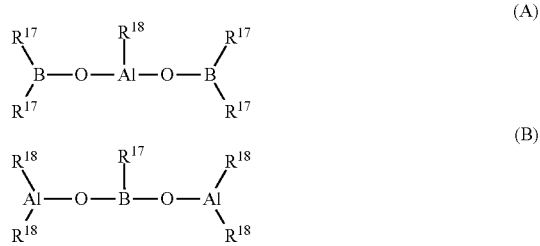

(A)

(B)

where $R^{17}$ and $R^{18}$ have the same meaning as specified above.

Furthermore, compounds that are generally to be regarded as preferred are those formed by the reaction of at least one compound of formulas (C) and/or (D) and/or (E) with at least one compound of formula (F).

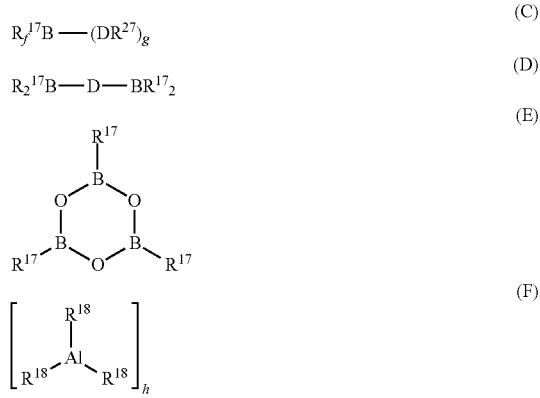

(C)

(D)

(E)

(F)

in which $R^{27}$ may be a hydrogen atom or a boron-free $C_1$-$C_{40}$ carbon-containing group, such as an alkyl of from 1 to about 20 carbon atoms, aryl of from 6 to about 20 carbon atoms, arylalkyl of from 7 to about 40 carbon atoms, and alkylaryl of from 7 to about 40 carbon atoms, and in which $R^{17}$, $R^{18}$ have the same meaning as specified above, D is an element of main Group VI of the periodic table of elements or an $NR^{61}$ group, where $R^{61}$ is a hydrogen atom or a $C_1$-$C_{20}$ hydrocarbon group, such as alkyl of from 1 to about 20 carbon atoms or aryl of from 6 to about 20 carbon atoms, f is a whole number from 0 to 3, g is a whole number from 0 to 3 where f+g corresponds to the valency of Boron, and h is a whole number from 1 to 10.

The bimetallic compounds of formula 13 are possibly combined with an organometallic compound of formula 14, i.e., $[M^4R^{19}_q]_k$, in which $M^4$ is an element of main Group I, II, or III of the periodic table of the elements, $R^{19}$ is the same or different and represents a hydrogen atom, a halogen atom, a $C_1$-$C_{40}$ carbon-containing group, an alkyl group of from 1 to about 20 carbon atoms, an aryl group of from about 6 to about 40 carbon atoms, arylalkyl of from 7 to about 40 carbon atoms, and alkylaryl of from 7 to about 40 carbon atoms, q is a whole number from 1 to 3, and k is a whole number from 1 to 4.

The organometallic compounds of formula 14 are preferably neutral Lewis acids, in which $M^4$ stands for lithium, magnesium, and/or aluminum, especially aluminum. Examples of preferred organometallic compounds of formula 14 are trimethylaluminum, triethylaluminum, triisopropylaluminum, trihexylaluminum, trioctylaluminum, tri-n-butylaluminum, tri-n-propylaluminum, triisoprene aluminum, dimethyl aluminum monochloride, aluminum monochloride, diisobutyl aluminum monochloride, methyl aluminum sesquichloride, ethyl aluminum sesquichloride, dimethyl aluminum hydride, aluminum hydride, diisopropyl aluminum hydride, dimethyl aluminum(trimethylsiloxide), dimethyl aluminum(triethylsiloxide), phenylalan, pentafluorophenylalan, and o-tolylalan.

The catalyst system of the invention contains an organoboroaluminum compound, which contains units of formula 13, as the cocatalytically active chemical compound. Compounds of formula 13 in which $M^3$ stands for boron or aluminum are preferred. The compounds that contain units of formula 13 may be present as monomers or as linear, cyclic, or cage-like oligomers. Two or more chemical compounds that contain units of formula 13 may also form dimers, trimers, or higher combinations among themselves by Lewis acid-base interactions.

Preferred cocatalytically active bimetallic compounds correspond to formulas 15 and 16,

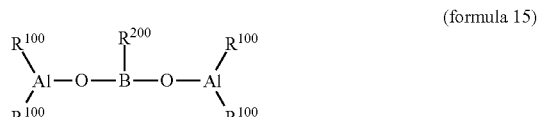

(formula 15)

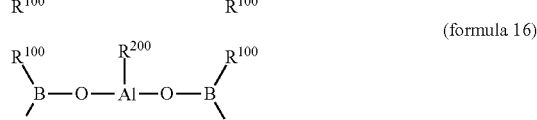

(formula 16)

in which $R^{100}$ and $R^{200}$ have the same meaning as the substituents $R^{17}$ and $R^{18}$ in formula 13.

Examples of the cocatalytically active compounds of formulas 15 and 16 are

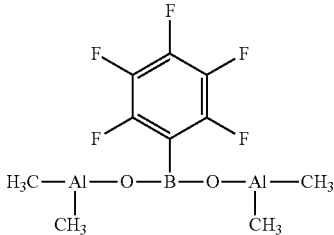

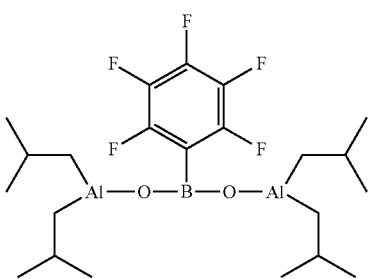

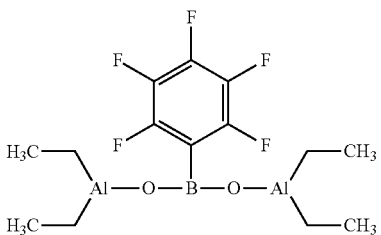

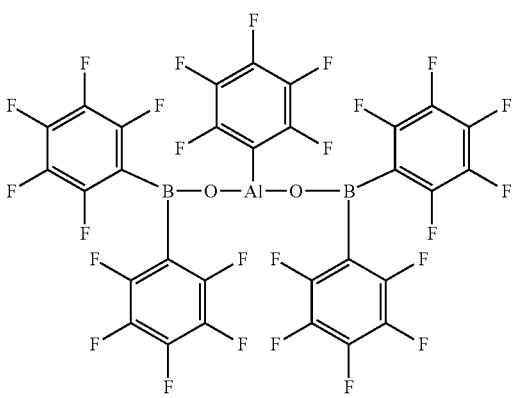

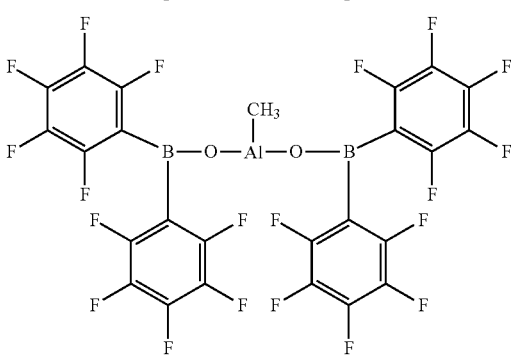

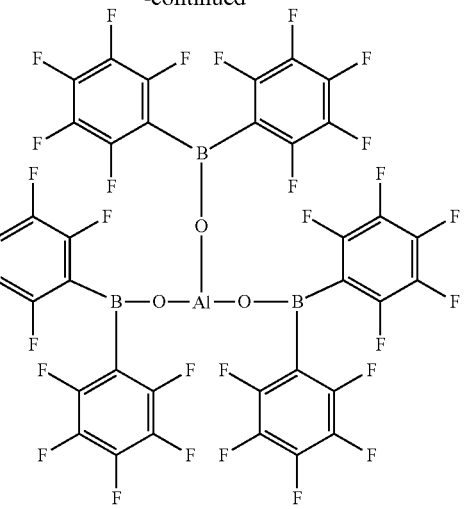

The compounds named in EP-A-924,223, DE 196 22 207.9, EP-A-601,830, EP-A-824,112, EP-A-824,113, WO 99/06,414, EP-A-811,627, WO 97/11,775, DE 196 06 167.9 and DE 198 04 970 can be used as additional cocatalysts, which may be present in unsupported or supported form.

The amount of cocatalysts of formula 13 and/or 15 and/or 16 used in the catalyst of the present invention can vary from 0.1 to 500 equivalents, preferably from 1 to 300 equivalents, most preferably from 5 to 150 equivalents, based on the used amount of metallocene compound of the formulas 1 or 1a.

The catalyst system of the present invention can further comprise, as additional component, a metal compound of the formula 17, $$M^5(R^{22})_r(R^{23})_s(R^{24})_t \qquad \text{(Formula 17)}$$

wherein
$M^5$ is an alkali, an alkali earth metal or a metal of Group 13 of the Periodic Table of the Elements,
$R^{22}$ is a hydrogen atom, alkyl of from 1 to about 10 carbon atoms, aryl of from 6 to about 15 carbon atoms, or alkylaryl or arylalkyl each having from 1 to 10 carbon atoms in the alkyl part and from 6 to 20 carbon atoms in the aryl part,
$R^{23}$ and $R^{24}$ are each a hydrogen atom, a halogen atom, alkyl of from 1 to about 10 carbon atoms, $C_6$-$C_{15}$-aryl of from about 6 to about 15 carbon atoms, or alkylaryl, arylalkyl or alkoxy each having from 1 to 10 carbon atoms in the alkyl part and from 6 to 20 carbon atoms in the aryl radical,
r is an integer from 1 to 3 and s and t are integers from 0 to 2, where the sum r+s+t corresponds to the valency of $M^5$,
where this component is not identical with the above mentioned cocatalyst compounds. It is also possible to use mixtures of various metal compounds of the formula 17.

Among the metal compounds of the formula 17 preference is given to those in which $M^5$ is lithium, magnesium or aluminum and $R^{23}$ and $R^{24}$ are each alkyl of from 1 to about 10 carbon atoms. Particularly preferred metal compounds of the formula 17 are n-butyllithium, n-butyl-n-octyl-magnesium, n-butyl-n-heptylmagnesium, tri-n-hexylaluminum, triisobutylaluminum, triethylaluminum, trimethylaluminum or mixtures thereof.

If a metal compound of the formula 17 is used, it is preferably present in the catalyst system in such an amount that the molar ratio of $M^5$ to the transition metal from the metallocene compound of formulas 1 or 1a is from 800:1 to 1:1, in particular from 200:1 to 2:1.

The support component of the catalyst system of the present invention can be any organic or inorganic inert solid or a mixture of such solids, in particulate porous solids such as hydrotalcites, talc, inorganic oxides and finely divided polymer powders.

Suitable inorganic oxides, which are preferably employed include from the Periodic Table of Elements Groups 1, 2, 3, 4, 5, 12, 13 and 14, metal oxides such as silicon dioxide, aluminum oxide, aluminosilicates, zeolites, MgO, $ZrO_2$, $TiO_2$ or $B_2O_3$, CaO, ZnO, $ThO_2$, $Na_2O$, $K_2O$, $LiO_2$ or mixed oxides like Al/Si oxides, Mg/Al oxides or Al/Mg/Si oxides. Other suitable inorganic support materials are $Na_2CO_3$, $K_2CO_3$, $CaCO_3$, $MgCl_2$, $Na_2SO_4$, $Al_2(SO_4)_3$, $BaSO_4$, $KNO_3$, $Mg(NO_3)_2$ and $Al(NO_3)_3$.

Suitable polymer powders are homopolymers, copolymers, crosslinked polymers or polymer blends. Examples of such polymers are polyethylene, polypropylene, polybutene, polystyrene, divinylbenzene-crosslinked polystyrene, polyvinyl chloride, acrylonitrile-butadiene-styrene copolymer, polyamide, polymethacrylate, polycarbonate, polyester, polyacetal or polyvinyl alcohol.

The preferred support materials have a specific surface area in the range from 10 to 1000 $m^2/g$, a pore volume in the range from 0.1 to 5 $cm^3/g$ and a mean particle size of from 1 to 500 μm. Preference is given to supports having a specific surface area in the range from 50 to 500 $m^2/g$, a pore volume in the range from 0.5 to 3.5 $cm^3/g$ and a mean particle size in the range from 5 to 250 μm. Particular preference is given to supports having a specific surface area in the range from 200 to 400 $m^2/g$, a pore volume in the range from 0.8 to 3.0 $cm^3/g$ and a mean particle size of from 10 to 100 μm.

The support materials can be thermally and/or chemically be pretreated in order to adjust certain properties of the carrier such as the water and/or the hydroxyl group content.

If the support material has a low moisture content or residual solvent content, dehydration or drying before use can be omitted. If this is not the case, as when using silica gel as support material, dehydration or drying is advisable. Thermal dehydration or drying of the support material can be carried out under reduced pressure with or without simultaneous inert gas blanketing (nitrogen). The drying temperature is in the range from 80° C. to 1000° C., preferably from 150° C. to 800° C. and most preferred from 150° C. to 400° C. The duration of the drying process can be from 1 to 24 hours. But shorter or longer drying periods are also possible.

In a preferred embodiment of the present invention, support materials with a weight loss on dryness (LOD) of 0.5 wt. % or less, and even more preferred with a LOD of 0.3 wt % or less are used. Higher amounts of physically adsorbed water up to 1 wt % are possible, but result in reduced catalyst activities. The loss on ignition (LOI) of the support material is preferably 1 wt % or greater or even more preferred between 1.5 and 3.5 wt %.

In addition or alternatively, dehydration or drying of the support material can also be carried out by chemical means, by reacting the adsorbed water and/or the surface hydroxyl groups with suitable passivating agents. Reaction with the passivating reagent can convert the hydroxyl groups completely or partially into a form, which does not show any adverse interaction with the catalytically active centers. Suitable passivating agents are silicon halides, silanes or amines, eg. silicon tetrachloride, chlorotrimethylsilane, dichlorodialkylsilanes, dimethylaminotrichlorosilane, N,N-dimethylanilin or N,N-dimethylbenzylamine or organometallic compounds of aluminum, boron and magnesium, eg. aluminoxanes, trimethylaluminum, triethylaluminum, triisobutylaluminum, diisobutylaluminum hydride, triethylborane or dibutylmagnesium.

As outlined above, organic support materials such as finely divided polymer powders, can also be used and should, before use, likewise be freed from any adhering moisture, solvent residues or other impurities by means of appropriate purification and drying operations.

Preference is given to using silica gels having the defined parameters as support materials. Spray dried silica grades, which inherently exhibit meso and macro pores, cavities and channels are preferred over granular silica grades.

The supported catalyst system according to this invention can be made in various ways.

In one embodiment of the present invention, at least one of the above-described metallocene components of formulas 1 or 1a is brought into contact in a suitable solvent with at least one cocatalyst component, preferably giving a soluble reaction product, an adduct or a mixture. The obtained composition is mixed with the dehydrated or passivated support material, the solvent is removed and the resulting supported metallocene catalyst system is dried to ensure that the solvent is completely or mostly removed from the pores of the support material. The supported catalyst is obtained as a free-flowing powder.

As an example, the process for preparing a free-flowing and, if desired, prepolymerized supported catalyst system comprises the following steps:

a) preparing a metallocene/cocatalyst mixture in a suitable solvent or suspension medium, where the metallocene component has one of the above-described structures, b) applying the metallocene/cocatalyst mixture to a porous, preferably inorganic, if necessary thermally or chemically pretreated support, c) removing the major part of solvent from the resulting mixture, d) isolating the supported catalyst system and e) if desired, prepolymerizing the resulting supported catalyst system with one or more olefinic monomer(s), to obtain a prepolymerized supported catalyst system.

In another embodiment of this invention the metallocene/cocatalyst composition is mixed with the dehydrated or passivated support material, the supported catalyst is recovered and optionally washed with an aromatic hydrocarbon and/or paraffinic hydrocarbon solvent. The isolated catalyst is then dispersed in a non-reactive suspension media such as a paraffinic hydrocarbon solvent, a mineral oil or a wax or mixtures thereof.

In a further embodiment of this invention the catalyst is prepared according to the procedure disclosed in WO 06/60544 (an application by the present inventors), WO 00/05277, WO 98/01481, U.S. Pat. No. 7,355,058, U.S. Pat. No. 7,193,100, U.S. Pat. No. 6,492,292, U.S. Pat. No. 6,107, 230 or U.S. Pat. No. 6,355,594 using at least one compound of formulas 1 or 1a as the metallocene component.

As an example, in WO 06/60544, a free flowing and, if desired, prepolymerized supported catalyst system is prepared comprising the following steps:

a) contacting at least one support material with a first portion of at least one co-catalyst in a suitable solvent b) impregnating the co-catalyst loaded support with a suspension or solution, which comprises at least one metallocene and a second portion of at least one co-catalyst in a suitable solvent c) isolating the supported catalyst system and f) if desired, prepolymerizing the resulting supported catalyst system with one or more olefinic monomer(s), to obtain a prepolymerized supported catalyst system.

Thus, as an example, the process according to WO 06/60544 for preparing a free-flowing and, if desired, prepolymerized supported catalyst system comprises the following steps:

a) Contacting a support material with a first composition which includes at least one aluminoxane in a first solvent at a temperature of about 10 to 30° C. followed by keeping the mixture at about 20° C. for 0 to 12 hours, subsequently heating the resulting mixture to a temperature of 30 to 200° C. and keeping the mixture at 30 to 200° C. for 30 minutes to 20 hours, optionally followed by removing all or part of the first solvent and/or optionally followed by one or more washing step(s) using a suitable solvent, b) Suspending and/or dissolving, respectively, at least one metallocene of formula 1 and/or 1a and a second portion of an aluminoxane or of a mixture of aluminoxanes or of an ionic compound and/or a Lewis acid in a second solvent or suspension medium at a temperature of 0 to 100° C., optionally followed by a preactivation time of 1 minute to 200 hours at a temperature of 10 to 100° C., c) Applying the mixture prepared in b) to the aluminoxane loaded support material produced in a), at a temperature of 10 to 100° C. and a contact time of 1 minute to 24 hours, d) Removing the major part of the solvent from the resulting mixture and optionally washing the resulting supported catalyst with a suitable solvent, e) Isolating the supported catalyst system and f) Optionally prepolymerizing the resulting supported catalyst system with one or more olefinic monomer(s), to obtain a prepolymerized supported catalyst system.

More specifically, as an example, the process according to WO 06/60544 for preparing a free-flowing and, if desired, prepolymerized supported catalyst system comprises the following steps:

the process for preparing a free-flowing supported catalyst system according to the present invention comprises the following steps:

a) Contacting a support material with a first composition which includes at least 5 mmol of an aluminoxane or of a mixture of aluminoxanes per g support material in a first solvent at a temperature of about 20° C. followed by keeping the mixture at about 20° C. for 0.15 to 2 hours, subsequently heating the resulting mixture to a temperature of 50 to 160° C. and keeping the mixture at 50 to 160° C. for 1 to 6 hours, optionally followed by removing all or part of the first solvent and/or optionally followed by one or more washing step(s) using a suitable solvent, b) Suspending and/or dissolving, respectively, at least 0.5 mmole of a second portion of an aluminoxane or of a mixture of aluminoxanes per g support material and at least 0.1 mol % of the employed second portion of an aluminoxane or of a mixture of aluminoxanes per g support material of at least one metallocene of formula 1 and/or 1a in a second solvent or suspension medium at a temperature of 20 to 50° C., optionally followed by a preactivation time of 1 minute to 200 hours at a temperature of 20 to 30° C., c) Applying the mixture prepared in b) to the aluminoxane loaded support material produced in a), at a temperature of 10 to 100° C. and a contact time of 1 minute to 24 hours, d) Removing the major part of the solvent from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a preferred embodiment, as an example, the process according to WO 06/60544 for preparing a free-flowing and, if desired, prepolymerized supported catalyst system comprises the following steps:

a) Contacting an optionally thermally pretreated silica support material with at least 10 mmol of an aluminoxane per g support material in toluene at a temperature of about 20° C. followed by subsequently heating the resulting mixture to a temperature of 50 to 110° C. and keeping the mixture at 50 to 110° C. for 1 to 6 hours, optionally followed by removing all or part of the toluene, and/or optionally followed by one or more washing step(s) using a suitable solvent, b) Suspending and/or dissolving, respectively, at least 0.5 mmole of a second portion of an aluminoxane per g support material and at least 0.1 mol % of the employed second portion of an aluminoxane or of a mixture of aluminoxanes per g support material of at least one metallocene of formula 1 and/or 1a in toluene at a temperature of 20 to 50° C., optionally followed by a preactivation time of 1 minute to 200 hours at a temperature of 20 to 30° C., c) Applying the mixture prepared, in b) to the aluminoxane loaded support material produced in a), at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a more preferred embodiment, as an example, the process according to WO 06/60544 for preparing a free-flowing and, if desired, prepolymerized supported catalyst system comprises the following steps:

a) Contacting an optionally thermally pretreated silica support material with a weight loss on dryness (LOD) of 0.5 wt. % or less and a weight loss on ignition (LOI) of 1.0 wt. % or greater with a first composition which includes at least 10 mmol of methylaluminoxane per g support material in toluene at a temperature of about 20° C. followed by subsequently heating the resulting mixture to a temperature of 110° C. and keeping the mixture at 110° C. for 1 to 6 hours, optionally followed by removing all or part of the toluene, and/or optionally followed by one or more washing step(s) using a suitable solvent, b) Suspending and/or dissolving, respectively, at least 1 mmole of a second portion of methylaluminoxane per g support material and at least 0.1 mol % of the employed second portion of methylaluminoxane per g support material of at least one metallocene of formula 1 and/or 1a in toluene at a temperature of 20 to 50° C., optionally followed by a preactivation time of 1 minute to 200 hours at a temperature of 20 to 30° C., c) Applying the mixture prepared in b) to the methylaluminoxane loaded support material produced in a), by passing the impregnation suspension or solution b) through the methylaluminoxane loaded support material in a direct flow or by using an incipient wetness impregnation technique, where the volume of the impregnation suspension or solution or the total liquid volume used in the impregnation step, respectively, does not exceed 250% of the total pore volume of the support material, at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a particular preferred embodiment, as an example, the process according to WO 06/60544 for preparing a free-flowing and, if desired, prepolymerized supported catalyst system comprises the following steps:

a) Contacting an optionally thermally pretreated silica support material with a weight loss on dryness (LOD) of 0.3 wt. % or less and a weight loss on ignition (LOI) between 1.5 and 3.5 wt. %, with at least 10 mmol of methylaluminoxane per g support material in toluene at a temperature of about 20° C. followed by subsequently heating the resulting mixture to a temperature of 110° C. and keeping the mixture at 110° C. for 1 to 6 hours, optionally followed by removing all or part of the toluene, and/or optionally followed by one or more washing step(s) using a suitable solvent, b) Suspending and/or dissolving, respectively, at least 1 mmole of a second portion of methylaluminoxane per g support material and at least 0.1 mol % of the employed second portion of methylaluminoxane per g support material of at least one metallocene of formula 1a in toluene at a temperature of 20 to 50° C., optionally followed by a preactivation time of 1 minute to 200 hours at a temperature of 20 to 30° C., c) Applying the mixture prepared in b) to the methylaluminoxane loaded support material produced in a), by passing the impregnation suspension or solution b) through the aluminoxane loaded support material a) in a direct flow or by using an incipient wetness impregnation technique, where the volume of the impregnation suspension or solution or the total liquid volume used in the impregnation step, respectively, does not exceed 250% of the total pore volume of the support material, at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

According to the present invention, for preparing a free-flowing and, if desired, prepolymerized supported catalyst system, in step b) of the catalyst preparations as mentioned above, instead of an aluminoxane or a mixture of aluminoxanes, at least one alkyl compound of elements of main Groups I to III of the Periodic Table, for example a magnesium alkyl, a lithium alkyl or an aluminum alkyl like trimethylaluminum, triethylaluminum, triisobutyllaluminum, triisopropylaluminum, trihexylaluminum, trioctylaluminum, tri-n-butylaluminum, tri-n-propylaluminum, triisoprene aluminum, dimethyl aluminum monochloride, aluminum monochloride, diisobutyl aluminum monochloride, methyl aluminum sesquichloride, ethyl aluminum sesquichloride, dimethyl aluminum hydride, aluminum hydride, diisopropyl aluminum hydride, dimethyl aluminum(trimethylsiloxide), dimethyl aluminum (triethylsiloxide), phenylalan, pentafluorophenylalan, and o-tolylalan, can be used. Preferred aluminum alkyls are trimethylaluminum, triethylaluminum, tri isobutylaluminum.

In an even further embodiment of the present invention a free flowing and, if desired, prepolymerized supported catalyst system is prepared comprising the following steps:

a) preparing a trialkylaluminium/borinic acid mixture in a suitable solvent or suspension medium b) applying the trialkylaluminium/borinic acid mixture to a porous, preferably inorganic, if necessary thermally or chemically pretreated support which was prior treated with a base like N,N-diethylbenzylamine, N,N-dimethylbenzylamine, N-benzyldimethylamine, N-benzyldiethylamine, N-benzylbutylamine, N-benzyl tertbutylamine, N-benzylisopropylamine, N-benzylmethylamine, N-benzylethylamine, N-benzyl-1-phenylethylamine, N-benzyl-2-phenylethylamine, N,N-dimethylbenzylamine, N,N-diethylbenzylamine, N-methyl-N-ethylbenzylamine, N-methyldibenzylamine and N-ethyldi(benzyl)amine, c) removing the major part of solvent from the resulting mixture to obtain a supported cocatalyst, d) preparing a metallocene/supported cocatalyst mixture in a suitable solvent or suspension medium, where the metallocene component has one of the above-described structures, e) isolating the supported catalyst system and f) if desired, prepolymerizing the resulting supported catalyst system with one or more olefinic monomer(s), to obtain a prepolymerized supported catalyst system.

Preferred solvents for the preparation of the metallocene/cocatalyst mixture are hydrocarbons and hydrocarbon mixtures, which are liquid at the selected reaction temperature and in which the individual components preferably dissolve. The solubility of the individual components is, however, not a prerequisite as long as it is ensured that the reaction product of metallocene and cocatalyst components is soluble in the solvent selected. Suitable solvents are alkanes such as pentane, isopentane, hexane, isohexane, heptane, octane and nonane, cycloalkanes such as cyclopentane and cyclohexane and aromatics such as benzene, toluene, ethylbenzene and diethylbenzene. Very particular preference is given to toluene, heptane and ethyl benzene.

For a preactivation, the metallocene in the form of a solid is dissolved in a solution of the cocatalyst in a suitable solvent. It is also possible to dissolve the metallocene separately in a suitable solvent and subsequently to combine this solution with the cocatalyst solution. Preference is given to using toluene. The preactivation time is from 1 minute to 200 hours. The preactivation can take place at room temperature of 25° C. In individual cases, the use of higher temperatures can reduce the required preactivation time and give an additional increase in activity. Elevated temperatures in this case refer to a range from 25° C. to 100° C.

The preactivated solution or the metallocene/cocatalyst mixture is subsequently combined with an inert support material, usually silica gel, which is in the form of a dry powder or as a suspension in one of the above mentioned solvents. The support material is preferably used as powder. The preactivated metallocene/cocatalyst solution or the metallocene/cocatalyst mixture can be either added to the initially charged support material, or else the support material can be introduced into the initially charged solution.

The volume of the preactivated solution or the metallocene/cocatalyst mixture can exceed 100% of the total pore volume of the support material used or else be up to 100% of the total pore volume.

The temperature at which the preactivated solution or the metallocene/cocatalyst mixture is brought into contact with the support material can vary within the range from 0° C. to 100° C. However, lower or higher temperatures are also possible.

While the solvent is completely or mostly removed from the supported catalyst system, the mixture can be stirred and, if desired, also heated. Preferably, both the visible portion of the solvent and the portion in the pores of the support material are removed. The removal of the solvent can be carried out in a conventional way using reduced pressure and/or purging with inert gas. During the drying process, the mixture can be heated until the free solvent has been removed, which usually takes from 1 to 3 hours at a preferred temperature of from 30° C. to 60° C. The free solvent is the visible portion of the solvent in the mixture. For the purposes of the present invention, residual solvent is the portion present in the pores.

As an alternative to the complete removal of the solvent, the supported catalyst system can also be dried until only a certain residual solvent content is left, with the free solvent having been completely removed. Subsequently, the supported catalyst system can be washed with a low-boiling hydrocarbon such as pentane or hexane and dried again.

The supported catalyst system prepared according to the present invention can be used either directly for the polymerization of olefins or be prepolymerized with one or more olefinic monomers, with or without the use of hydrogen as molar mass regulating agent, prior to use in a polymerization process. The procedure for the prepolymerization of supported catalyst systems is described in WO 94/28034.

As additive, it is possible to add, during or after the preparation of the supported catalyst system, a small amount of an olefin, preferably an alpha-olefin such as styrene or phenyldimethylvinylsilane as activity-increasing component or an antistatic, as described in U.S. Ser. No. 08/365,280. The molar ratio of additive to metallocene component of formulas 1 or 1a is preferably from 1:1000 to 1000:1, very particularly preferably from 1:20 to 20:1.

The present invention also provides a process for preparing a polyolefin by polymerization of one or more olefins in the presence of the catalyst system of the present invention comprising at least one transition metal component of the formulas 1 or 1a. For the purposes of the present invention, the term polymerization refers to both homopolymerization and copolymerization and the term copolymerization includes terpolymerisation or copolymerisation of more than three different monomers.

Preference is given to polymerizing olefins of the formula $R'''$—CH=CH—$R''$, where $R'''$ and $R''$ are identical or different and are each a hydrogen atom or a radical having from 1 to 20 carbon atoms, in particular from 1 to 10 carbon atoms, and $R'''$ and $R''$ together with the atoms connecting them can form one or more rings.

Suitable olefins are 1-olefins, eg. ethene, propene, 1-butene, 1-pentene, 1-hexene, 4-methyl-1-pentene or 1-octene, styrene, dienes such as 1,3-butadiene, 1,4-hexadiene, vinylnorbornene, norbornadiene, ethylnorbornadiene and cyclic olefins such as norbornene, tetracyclododecene or methylnorbornene. In the process of the present invention, preference is given to homopolymerizing propene or ethene or copolymerizing propene with ethene and/or one or more 1-olefins having from 4 to 20 carbon atoms, eg. 1-butene or hexene, and/or one or more dienes having from 4 to 20 carbon atoms, eg. 1,4-butadiene, norbornadiene, ethylidenenorbornene or ethylnorbornadiene. Very suitable copolymers are ethene-propene copolymers, propene-1-pentene copolymers and ethene-propene-1-butene, ethene-propene-1-pentene or ethene-propene-1,4-hexadiene terpolymers.

The polymerization is carried out at from −60° C. to 300° C., preferably from 50° C. to 200° C., very particularly preferably from 50° C. to 95° C. The pressure is from 0.5 to 2000 bar, preferably from 5 to 100 bar.

The polymerization can be carried out in solution, in bulk, in suspension or in the gas phase, continuously or batchwise, in one or more stages. As an example, impact copolymers are preferably produced in more than one stage. The homopolymer or random copolymer content of such a polymer can be produced in (a) first stage(s) and the copolymer rubber content can be produced in (a) consecutive stage(s).

The supported catalyst system prepared according to the present invention can be used as sole catalyst component for the polymerization of olefins or preferably in combination with at least one alkyl compound of elements of main Groups I to III of the Periodic Table, for example an aluminum alkyl, magnesium alkyl or lithium alkyl or an aluminoxane. The alkyl compound is added to the monomer or suspension medium and serves to free the monomer of substances, which can impair the catalytic activity. The amount of alkyl compound added depends on the quality of the monomers used.

To prepare olefin polymers having a broad or bimodal molecular weight distribution or a broad or bimodal melting range, it is recommended to use a catalyst system comprising two or more different metallocenes and/or two or more different cocatalysts. Alternatively two or more different catalyst systems of the present invention can be used as a mixture.

As molar mass regulator and/or to increase the activity, hydrogen is added if required.

The catalyst system may be supplied to the polymerization system as a solid or in the form of a paste or suspension in a hydrocarbon or may be treated with inert components, such as paraffins, oils, or waxes, to achieve better metering. If the catalyst system is to be metered into the reactor together with the monomer to be polymerized or the monomer mixture to be polymerized, the mixing unit and the metering line are preferably cooled.

Furthermore, an additive such as an antistatic or an alcohol can be used in the process of the present invention, for example to improve the particle morphology of the olefin polymer. In general it is possible to use all antistatics which are suitable in olefin polymerization processes. It is preferred to dose the antistatic directly into the polymerization system, either together with or separately from the catalyst system used.

The polymers prepared using the catalyst systems of the present invention display an uniform particle morphology and contain no fines. No agglomerates or deposits are obtained in the polymerization using the catalyst system of the present invention.

The catalyst systems of the present invention give polymers such as polypropylene having high molecular weight and cover a broad range of stereospecificity and regiospecificity.

The copolymers which can be prepared using the catalyst system based on metallocenes of formula 1 or 1a of the present invention have a significantly higher molar mass compared to the prior art. At the same time, such copolymers can be prepared using the catalyst system of the present invention at a high productivity and at industrially relevant process parameters without deposit formation.

The polymers prepared by the process of the present invention are suitable, in particular, for producing products such as fibers, filaments, injection-molded parts, films, sheets, caps, closures, bottles or large hollow bodies such as pipes with excellent properties.

EXAMPLES

General Procedures

The preparation and handling of the organometallic compounds were carried out under argon using Schlenk techniques or in a glove box. All solvents were purged with argon and dried over molecular sieves before use.

The metallocenes produced were characterized by $^1$H-NMR spectroscopy using a Bruker DMX 500 spectrometer, operating at 500 MHz using $CDCl_3$ as the solvent.

The polymers produced were characterized by $^1$H-NMR, $^{13}$C-NMR, DSC, GPC, TREF/ATREF, Melt Flow Rate and IR spectroscopy.

1. Gel Permeation Chromatography (GPC), Determination of Mw and Mw/Mn

A Waters Alliance/GPCV2000 equipped with a refractometer, a triple capillary online viscometer (Waters Corporation, 34 Maple Street, Milford, Mass., 01757 USA) and a light scattering detector PD 2040 (Precision Detectors Inc., 34 Williams Way, Bellingham, Mass., USA) was used for the determination of the molar mass data of the samples. 0.05 wt % solutions of the samples in 1,2,4-trichlorobenzene were analyzed at a temperature of 145° C. using a Mixed B light scattering quality column (Polymer Labs 1110-6100LS) and a Mixed B guard column (Polymer Labs 1110-1120). Weight average molar mass (Mw) and the ratio of weight average molar mass to number average molar mass (Mw/Mn) were calculated using the Cumulative Matching % Broad Standard procedure that is available in the Waters Millenium 3.2 GPC software module.

2. NMR Spectroscopy of Polymers

Samples were prepared by weighing 0.32 g of polymer into 2.5 ml of a 1,2,4-trichlorobenzene/deuterobenzene-d6 (4:1 volume) mixture. Samples were heated to 125° C. and mixed until a homogeneous solution was formed (typically 1-4 hours). Spectra were obtained at 120° C. on a Varian Inova 500 instrument (Varian Inc., 3120 Hansen Way, Palo Alto, Calif., 94304, USA) operating at a $^{13}$C-spectrometer frequency of 125.7 MHz and using a 10 mm probe. Spectra were obtained using 5000 scans employing a π/2 pulse of 10.0 μs, a recycle delay of 10.0 s and an acquisition time of 2.5 s. Waltz-16 decoupling remained on throughout the pulse sequence to gain the signal to noise enhancement due to the effects of nOe (Nuclear Overhauser enhancement). Spectra were processed with 1 Hz of line broadening. The mmmm peak in the methyl region of the spectrum was used as an internal chemical shift reference and was set to 21.85 ppm.

3. Differential Scanning Calorimetry (DSC), Determination of the Polymer Melting Point Tm DSC measurements were carried out using a Mettler Toledo DSC 822e (Mettler-Toledo Inc., 1900 Polaris Parkway, Columbus, Ohio, 43240, USA). 4 mg of sample were weighed into a standard aluminum pan and subjected to the following temperature schedule:

The samples were heated from room temperature to 220° C. at a heating rate of 20° C./min, maintained at this temperature for 5 min, then cooled down to −55° C. at a cooling rate of 20° C./min, maintained at the same temperature for 5 min, then heated to 220° C. at a heating rate of 20° C./min. The melting point was determined from the second heating run as the temperature where the main peak was observed in the curve.

4. Melt Flow Rate (MFR)

The MFR of the samples were determined according to ISO 1133 at 230° C. Two different loads were used: 2.16 kg and 5 kg. Values are reported as MFR(230/2.16) and MFR (230/5), respectively.

5. Productivity

The productivity of a catalyst is determined by dividing the produced mass of polypropylene by the mass of catalyst used and the reaction time.

6. Yield

The yield of a sample is determined by dividing the isolated amount of the desired product divided by the theoretical achievable amount of the product.

The following abbreviations are employed:
PP=polypropylene
MC=metallocene
Cat=supported catalyst system
h=hour
$T_g$=glass transition temperature in ° C., determined by differential scanning calorimetry (DSC, conditions see above)

7. Loss on Dryness (LOD)/Loss on Ignition CLOÏ\

The Loss on Dryness and the Loss on Ignition are determined by thermogravimetric measurement. The Loss on Dryness is the weight loss that the support material experiences by heating it from room temperature to 300° C. and keeping this temperature until a constant weight is obtained. Loss on Dryness is that weight loss as expressed as percentage of the weight of the original support material. Subsequently the support material is heated from 300° C. to 1000° C. and is kept at this temperature until a constant weight is obtained. The Loss of Ignition is defined as the weight loss between the weight of the sample at 1000° C. and at room temperature expressed as a percentage of the weight of the original support material.

As an example to illustrate the above, a 10 gram sample (at room temperature) is heated to 300 C where it maintains a constant weight at that temperature of 9 grams. The Loss on Dryness is 10.0%, which is:

$$100 \times \left( \frac{(10-9)}{10} \right)$$

The sample is then further healed to 1000 C where it maintains a constant weight of 8.37 grams. The Loss on Ignition is 16.3%, which is:

$$100 \times \left( \frac{(10-8.37)}{10} \right)$$

Synthesis of Metallocenes

Comparative Example 1

Dimethylsilandiylbis[2-(cyclohexylmethyl)-4-(4-tert-butylphenyl)-1-indenyl]-zirconium dichloride (2-Bromo-ethyl)-cyclohexane

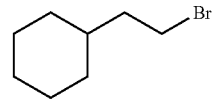

In a 1 l-roundbottom flask equipped with a reflux condenser 164 g concentrated sulphuric acid and 200 g hydrobromic acid (48% in water) were added subsequently under cooling with an ice bath to 88.7 g (0.693 mole) 2-cyclohexyl-ethanol. The mixture was refluxed for 6 h and after cooling to room temperature it was poured onto 400 g of ice. The aqueous phase was extracted with 400 ml pentane. The organic layer was washed with a 2 M NaOH-solution and with water, dried over magnesium sulphate, and the solvent was removed in vacuo. The product was distilled in vacuo to yield 1112.7 g (85%) of (2-bromo-ethyl)-cyclohexane as a colourless oil $^1$H-NMR (4-MHz, CDCl$_3$): δ=3.40 (2H, t, CH$_2$Br), 1.73-1.61 (m, 7H), 1.44 (m, 1H), 1.26-1.11 (m, 3H), 0.92-0.84 (m, 2H) ppm.

1-(2-Chloro-phenyl)-3-cyclohexyl-propan-1-one

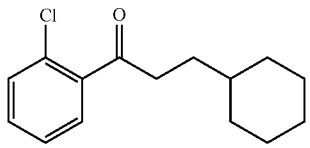 [SMILES: O=C(CCC1CCCCC1)c1ccccc1Cl]

15.57 g (640 mmole) Magnesium turnings were placed in a 1 l-roundbottom flask equipped with a dropping funnel and a reflux condenser, and 50 ml of tetrahydrofuran (THF) were added. The magnesium was etched slightly with a few crystals of iodine and then 2 g of (2-bromo-ethyl)-cyclohexane were added and the mixture was heated locally. After the start of the Grignard-formation the rest of the (2-bromo-ethyl)-cyclohexane in 350 ml of THF (112.65 g in total, 589 mmole) were added within a period of 20 min. The mixture was refluxed for 1.5 h and then cooled to room temperature. In a separate 2 l-roundbottom flask 70.5 g (5.13 mmole) of 2-chloro-benzonitrile and 156 mg (0.16 mole %) copper(I) iodide were dissolved in 130 ml of THF. The Grignard-solution was added dropwise over a period of 30 min and the reaction mixture was refluxed for 3 h. After standing overnight at room temperature, a mixture of 190 ml water and 127 ml concentrated hydrochloric acid were added very carefully, causing a strongly exothermic reaction. The mixture was stirred at 50° C. for 1 h and the layers were separated. The aqueous layer was extracted twice with 150 ml of toluene each. The combined organic layers were washed twice with 2 M sulphuric acid, once with a saturated sodium bicarbonate solution and once with a saturated sodium chloride solution. After drying over magnesium sulphate the solvent was evaporated in vacuo to yield 133.5 g (quant.) of the desired phenone as slightly brown oil. $^1$H-NMR (400 MHz, CDCl$_3$): δ=7.41-7.14 (m, 4H, aromatic), 2.91 (t, 2H, COCH$_2$), 1.71-1.55, 1.28-1.10, 0.93-0.85 (3×m, 13H) ppm.

7-Chloro-2-cyclohexylmethyl-indan-1-one

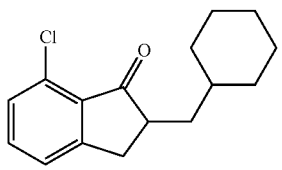 [SMILES: O=C1c2c(Cl)cccc2CC1CC1CCCCC1]

66 g (263 mmole) 1-(2-Chloro-phenyl)-3-cyclohexyl-propan-1-one, 77.5 g (2.1 eq.) urotropine and 72.6 g (2.7 eq.) of acetic anhydride were placed in a 500 ml roundbottom flask and the mixture was stirred at 80° C. for 4 h. Then 100 ml water and 100 ml 2M NaOH were added and the mixture was extracted two times with 200 ml dichloromethane each. The organic layer was washed two times with 100 ml saturated aqueous ammonium chloride and dried over magnesium sulphate. The solvent amount was reduced in vacuo to a total of 150 ml volume and the solution was added dropwise over a period of 2.5 h to 660 g of hot (70-75° C.) concentrated sulphuric acid. After stirring for an additional 30 min at 75° C. the mixture was allowed to stand overnight at room temperature. The mixture was poured onto approx. 500 g of ice and extracted three times with 150 ml dichloromethane each. The organic layer was washed twice with 150 ml of a saturated sodium bicarbonate solution and once with 100 ml of a saturated sodium chloride solution. After drying over magnesium sulphate the solvent was removed in vacuo. The product was purified by column chromatography on silica (heptane/dichloromethane 5:1) to yield 40.0 g (61%) of the desired product as a slightly off-white oil, which slowly crystallized. $^1$H-NMR (400 MHz, CDCl$_3$): δ=7.42 (t, 1H, aromatic), 7.29 (d, 1H, aromatic), 7.24 (d, 1H, aromatic), 3.25 (dd, 1H, COCH), 2.71 (m, 2H, benzylic), 1.78-0.87 (m, 13H, aliphatic) ppm.

7-(4-tert-Butyl-phenyl)-2-cyclohexylmethyl-indan-1-one

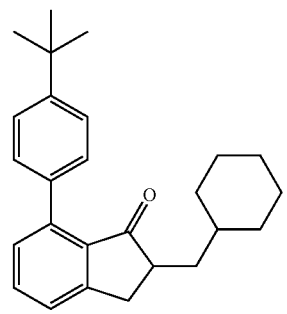 [SMILES: CC(C)(C)c1ccc(-c2cccc3c2C(=O)C(CC2CCCCC2)C3)cc1]

60 g (228 mmole) 7-Chloro-2-cyclohexylmethyl-indan-1-one, 49 g (1.2 eq.) 4-tert-butyl-benzene boronic acid, 53 g sodium carbonate, 750 ml ethylene glycol and 150 ml water were placed in a 2 l-roundbottom flask equipped with a mechanical stirrer and a reflux condenser. The mixture was degassed three times by slight evacuation and recharging with argon. A premixed catalyst solution consisting of 103 mg (0.2 mole %) palladium acetate, 3 ml NaTPPTS (2.6 M in water, 0.8 mole %) and 2 ml of water was added and the mixture was refluxed at 125° C. until complete conversion (approx. 4 h). 300 ml of water were added and the mixture was extracted three times with 150 ml of toluene each. The combined organic layers were washed twice with 100 ml water and once with 100 ml of a saturated sodium chloride solution. Drying over magnesium sulphate and evaporation of the solvent in vacuo yielded 87.2 g (quant.) of the desired product as a yellow sticky oil. $^1$H-NMR (400 MHz, CDCl$_3$): δ=7.54 (t, 1H, aromatic), 7.43, 7.38 (2×d, 4H, aromatic), 7.24 (m, 2H, aromatic), 3.30 (m, 1H, COCH), 2.80-2.67 (3×m, 2H, benzylic), 1.85-1.47 (m, 7H, aliphatic), 1.35 (s, 9H, C(CH$_3$)$_3$), 1.27-0.87 (m, 6H, aliphatic) ppm.

4-(4-tert-Butyl-phenyl)-2-cyclohexylmethyl-1H-indene

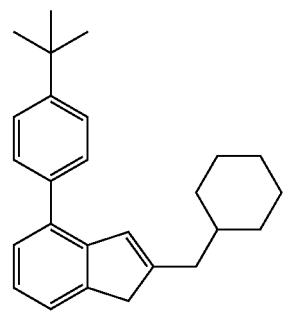 [SMILES: CC(C)(C)c1ccc(-c2cccc3c2C=C(CC2CCCCC2)C3)cc1]

82.3 g (229 mmole) 7-(4'-tert-Butyl-phenyl)-2-cyclohexylmethyl-indan-1-one were dissolved in 292 ml toluene in a 1 l-roundbottom flask equipped with a reflux condenser. 9.5 g (1.1 eq.) sodium borohydride were added. Then 40 ml (4.3 eq.) methanol were added at 50° C. and the mixture was stirred for 3 h at 50° C. An additional 1 g of sodium borohydride and 5 ml methanol were added and the mixture was stirred another 2 h at 50° C. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 350 ml of toluene. After addition of 0.7 g p-toluene sulfonic acid the mixture was heated to reflux using a Dean-Stark-trap until TLC showed complete conversion (90 min). The solution was washed twice with a saturated NaHCO$_3$-solution, once with water and once with a saturated sodium chloride solution. Drying over magnesium sulphate, evaporation of the solvent and crystallization from 800 ml ethanol afforded 67.3 g (86%) of the desired indene as white crystals. $^1$H-NMR (400 MHz, CDCl$_3$): δ=7.45, 7.33, 7.25, 7.14 (4×m, 7H, aromatic), 6.69 (s, 1H, =CH), 3.35 (s, 2H, benzylic), 2.34 (d, 2H, aliphatic), 1.71-1.50 (m, 6H, aliphatic), 1.39 (s, 9H, C(CH$_3$)$_3$), 1.24-0.87 (m, 5H, aliphatic) ppm.

Dimethylsilandiylbis[2-(cyclohexylmethyl)-4-(4-tert-butylphenyl)-1-indenyl]-zirconium dichloride

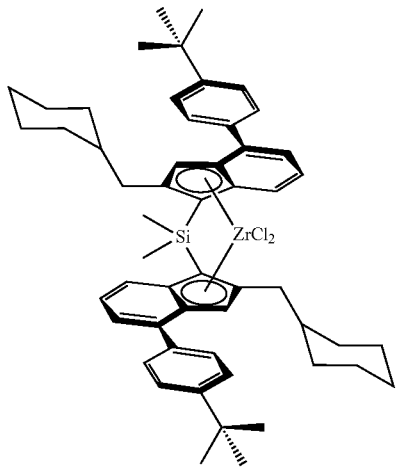

20 g (58 mmole) 7-(4-tert-Butyl-phenyl)-2-cyclohexyl-methyl-1H-indene were dissolved in 340 ml toluene and 20 ml of THF in a 1000 ml-roundbottom flask. 24.4 ml of n-butyl lithium (2.6 M in toluene, 63.4 mmole, 1.1 eq.) were added at room temperature and the solution was stirred for 1 h at 80° C. After cooling to 40° C. 3.5 ml (3.74 g, 29 mmole, 0.5 eq.) dimethyldichlorosilane were added in one portion and the mixture was stirred at 60° C. for 8.5 h. The solvent mixture was removed in vacuo (purity of the ligand >99% according to GC-analysis) and the ligand was dissolved in 200 ml of diethyl ether (yellowish suspension due to LiCl). 23.8 ml of n-butyl lithium (61.9 mmole, 1.07 eq. regarding to "indene", 2.6 M in toluene) were added at room temperature and the mixture was stirred overnight at room temperature. Then 7.1 g (30.5 mmole, 0.525 eq. regarding to "indene") zirconium tetrachloride were added in portions. The orange-yellow suspension was stirred for 5 h at room temperature and the solid was isolated by filtration. Washing with 2 portions of 30 ml diethyl ether each and drying in vacuo yielded 22.7 g of the crude complex (rac/meso=1.5:1, containing lithium chloride). The racemic complex was isolated by fractional crystallization from toluene. Yield: 8.1 g (9 mmol, 31%) as a bright yellow powder. $^1$H-NMR (400 MHz, CDCl$_3$): δ=7.61 (d, 2H, aromatic), 7.57, 7.44 (2×d, 8H, aromatic), 7.36 (d, 2H, aromatic), 7.22, 7.15, 7.07 (3×m, 10H, aromatic+toluene), 6.94 (s, 2H, indenyl-H), 2.64 ("dd", 2H, indenyl-CH$_2$), 2.34 (s, toluene) 2.13 ("dd", 2H, indenyl-CH$_2$), 1.75-1.45 (m, 10H, aliphatic), 1.33 (s, 18H, C(CH$_3$)$_3$), 1.31 (s, 6H, Si(CH$_3$)$_2$), 1.12-0.76 (m, 12H, aliphatic) ppm.

Comparative Example 2

Dimethylsilandiylbis[(2-(2,2-dimethylpropyl)-4-(4'-tert-butylphenyl)-1-indenyl]-zirconium dichloride 1-Bromo-3,3-dimethyl-butane

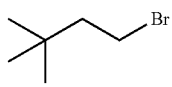

In a 1 l-roundbottom flask equipped with a reflux condenser 232 g concentrated sulphuric acid and 283 g hydrobromic acid (48% in water) were added successively under cooling with an ice bath to 100 g (0.98 mole) 3,3-dimethyl-1-butanol. The mixture was refluxed for 6 h and after cooling to room temperature, it was poured onto 400 g of ice. The aqueous phase was extracted with 400 ml pentane. The organic layer was washed with a 2 M NaOH-solution and with water, dried over magnesium sulphate, and the solvent was removed in vacuo. The product was distilled in vacuo to yield 88.1 g (55%) of 1-bromo-3,3-dimethyl-butane as a colourless oil. $^1$H-NMR (400 MHz, CDCl$_3$): δ=3.35 (m, 2H, CH$_2$Br), 1.80 (m, 2H, CH$_2$), 0.90 (s, 9H, t-Bu) ppm.

1-(2-Chloro-phenyl)-4,4-dimethyl-pentan-1-one

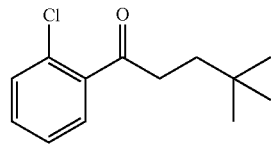

14.1 g (580 mmole) Magnesium turnings were placed in a 1 l-roundbottom flask equipped with a dropping funnel and a reflux condenser, and 60 ml of THF were added. The magnesium was etched slightly with a few crystals of iodine and then 2 g of 1-bromo-3,3-dimethyl-butane were added and the mixture was heated locally. After the start of the Grignard-formation the rest of the 1-bromo-3,3-dimethyl-butane in 350 ml of THF (88.1 g in total, 533 mmole) were added within a period of 20 min. The mixture was refluxed for 1.5 h and then cooled to room temperature. In a separate 2 l-roundbottom flask 63.9 g (464 mmole) of 2-chloro-benzonitrile and 141 mg (0.16 mole %) copper(I)iodide were dissolved in 265 ml of THF. The Grignard-solution was added dropwise over a period of 30 min and the reaction mixture was refluxed for 3 h. After standing overnight at room temperature, a mixture of 190 ml water and 127 ml concentrated hydrochloric acid were added very carefully, causing a strongly exothermic reaction. The mixture was stirred at 50° C. for 1 h and the layers were separated. The aqueous layer was extracted twice with 150 ml of toluene each. The combined organic layers were washed twice with 2 M sulphuric acid, once with a saturated sodium bicarbonate solution and once with a saturated sodium chloride solution. After drying over magnesium sulphate the solvent was evaporated in vacuo to yield 103.8 g (quant.) of the desired phenone as slightly brown oil. $^1$H-NMR (400 MHz, CDCl$_3$): δ=7.41-7.26 (m, 4H, aromatic), 2.87 (m, 2H, COCH$_2$), 1.59 (m, 2H, CH$_2$-t-Bu), 0.90 (s, 9H, t-Bu) ppm.

7-Chloro-2-(2,2-dimethylpropyl)-indan-1-one

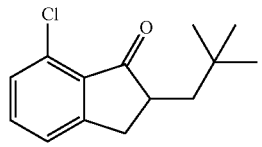 [SMILES: CC(C)(C)CC1Cc2cccc(Cl)c2C1=O]

101.8 g (453 mmole) 1-(2-Chloro-phenyl)-4,4-dimethyl-pentan-1-one, 133.4 g (2.1 eq.) urotropine and 124.7 g (2.7 eq.) of acetic anhydride were placed in a 1000 ml roundbottom flask and the mixture was stirred at 80° C. for 4 h. Then 200 ml water and 200 ml 2M NaOH were added and the mixture was extracted two times with 250 ml dichloromethane each. The organic layer was washed two times with 150 ml saturated aqueous ammonium chloride and dried over magnesium sulphate. The solvent amount was reduced in vacuo to a total of 250 ml volume and the solution was added dropwise over a period of 2.5 h to 1000 g of hot (70-75° C.) concentrated sulphuric acid. After stirring for an additional 30 min at 75° C. the mixture was allowed to stand overnight at room temperature. The mixture was poured onto approx. 800 g of ice and extracted three times with 250 ml dichloromethane each. The organic layer was washed twice with 250 ml of a saturated sodium bicarbonate solution and once with 200 ml of a saturated sodium chloride solution. After drying over magnesium sulphate the solvent was removed in vacuo. The product was purified by column chromatography on silica (heptane/dichloromethane 1:1) to yield 79.4 g (74%) of the desired product as a slightly off-white oil, which slowly crystallized. $^1$H-NMR (400 MHz, CDCl$_3$): δ=7.44 (t, 1H, aromatic), 7.30 (d, 1H, aromatic), 7.27 (d, 1H, aromatic), 3.38 (dd, 1H, COCH), 2.79, 2.60 (2×m, 2H, benzylic), 2.10, 1.21 (2×m, 1H, CH$_2$-t-Bu), 0.90 (s, 9H, t-Bu) ppm.

7-(4-tert-Butyl-phenyl)-2-(2,2-dimethyl-propyl)-indan-1-one

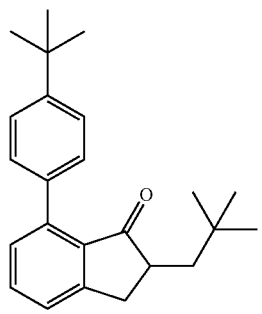 [SMILES: CC(C)(C)CC1Cc2cccc(-c3ccc(C(C)(C)C)cc3)c2C1=O]

35 g (148 mmole) 7-Chloro-2-(2,2-dimethyl-propyl)-indan-1-one, 31.6 g (1.2 eq.) tert-butylphenyl boronic acid, 34.5 g sodium carbonate, 438 ml ethylene glycol and 88 ml water were placed in a 1 l-roundbottom flask equipped with a mechanical stirrer and a reflux condenser. The mixture was degassed three times by slight evacuation and recharging with argon. A premixed catalyst solution consisting of 67 mg (0.2 mole %) palladium acetate, 1.94 ml NaTPPTS (2.6 M in water, 0.8 mole %) and 2 ml of water was added and the mixture was refluxed at 125° C. until complete conversion (approx. 4 h). 100 ml of water were added and the mixture was extracted three times with 100 ml of toluene each. The combined organic layers were washed twice with 100 ml water and once with 100 ml of a saturated sodium chloride solution. Drying over magnesium sulphate and evaporation of the solvent in vacuo yielded 58.82 g (quant.) of the desired product as a yellow sticky oil. $^1$H-NMR (400 MHz, CDCl$_3$): δ=7.58 (t, 1H, aromatic), 7.48-7.17 (m, 6H, aromatic), 3.48 (m, 1H, (C=O)CH), 2.88, 2.63 (2×m, 2H, benzylic), 2.38 (s, 1H), 2.13 (m, 1H, CH$_2$-t-Bu), 1.40 (s, 9H, Ph-t-Bu), 1.03 (s, 9H, CH$_2$-t-Bu) ppm.

4-(4-tert-Butyl-phenyl)-2-(2,2-dimethyl-propyl)-1H-indene

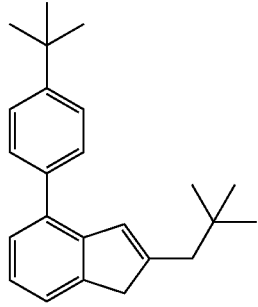 [SMILES: CC(C)(C)CC1=Cc2c(cccc2-c2ccc(C(C)(C)C)cc2)C1]

50 g (150 mmole) 7-(4'-tert-Butyl-phenyl)-2-(2,2-dimethyl-propyl)-indan-1-one were dissolved in 180 ml toluene in a 500 ml-roundbottom flask equipped with a reflux condenser. 6.22 g (1.1 eq.) sodium borohydride were added. Then 26.1 ml (4.3 eq.) methanol were added at 50° C. and the mixture was stirred for 4 h at 50° C. Another 3.11 g sodium borohydride and 10.3 g methanol were added and the mixture was stirred at 50° C. overnight. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 300 ml of toluene. After addition of 1 g p-toluene sulfonic acid the mixture was heated to reflux using a Dean-Stark-trap until TLC showed complete conversion (90 min). The solution was washed twice with a saturated NaHCO$_3$-solution, once with water and once with a saturated sodium chloride solution. Drying over magnesium sulphate, evaporation of the solvent and recrystallization from 500 ml ethanol afforded 35.3 g (74%) of the desired indene as white crystals. $^1$H-NMR (400 MHz, CDCl$_3$): δ=7.47 (s, 4H, aromatic), 7.34 (d, 1H, aromatic), 7.25 (d, 1H, aromatic), 7.16 (t, 1H, aromatic), 6.72 (s, 1H, C=CH), 3.44 (s, 2H, benzylic), 2.36 (s, 2H, CH$_2$-t-Bu), 1.37 (s, 9H, Ph-t-Bu), 0.96 (s, 9H, CH$_2$-t-Bu) ppm.

Dimethylsilandiylbis[2-(2,2-dimethylpropyl)-4-(4-tert-butylphenyl)-1-indenyl]zirconium dichloride

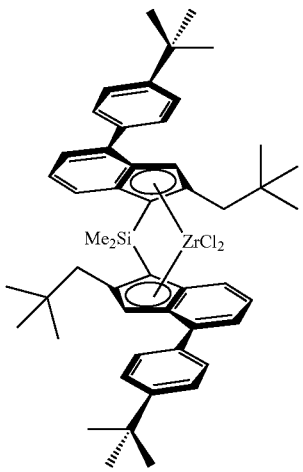

2 g (6.28 mmole) 4-(4-tert-Butyl-phenyl)-2-(2,2-dimethylpropyl)-1H-indene were dissolved in 34 ml toluene and 2 ml of THF in a 100 ml-roundbottom flask. 2.64 ml of n-butyl lithium (2.5 M in toluene, 6.6 mmole, 1.05 eq.) were added at room temperature and the solution was stirred for 1 h at 80° C. After cooling to 40° C. 405 mg (3.2 mmole, 0.5 eq.) dimethyldichlorosilane were added in one portion and the mixture was stirred at 60° C. for 17 h. The solvent was removed in vacuo and 20 ml diethyl ether were added. 2.64 ml of n-butyl lithium (2.5 M in toluene, 6.6 mmole, 1.05 eq.) were added at room temperature and the mixture was stirred overnight at room temperature. After cooling to room temperature 776 mg (3.3 mmole, 0.53 eq. regarding to "indene") zirconium tetrachloride were added in portions. The orange-yellow suspension was stirred for 5 h at room temperature and the complex was isolated by filtration and washing with diethyl ether to yield 1.59 g crude complex. The racemic form was isolated by fractional recrystallization from toluene. Yield: 0.65 g (24%) as a bright yellow powder. $^1$H-NMR (400 MHz, CDCl$_3$): δ=7.62 (d, 2H, aromatic), 7.58, 7.45 (2×d, 8H, aromatic), 7.37 (d, 2H, aromatic), 7.23, 7.16, 7.08 (3×m, 10H, aromatic+toluene), 6.93 (s, 2H, indenyl-H), 2.64 (d, 2H, indenyl-CH$_2$), 2.34 (s, toluene), 2.15 (d, 2H, indenyl-CH$_2$), 1.35 (s, 6H, Si(CH$_3$)$_2$), 1.32 (s, 18H, Ph-t-Bu), 0.83 (s, 18H, CH$_2$-t-Bu) ppm.

Comparative Example 3

Dimethylsilandiylbis[2-(1-adamantylmethyl)-4-(4-tert-butylphenyl)-1-indenyl]-zirconium dichloride 1-(2-Bromo-ethyl)-adamantane

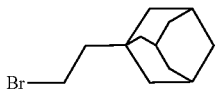 [SMILES: BrCCC12CC3CC(CC(C3)C1)C2]

In a 1 l-roundbottom flask equipped with a reflux condenser 164 g concentrated sulphuric acid and 200 g hydrobromic acid (48% in water) were added subsequently under cooling with an ice bath to 126.20 g (0.70 mole) 2-(1-adamantyl)ethanol. The mixture was refluxed for 6 h and after cooling to room temperature, it was poured onto 400 g of ice. The aqueous phase was extracted with 400 ml pentane. The organic layer was washed with a 2 M NaOH-solution and with water, dried over magnesium sulphate, and the solvent was removed in vacuo. The product was distilled in vacuo to yield 153.2 g (90%) of (1-(2-Bromo-ethyl)-adamantane as a colourless oil. $^1$H-NMR (400 MHz, CDCl$_3$): δ=3.29 (t, 2H, CH$_2$Br), 1.71 (t, 2H, CCH$_2$CH$_2$Br), 1.56-1.17 (m, 15H, aliphatic) ppm.

1-(2-Chloro-phenyl)-3-(1-adamantyl)-propan-1-one

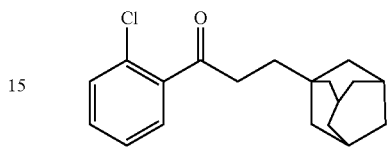

15.57 g (640 mmole) Magnesium turnings were placed in a 1 l-roundbottom flask equipped with a dropping funnel and a reflux condenser, and 50 ml of THF were added. The magnesium was etched slightly with a few crystals of iodine and then 2 g of (1-(2-bromo-ethyl)-adamantane were added and the mixture was heated locally. After the start of the Grignard-formation the rest of the (1-(2-bromo-ethyl)-adamantane in 350 ml of THF (143.5 g in total, 590 mmole) were added within a period of 20 min. The mixture was refluxed for 1.5 h and then cooled to room temperature. In a separate 2 l-roundbottom flask 70.5 g (513 mmole) of 2-chloro-benzonitrile and 156 mg (0.16 mole %) copper(I)iodide were dissolved in 130 ml of THF. The Grignard-solution was added dropwise over a period of 30 min and the reaction mixture was refluxed for 3 h. After standing overnight at room temperature, a mixture of 190 ml water and 127 ml concentrated hydrochloric acid were added very carefully, causing a strongly exothermic reaction. The mixture was stirred at 50° C. for 1 h and the layers were separated. The aqueous layer was extracted twice with 150 ml of toluene each. The combined organic layers were washed twice with 2 M sulphuric acid, once with a saturated sodium bicarbonate solution and once with a saturated sodium chloride solution. After drying over magnesium sulphate the solvent was evaporated in vacuo to yield 178.7 g (quant.) of the desired phenone as slightly brown oil. $^1$H-NMR (400 MHz, CDCl$_3$): δ=7.39-7.12 (m; 4H, aromatic), 2.55 (t, 2H, COCH$_2$), 1.40-1.13 (m, 17H, aliphatic) ppm.

7-Chloro-2-(1-adamantylmethyl)-indan-1-one

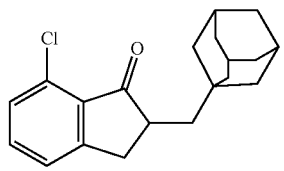 [SMILES: O=C1c2c(Cl)cccc2CC1CC12CC3CC(CC(C3)C1)C2]

78.7 g (260 mmole) 1-(2-Chloro-phenyl)-3-(1-adamantyl)-propan-1-one, 77.5 g (2.1 eq.) urotropine and 72.6 g (2.7 eq.) of acetic anhydride were placed in a 500 ml roundbottom flask and the mixture was stirred at 80° C. for 4 h. Then 100 ml water and 100 ml 2M NaOH were added and the mixture was extracted two times with 200 ml dichloromethane each. The organic layer was washed two times with 100 ml saturated aqueous ammonium chloride and dried over magnesium sulphate. The solvent amount was reduced in vacuo to a total of 150 ml volume and the solution was added dropwise over a period of 2.5 h to 660 g of hot (70-75° C.) concentrated sulphuric acid. After stirring for an additional 30 min at 75° C. the mixture was allowed to stand overnight at room temperature. The mixture was poured onto approx. 500 g of ice and extracted three times with 150 ml dichloromethane each. The organic layer was washed twice with 150 ml of a saturated sodium bicarbonate solution and once with 100 ml of a saturated sodium chloride solution. After drying over magnesium sulphate the solvent was removed in vacuo. The product was purified by column chromatography on silica (heptane/dichloromethane 5:1) to yield 58 g (71%) of the desired product as a slightly off-white glassy solid. $^1$H-NMR (400 MHz, CDCl$_3$): δ=7.39 (t, 1H, aromatic), 7.27 (d, 1H, aromatic), 7.21 (d, 1H, aromatic), 3.37 (dd, 1H, COCH), 2.70 (m, 2H, benzylic), 1.36-1.18 (m, 17H, aliphatic) ppm.

7-(4-tert-Butyl-phenyl)-2-(1-adamantylmethyl)-indan-1-one

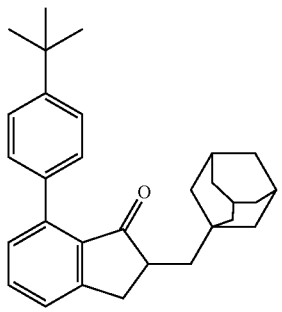 [SMILES: CC(C)(C)c1ccc(-c2cccc3c2C(=O)C(CC24CC5CC(CC(C5)C2)C4)C3)cc1]

71.8 g (228 mmole) 7-Chloro-2-(1-adamantylmethyl)-indan-1-one, 49 g (1.2 eq.) 4-tert-butyl-benzene boronic acid, 53 g sodium carbonate, 750 ml ethylene glycol and 150 ml water were placed in a 2 l-roundbottom flask equipped with a mechanical stirrer and a reflux condenser. The mixture was degassed three times by slight evacuation and recharging with argon. A premixed catalyst solution consisting of 103 mg (0.2 mole %) palladium acetate, 3 ml NaTPPTS (2.6 M in water, 0.8 mole %) and 2 ml of water was added and the mixture was refluxed at 125° C. until complete conversion (approx. 6 h). 300 ml of water were added and the mixture was extracted three times with 150 ml of toluene each. The combined organic layers were washed twice with 100 ml water and once with 100 ml of a saturated sodium chloride solution. Drying over magnesium sulphate and evaporation of the solvent in vacuo yielded 94.1 g (quant.) of the desired product as a yellow sticky oil. $^1$H-NMR (400 MHz, CDCl$_3$): δ=7.52 (t, 1H, aromatic), 7.41, 7.36 (2×d, 4H, aromatic), 7.21 (m, 2H, aromatic), 3.37 (m, 1H, COCH), 2.77-2.68 (m, 2H, benzylic), 1.42-1.18 (m, 26H, aliphatic & C(CH$_3$)$_3$) ppm.

4-(4-tert-Butyl-phenyl)-2-(1-adamantylmethyl)-1H-indene

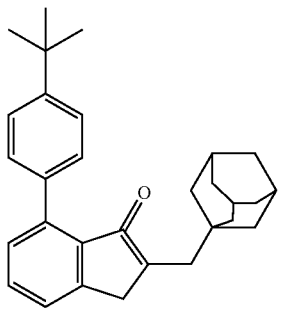

94.0 g (228 mmole) 7-(4'-tert-Butyl-phenyl)-2-(1-adamantylmethyl)-indan-1-one were dissolved in 291 ml toluene in a 1 l-roundbottom flask equipped with a reflux condenser. 9.5 g (1:1 eq.) sodium borohydride were added. Then 40 ml (4.3 eq.) methanol were added at 50° C. and the mixture was stirred for 6 h at 50° C. 2M sulphuric acid was added until the gas evolution ceased. After addition of 100 ml water the layers were separated and the organic layer was washed two times with 2M sulphuric acid and once with a saturated sodium chloride solution. The solvent was evaporated and the crude indanol was dissolved in approx. 350 ml of toluene. After addition of 0.7 g p-toluene sulfonic acid the mixture was heated to reflux using a Dean-Stark-trap until TLC showed complete conversion (90 min). The solution was washed twice with a saturated NaHCO$_3$-solution, once with water and once with a saturated sodium chloride solution. Drying over magnesium sulphate, evaporation of the solvent and crystallization from 900 ml ethanol afforded 76.9 g (85%) of the desired indene as white crystals. $^1$H-NMR (400 MHz, CDCl$_3$): δ=7.44, 7.32, 7.23, 7.12 (4×m, 7H, aromatic), 6.63 (s, 1H, =CH), 3.32 (s, 2H, benzylic), 2.29 (d, 2H, aliphatic), 1.69-1.15 (m, 15H, aliphatic), 1.38 (s, 9H, C(CH$_3$)$_3$) ppm.

Dimethylsilandiylbis[2-(1-adamantylmethyl)-4-(4-tert-butylphenyl)-1-indenyl]-zirconium dichloride

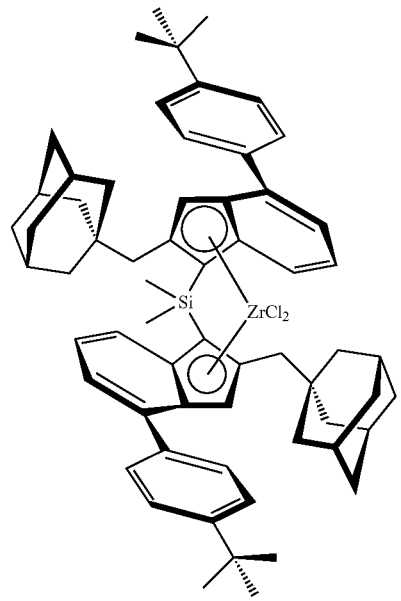

23 g (58 mmole) 7-(4-tert-Butyl-phenyl)-2-(1-adamantylmethyl)-1H-indene were dissolved in 340 ml toluene and 20 ml of THF in a 1000 ml-roundbottom flask. 24.4 ml of n-butyl lithium (2.6 M in toluene, 63.4 mmole, 1.1 eq.) were added at room temperature and the solution was stirred for 1 h at 80° C. After cooling to 40° C. 3.5 ml (3.74 g, 29 mmole, 0.5 eq.) dimethyldichlorosilane were added in one portion and the mixture was stirred at 60° C. for 8.5 h. The solvent mixture was removed in vacuo (purity of the ligand >94% according to GC-analysis) and the ligand was dissolved in 200 ml of diethyl ether (yellowish suspension due to LiCl). 23.8 ml of n-butyl lithium (61.9 mmole, 1.07 eq. regarding to "indene", 2.6 M in toluene) were added at room temperature and the mixture was stirred overnight at room temperature. Then 7.1 g (30.5 mmole, 0.525 eq. regarding to "indene") zirconium tetrachloride were added in portions. The orange-yellow suspension was stirred overnight at room temperature and the solid was isolated by filtration. Washing with 2 portions of 35 ml diethyl ether each and drying in vacuo yielded 25.1 g of the crude complex (rac/meso=1.6:1, containing lithium chloride). The racemic complex was isolated by fractional crystallization from toluene. Yield: 9.8 g (9.7 mmol, 33%) as a bright yellow powder. $^1$H-NMR (400 MHz, CDCl$_3$): δ=7.62 (d, 2H, aromatic), 7.55, 7.42 (2×d, 8H, aromatic), 7.32 (d, 2H, aromatic), 7.21, 7.15, 7.08 (3×m, 10H, aromatic+toluene), 6.83 (s, 2H, indenyl-H), 2.53 ("dd", 2H, indenyl-CH$_2$), 2.34 (s, toluene) 2.09 ("dd", 2H, indenyl-CH$_2$), 1.75-1.15 (m, 30H, aliphatic), 1.34 (s, 18H, C(CH$_3$)$_3$), 1.32 (s, 6H, Si(CH$_3$)$_2$) ppm.

Comparative Example 4

Dimethylsilanediylbis[2-methyl-4-(4-tert-butylphenyl)-1-indenyl]zirconium dichloride

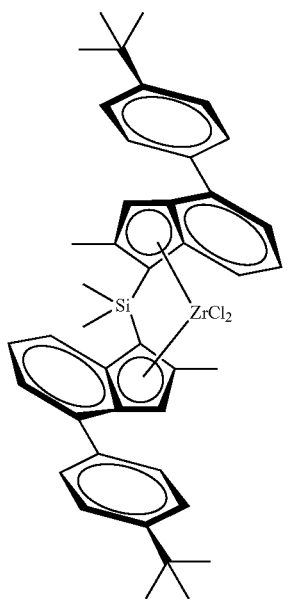

143 g (0.54 moles) of 2-methyl-4-(4-tert-butylphenyl)-1-indene were introduced into 2.4 L of toluene and 143 mL of tetrahydrofuran, and 234 mL of an n-butyllithium solution (2.5 M in toluene) were added without interruption at room temperature. After this addition was complete, the mixture was heated to 80° C. and stirred for one hour at this temperature. It was allowed to cool to 40° C., then 33.6 g (0.26 moles) of dimethyldichlorosilane were added dropwise to this reaction solution. The reaction solution was stirred for three hours at 60° C. It was cooled to room temperature, and then 218 mL of an n-butyllithium solution (2.5 M in toluene) were added dropwise. After this addition was complete, the solution was heated to 80° C. and stirred for one hour at this temperature. It was allowed to cool to room temperature, then 71.1 g (0.305 moles) of zirconium tetrachloride were added in portions. The solution was stirred for two hours at 45° C. and the precipitate that forms was separated by filtration through a G3 fitted glass filter and then carefully washed with 700 mL portions of tetrahydrofuran. The residue was dried in an oil-pump vacuum, and the product was obtained in a yield of 155 g (80%) and with a rac:meso ratio of 1:1. The isomers must be separated in an additional step to obtain selective catalysts for propylene polymerization.

$^1$H-NMR (400 MHz, CDCl$_3$):

7.63-6.85 (m, 16H, arom-H), 2.44 (s, 3H, meso-CH$_3$), 2.24 (s, 3H, rac-CH$_3$), 1.46 (s, 1.5H, meso-SiMe$_2$), 1.33-1.29 (m, 21H, tert-butyl, rac-SiMe$_2$), 1.23 (s, 1.5H, meso-CH$_3$).

Comparative Example 5

Dimethylsilanediyl(2-methyl-4-(4-tert-butylphenyl)indenyl)(2-isopropyl-4-(4-tert-butylphenyl)indenyl) zirconium dichloride Dimethylsilanediyl(2-methyl-4-(4-tert-butylphenyl)-1-indene)(2-isopropyl-4-(4-tert-butylphenyl)-1-indene)

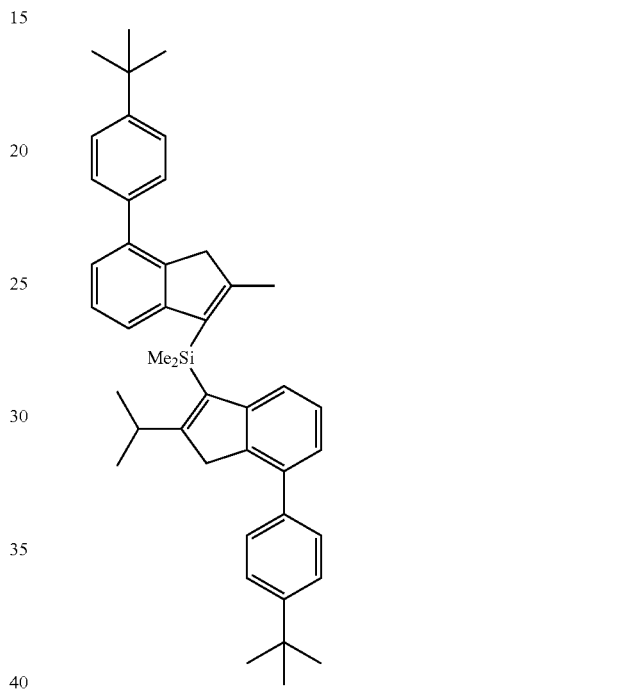

16.8 g (57.7 mmoles) of 2-isopropyl-4-(4-tert-butylphenyl)-1-indene were introduced into 131 mL of toluene and 5.0 mL of THF, and 21.5 mL of an n-butyllithium solution (2.68 M in toluene) were added without interruption at room temperature. After this addition was complete, the mixture was heated to 80° C. and stirred for one hour at this temperature. It was then allowed to cool to room temperature. The resulting reaction solution was added dropwise to a solution of 20.5 g (57.7 mmoles) of (2-methyl-4-(4-tert-butylphenyl)-1-indenyl)dimethylchlorosilane in 246 mL of toluene over a period of one hour. The mixture was stirred overnight at room temperature. Then 60 mL of water were added and the phases which form were separated. The organic phase was washed with 100 mL of water and the combined aqueous phases were extracted twice with a total of 100 mL of toluene. The combined organic phases were dried over magnesium sulfate. After filtering off the magnesium sulfate, the solvent was removed and the residue was dried in an oil pump vacuum. The desired product was isolated in a yield of 31.6 g (90%) (purity: 90%).

$^1$H-NMR (400 MHz, CDCl$_3$):

7.51-7.1 (m, 14H, arom-H), 6.71, 6.62 (each s, each 1H, olefin-H-indene), 3.35, 3.31 (each s, each 2H, CH$_2$—H), 2.65 (m, 1H, CH-isopropyl), 2.41 (s, 3H CH$_3$—H), 1.35, 1.33 (each s, each 9H, tert-butyl), 1.15 (d, 6H, isopropyl-CH$_3$), 0.2, 0.0 (each d, each 3H, SiCH$_3$).

53

Dimethylsilanediyl(2-methyl-4-(4-tert-butylphenyl)-1-indenyl)(2-isopropyl-4-(4-tert-butylphenyl)-1-indenyl)zirconium dichloride

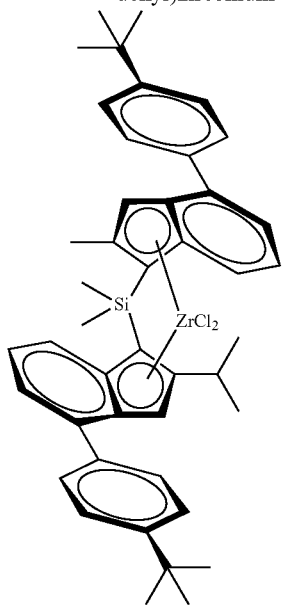

36.6 g (60 mmoles) of dimethylsilanediyl(2-methyl-4-(4-tert-butylphenyl)-1-indene)(2-isopropyl-4-(4-tert-butylphenyl)-1-indene) were introduced into 366 ml of diethyl ether, and 44.9 mL of an n-butyllithium solution (2.68 M in toluene) were added without interruption at room temperature. After this addition was complete, the mixture was stirred over night at this temperature. It was then cooled to 0° C. and 14.0 g (60 mmoles) of zirconium tetrachloride were added in portions. The mixture was allowed to warm to room temperature and was stirred for another two hours at this temperature. The precipitate that forms was separated by filtration through a G3 fritted glass filter and was washed with two 50 mL portions of tetrahydrofuran and with one 70 mL portion of pentane. The residue was dried in an oil-pump vacuum, and the product was obtained in a yield of 23.5 g (50%) and with a rac:meso ratio of about 1:1. The isomers must be separated in a subsequent step to obtain selective catalysts for propylene polymerization.

$^1$H-NMR (400 MHz, CDCl$_3$):

7.7-6.9 (m, 14H, arom-H), 3.26 (m, 1H, CH-isopropyl), 2.23 (s, 3H, CH$_3$), 1.31 (s, 18H, tert-butyl), 1.33, 1.32 (each s, each 3H, Si—CH$_3$), 1.08, 1.03 (each d, each 3H, isopropyl-CH$_3$).

Example 6

Dimethylsilandiylbis[2-[(1-methylcyclohexyl)methyl]-4-(4-tert-butyl phenyl)-1-indenyl]-zirconium dichloride 2-(2-Bromo-benzyl)-malonic acid diethyl ester

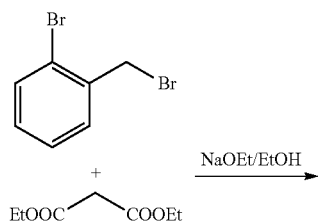

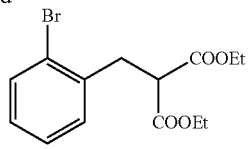

In a 4-neck 4 l round bottom flask equipped with a reflux condenser, gas outlet, thermometer and stirrer are placed 2 l of ethanol. A solution of sodium ethoxide in ethanol is prepared by gradually adding 25.5 g (1.11 mol) of sodium cut in small pieces to the reaction mixture. At a reaction temperature of 40-45° C. the sodium addition and reaction is finished after ~1.5 h. The solution is cooled to room temperature and 192.5 g (1.20 mol) of malonic acid diethyl ester are added. The mixture is stirred at this temperature for 15 minutes. Then 250 g (1.00 mol) 2-bromobenzyl bromide are added via a dropping funnel in a way that the reaction temperature raises to 40-45° C. After the addition is completed the reaction mixture is heated to reflux for 3 h.

For workup, most of the ethanol is distilled off, and 300 ml of water are added to the residue. The water phase is extracted with 300 and 2 times 150 ml of diethyl ether. The combined organic phases are washed with 200 ml of water. The ether is removed under reduced pressure and the crude product is distilled in a vacuum at a pressure of 1 mbar. To obtain pure 2-(2-Bromo-benzyl)-malonic acid diethyl ester (Yield: 230 g, 70%). $^1$H-NMR (500 MHz, CDCl$_3$, ppm): δ=7.50 (m, 1H, aromatic), 7.22 (m, 1H, aromatic), 7.17 (m, 1H, aromatic), 7.06 (m, 1H, aromatic), 4.13 (m, 4H, —O—CH$_2$CH$_3$), 3.82 (t, 1H, —CH$_2$—CH(CO$_2$Et)$_2$), 3.31 (d, 2H, Ar—CH$_2$—CH(CO$_2$Et)$_2$), 1.18 (t, 6H, —O—CH$_2$CH$_3$).

3-(2-Bromo-phenyl)-propionic acid

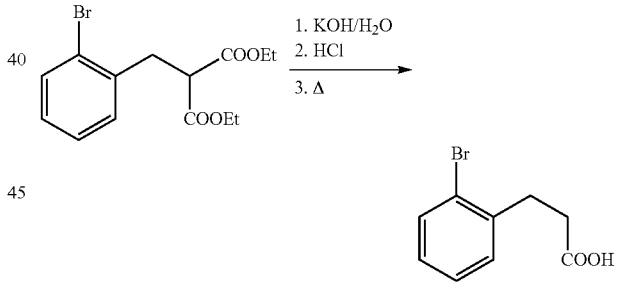

A 4-neck 2 litre round bottom flask with equipped with a reflux condenser, thermometer and stirrer, is charged with 230 g (0.70 mol) of 2-(2-Bromo-benzyl)-malonic acid diethyl ester and placed in an oil bath. A solution of 225.8 g (4.02 mol) potassium hydroxide in 225 ml water is slowly added with stirring. The reaction temperature is carefully monitored and the addition of the potassium hydroxide solution is interrupted as soon as a significantly exothermic reaction starts. The temperature may rise up to 80° C. The remaining potassium hydroxide solution is added as soon as the initial reaction starts to subside. It may happen that no change in temperature is observed while adding the potassium hydroxide solution. If this happens, the reaction mixture is carefully and slowly heated to 80° C. The exothermic reaction may suddenly start. As soon as the initial reaction starts to subside, the reaction mixture is heated to 100° C. and stirred for 6 h at this temperature.

To separate most of the ethanol, 225 ml of water are added and about half of the total volume is removed on a rotary evaporator in a vacuum. Thereafter 200 ml of water are again added and concentrated hydrochloric acid is carefully added (neutralisation is exothermic) until the solution is strongly acidic. 2-(2-Bromo-benzyl)-malonic acid precipitates. The acid is filtered off on a frit and washed with water until the washing water has a pH of approximately 3-4.

The dicarboxylic acid is dried under reduced pressure, transferred into a round bottom flask with a suitable gas outlet and a bouble counter. The flask is immersed into an oil bath at 165° C. and left there until the gas evolution stops. After approx. 20 minutes a yellow oil forms which may solidify at lower temperatures. The crude product is dissolved in 400 ml of Ethanol and placed in a −30° C. fridge. Pure 3-(2-Bromophenyl)-propionic acid precipitates over night and is filtered off. A further crop of pure product can be recovered from the filtrate by removing about ¾ of the ethanol and again cooling the remaining solution to −30° C. over night (Combined yield: 128.2 g, 80%).

$^1$H-NMR (500 MHz, CDCl$_3$, ppm): δ=7.53 (m, 1H, aromatic), 7.28-7.20 (m, 2H, aromatic), 7.07 (m, 1H, aromatic), 3.06 (t, 2H, Ar—CH$_2$—CH$_2$—CO$_2$H), 2.70 (t, 2H, Ar—CH$_2$—CH$_2$—CO$_2$H).

4-Bromo-indan-1-one

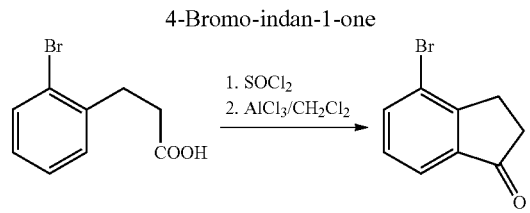

128.2 g (0.559 mol) of 3-(2-Bromo-phenyl)-propionic acid are placed in a 2-neck round bottom flask with gas outlet and stirrer. 133.2 g (1.12 mol) of thionyl chloride are added and the mixture is heated under reflux for 2 h with stirring in an argon atmosphere and excess thionyl chloride is removed in a vacuum. The resulting yellow oil is dissolved in 700 ml of methylene chloride, cooled to 0° C. and 82.0 g (0.615 mol) anhydrous aluminium chloride are added in small portions. The reaction mixture is stirred at 0° C. for 2 h and then hydrolyzed by carefully pouring it on crushed ice. The organic layer is separated. The aqueous layer is acidified with concentrated hydrochloric acid and extracted twice with methylene chloride. The combined organic layers are washed once with 2 M HCl, once with water, dried over anhydrous magnesium sulphate and the solvent is removed under reduced pressure (110.0 g, 87%).

$^1$H-NMR (500 MHz, CDCl$_3$, ppm): δ=7.75 (m, 1H, aromatic), 7.70 (m, 1H, aromatic), 7.27 (m, 1H, aromatic), 3.08 (m, 2H, —CH$_2$—), 2.72 (m, 2H, —CH$_2$—).

4-(4-tert-Butyl-phenyl)-indan-1-one

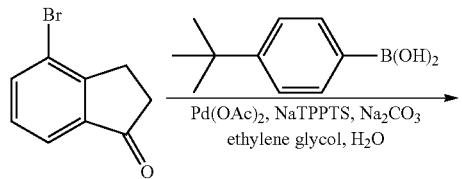

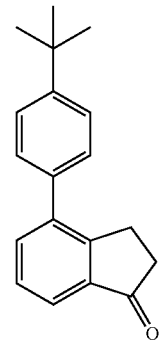

22.9 g (0.109 mol) of 4-Bromo-indan-1-one, 23.18 g (0.130 mol) of 4-tert-butylphenylboronic acid, 23.0 g (0.217 mol) sodium carbonate, 67 ml water and 357 ml of ethylene glycol are placed into a round bottom flask with reflux condenser and stirrer. The flask is evacuated and refilled with argon three times to remove any oxygen. 49 mg (0.22 mmol) of Palladium(II) acetate and 1.4 ml (0.87 mmol) of a 0.6 M solution of NaTPPTS (tris-sodiumtriphenylphosphine-3,3', 3"-trisulfonate) are premixed in 2 ml of water and added to the reaction mixture which is subsequently heated to reflux. The progress of the reaction is monitored via TLC. Complete conversion should be achieved within 3.5 to 5 hours. The mixture is cooled to room temperature and water and toluene are added until two clearly discernible phases form. The layers are separated and the water phase is extracted three times with toluene. The combined organic layers are washed twice with a saturated sodium chloride solution, dried over anhydrous magnesium sulphate and the solvent is removed in a vacuum to yield an oily product. The GC-determined purity of the crude product is 92%. Pure product can be obtained by treating the oily residue with 35 ml of ethanol at room temperature. Solid 4-(4-tert-Butyl-phenyl)-indan-1-one precipitates and is filtered of. The filtrate still contains significant amounts of product which can be isolated by evaporating the filtrate to dryness mixing it with 50 ml of heptane and storing the mixture at −30° C. over night. The filtrate is filtered off, washed with two portions of cold (30° C.) heptane and dried in a vacuum (Combined yield: 23.71 g, 82%).

$^1$H-NMR (500 MHz, CDCl$_3$, ppm): δ=7.75 (m, 1H, aromatic), 7.59 (m, 1H, aromatic), 7.48 (m, 2H, aromatic), 7.44 (m, 1H, aromatic), 7.39 (m, 2H, aromatic), 3.16 (m, 2H, —CH$_2$—), 2.68 (m, 2H, —CH$_2$—), 1.37 (s, 9H, —C(CH$_3$)$_3$).

Aldol condensation between 4-(4-tert-butyl-phenyl)-indan-1-one and 1-methyl-cyclohexanecarbaldehyde

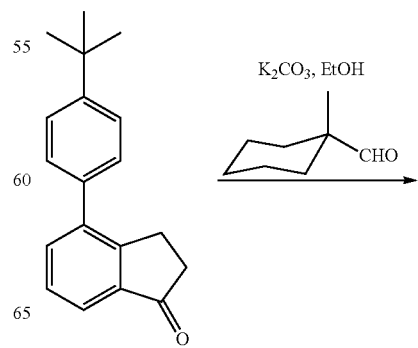

-continued

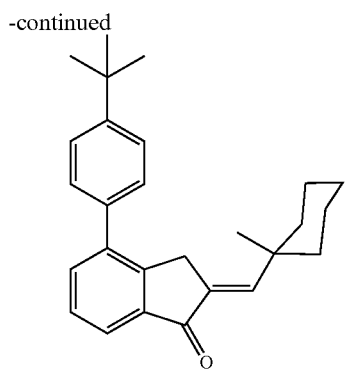

18.35 g (69.4 mmol) of 4-(4-tert-butyl-phenyl)-indan-1-one, 9.20 g (72.9 mmol) of 1-methyl-cyclohexyl-carbaldehyde, 12.85 g (93.0 mmol) of potassium carbonate and 184 ml of ethanol are placed into a round bottom flask. The mixture is heated to a temperature of 76-78° C. with stirring for 54 h. 10% hydrochloric acid is added until no gas evolution is observed anymore and the precipitating salts are dissolved by adding enough water to dissolve them. The aqueous phase is extracted twice with 175 ml of methylene chloride. The combined organic phases are dried over $MgSO_4$ and the solvent is removed in a vacuum to yield 26.03 g of crude product The crude product was used as-is for the subsequent steps.

Hydrogenation of 4-(4-tert-butyl-phenyl)-2-[(1-methylcyclohexyl)methylene]-indan-1-one

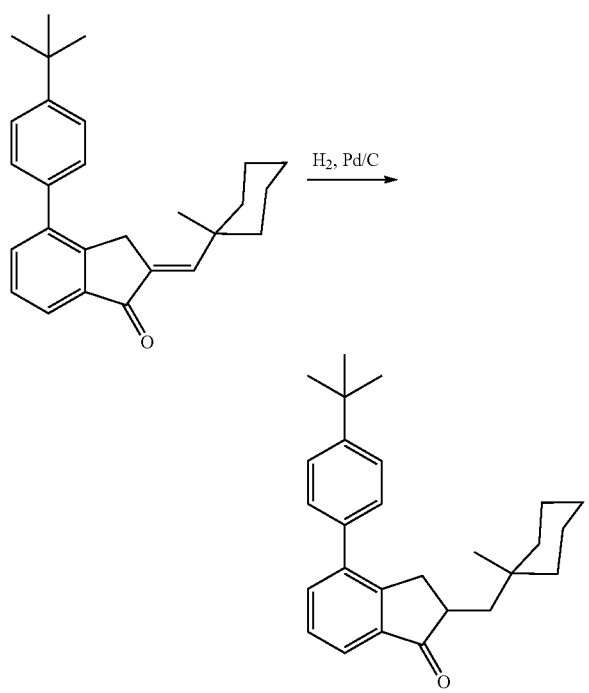

28.62 g of crude 4-(4-tert-butyl-phenyl)-2-(1-methylcyclo-hexylmethylene)-indan-1-one (GC: ~83% purity) are dissolved in 286 ml of ethyl acetate in a flask with gas inlet and stirrer. 2 g of palladium on activated carbon (10 wt-% palladium) are added. The system is evacuated and refilled with argon three times to remove oxygen and then evacuated and refilled with hydrogen three times. The stirrer is started and the reaction mixture is vigorously stirred to help the diffusion of hydrogen gas into the liquid reaction mixture. The hydrogen uptake is monitored and stirring is continued until the hydrogen uptake ceases. Filtering the crude reaction mixture over a paper filter and removing the solvent in a vacuum leaves crude 4-(4-tert-butyl-phenyl)-2-(1-methyl-cyclohexylmethyl)-indan-1-one (yield 27.99 g, GC: ~84% purity). The obtained crude product was used without further purification for the subsequent reduction/elimination-sequence.

7-(4-tert-Butyl-phenyl)-2-[(1-methylcyclohexyl)methyl]-1H-indene

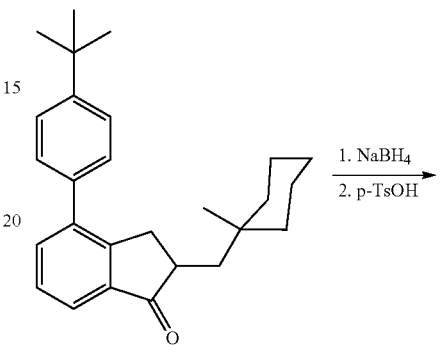

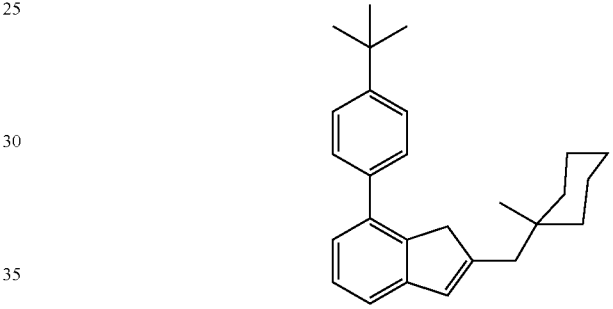

27.9 g of crude 4-(4-tert-butyl-phenyl)-2-[(1-methylcyclohexyl)methyl]-indan-1-one (~83% purity), 2.82 g (74.5 mmol) of $NaBH_4$ and 70.5 ml of toluene are charged in a flask equipped with reflux condenser, dropping funnel and magnetic stirring bar. The mixture is warmed to 50° C. and 14 ml of methanol are slowly added with stirring and stirring is continued for 2.5 h to ensure a complete reaction. Excess $NaBH_4$ is carefully hydrolyzed with approx. 40 ml of 2n $H_2SO_4$. The organic phase is separated and the water phase is washed with another 35 ml of toluene. The combined organic phases are twice extracted with 2n $H_2SO_4$ and dried over anhydrous $MgSO_4$. Most of the solvent is removed in a vacuum and replaced by fresh toluene up to a total volume of 100 ml and 0.3 g of p-toluenesulfonic acid are added. The reaction flask is fitted with a water separator and the reaction mixture is heated to reflux for 1.5 h. The conversion can be monitored by TLC. Once the dehydration is complete, the solution is washed with a saturated $NaHCO_3$ solution and dried over anhydrous $MgSO_4$. The solvent is thoroughly removed in a vacuum and 25.85 g of a brown oil is obtained. Purification of the indene is carried out via a column chromatography. Yield: 18.85 g (~85%) of 7-(4-tert-Butyl-phenyl)-2-[(1-methylcyclohexyl)methyl]-1H-indene.

$^1$H-NMR (500 MHz, $CDCl_3$, ppm): δ=7.48-7.44 (m, 4H, aromatic), 7.29 (m, 1H, aromatic), 7.25 (m, 1H, aromatic), 7.13 (m, 1H, aromatic), 6.56 (s, 1H, =CH), 3.47 (s, 2H, benzylic), 2.38 (s, 2H, aliphatic), 1.55-1.2 (br m, 10H, aliphatic), 1.37 (s, 9H, —C(CH$_3$)$_3$), 0.91 (s, 3H, CH$_3$).

Bis[4-(4-tert-butyl-phenyl)-2-[(1-methylcyclohexyl)methyl]-1H-inden-1-yl]-dimethyl-silane

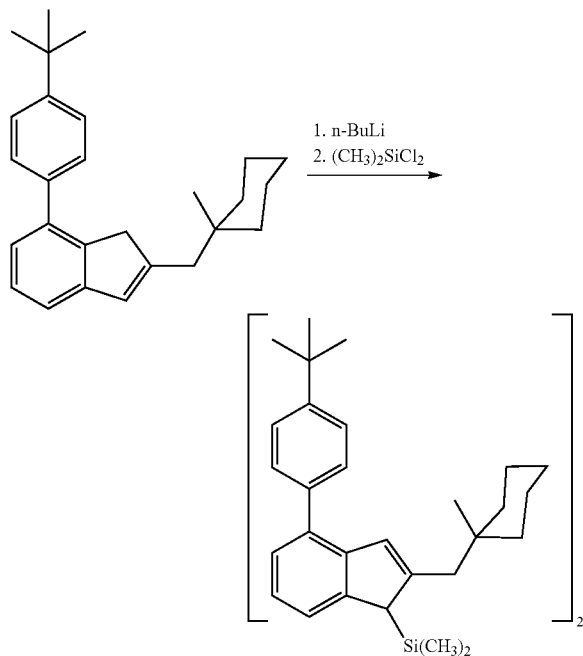

24.4 g (68.0 mmol) 7-(4-tert-Butyl-phenyl)-2-((1-methyl cyclohexyl)methyl)-1H-indene were dissolved in 414 ml of toluene and 122 ml of THF in a 1000 ml-round bottom flask. 28.6 ml of n-butyl lithium (2.5 M in toluene, 1.05 eq.) were added at room temperature and the solution was stirred 1 h at 80° C. After cooling to 40° C. 4.13 ml (0.5 eq.) of dimethyl-dichlorosilane were added in one portion and the mixture was stirred at 60° C. for 20 h. After cooling to room temperature 250 ml of water were added and the phases were separated. The aqueous layer was extracted once with 100 ml of toluene and the combined organic layers were washed once with 200 ml of saturated NaCl-solution, dried over magnesium sulphate and the solvent was evaporated in a vacuum. The crude product was purified via a column chromatography to yield 16.8 g (64%) of an isomeric mixture of the desired product. $^1$H-NMR (500 MHz, CDCl$_3$, ppm): δ=7.51-7.14 (multiple m's, 14H, aromatic), 6.82 and 6.80 (2×s, 2H, =CH), 3.94 and 3.85 (2×s, 2H, CH—SiMe$_2$), 2.53/2.35 and 2.38/2.21 (2×[2× "d"], 4H, CH$_2$—), 1.51-1.16 (multiple m's, 20H, aliphatic), 1.382 and 1.376 (2×s, 18H, —C(CH$_3$)$_3$), 0.85 and 0.80 (2×s, 6H, CH$_3$), −0.08, −0.28 and −0.52 (3×s, 6H, SiCH$_3$).

Dimethylsilandiylbis[2-[(1-methylcyclohexyl)methyl]-4-(tert-butylphenyl)-1-indenyl]-zirconium dichloride

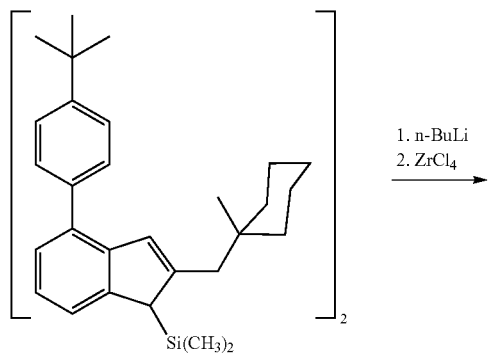

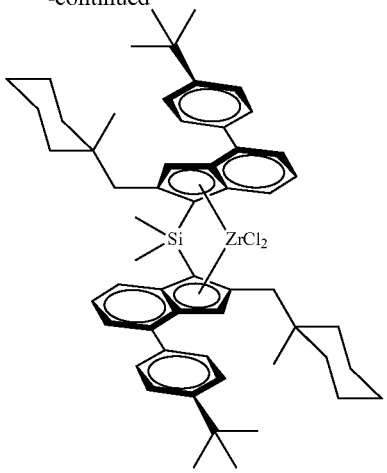

To 9.2 g (11.8 mmol) of Bis[4-(4-tert-butyl-phenyl)-2-[(1-methyl-cyclohexyl)methyl]-1H-inden-1-yl]-dimethylsilane were added 92 ml of dry diethyl ether in a 250 ml round bottom flask. Approx. 20 minutes after adding 9.8 ml of n-butyllithium (2.5 M in toluene, 2.05 eq.) at room temperature the initial suspension transformed into a clear orange solution. The mixture was stirred over night at this temperature and then was cooled to 0° C. 2.77 g (1 eq.) of zirconium tetrachloride were added and after warming to room temperature stirring was continued for 5 h. The crude reaction mixture was filtered over a G4 frit and the residue was washed twice with 10 ml of diethyl ether. The filter cake was extracted once with 30 ml, once with 20, once with 15 and once with 10 ml of hot toluene, from the filtrate 2.95 g of the metallocene with a rac/meso-ratio of 5:1 were obtained. For further r/m enrichment the product was crystallized from toluene. $^1$H-NMR (500 MHz, CDCl$_3$, ppm): δ=7.61 (m, 2H, aromatic), 7.53 (m, 4H, aromatic), 7.40 (m, 2+4H, aromatic), 7.33 (m, 2H, aromatic), 7.05 (m, 2H, aromatic), 6.91 (s, 2H, indenyl-H), 2.65 and 2.23 (2×"d", 2×2H, indenyl-CH$_2$), 1.48-1.08 (multiple m's, 20H, ring), 1.35 (s, 6H, CH$_{3,Si}$), 1.32 (s, 18H, C(CH$_3$)$_3$), 0.75 (s, 6H, CH$_3$).

Example 7

Dimethylsilandiylbis[2-[(1-methylcyclopentyl)methyl]-4-(4-tert-butyl phenyl)-1-indenyl]-zirconium dichloride Aldol condensation between 4-(4-tert-butyl-phenyl)-indan-1-one and 1-methyl-cyclopentanecarbaldehyde

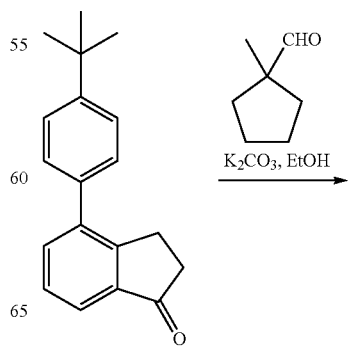

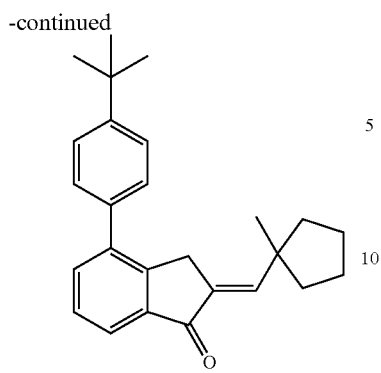

15.4 g (58.3 mmol) of 4-(4-tert-butyl-phenyl)-indan-1-one, 6.9 g (61.5 mmol) of 1-methyl-cyclopentylcarbaldehyde, 10.8 g (78.1 mmol) of potassium carbonate and 160 ml of ethanol are placed into a round bottom flask. The mixture is heated to a temperature of 76-78° C. with stirring for 50 h. 10% hydrochloric acid is added until no gas evolution is observed anymore and the precipitating salts are dissolved by adding enough water to dissolve them. The aqueous phase is extracted twice with 150 ml of methylene chloride. The combined organic phases are dried over $MgSO_4$ and the solvent is removed in a vacuum to yield 21.1 g of crude product. The crude product was used as-is for the subsequent steps.

Hydrogenation of 4-(4-tert-butyl-phenyl)-2-[(1-methylcyclopentyl)methylene]-indan-1-one

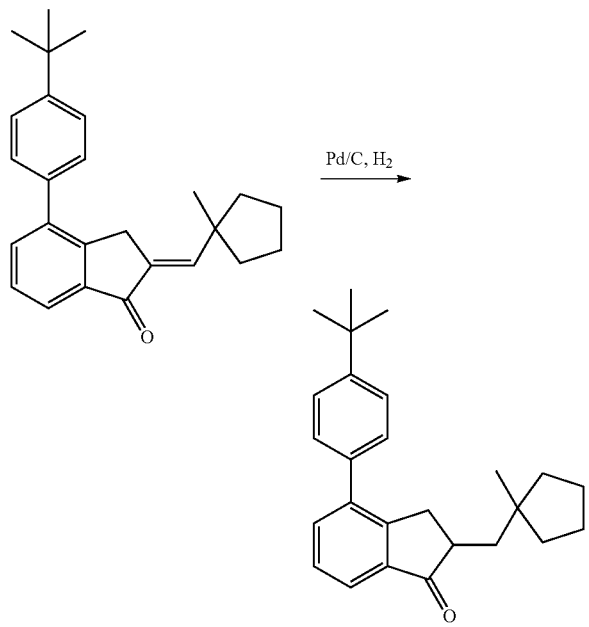

21.0 g of crude 4-(4-tert-butyl-phenyl)-2-(1-methyl-cyclohexylmethylene)-indan-1-one (GC: ~83% purity) are dissolved in 220 ml of ethyl acetate in a flask with gas inlet and stirrer. 1.5 g of palladium on activated carbon (10 wt-% palladium) are added. The system is evacuated and refilled with argon three times to remove oxygen and then evacuated and refilled with hydrogen three times. The stirrer is started and the reaction mixture is vigorously stirred to help the diffusion of hydrogen gas into the liquid reaction mixture. The hydrogen uptake is monitored and stirring is continued until the hydrogen uptake ceases. Filtering the crude reaction mixture over a paper filter and removing the solvent in a vacuum leaves crude 4-(4-tert-butyl-phenyl)-2-((1-methylcyclohexyl)methyl)-indan-1-one (yield 19.9 g, GC: ~86% purity). The obtained crude product was used without further purification for the subsequent reduction/elimination-sequence.

7-(4-tert-Butyl-phenyl)-2-[(1-methylcyclopentyl)methyl]-1H-indene

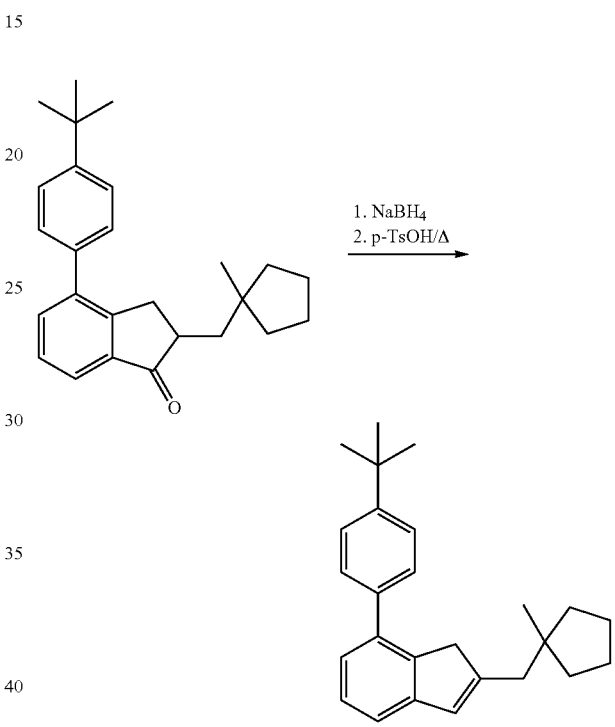

19.5 g of crude 4-(4-tert-butyl-phenyl)-2-[(1-methylcyclopentyl)methyl]-indan-1-one (~86% purity), 2.06 g (54.5 mmol) of $NaBH_4$ and 52 ml of toluene are charged in a flask equipped with reflux condenser, dropping funnel and magnetic stirring bar. The mixture is warmed to 50° C. and 10 ml of methanol are slowly added with stirring and stirring is continued for 2.5 h to ensure a complete reaction. Excess $NaBH_4$ is carefully hydrolyzed with approx. 30 ml of 2n $H_2SO_4$. The organic phase is separated and the water phase is washed with another 26 ml of toluene. The combined organic phases are twice extracted with 2n $H_2SO_4$ and dried over anhydrous $MgSO_4$. Most of the solvent is removed in a vacuum and replaced by fresh toluene up to a total volume of 75 ml and 0.22 g of p-toluenesulfonic acid are added. The reaction flask is fitted with a water separator and the reaction mixture is heated to reflux for 1.5 h. The conversion can be monitored by TLC. Once the dehydration is complete, the solution is washed with a saturated $NaHCO_3$ solution and dried over anhydrous $MgSO_4$. The solvent is thoroughly removed in a vacuum and a brown oil is obtained. Purification of the indene is carried out via a column chromatography. Yield: 13.8 g (~86%) of 7-(4-tert-Butyl-phenyl)-2-[(1-methylcyclopentyl)methyl]-1H-indene.

Bis[4-(4-tert-butyl-phenyl)-2-[(1-methylcyclopentyl)methyl]-1H-inden-1-yl]-dimethyl-silane

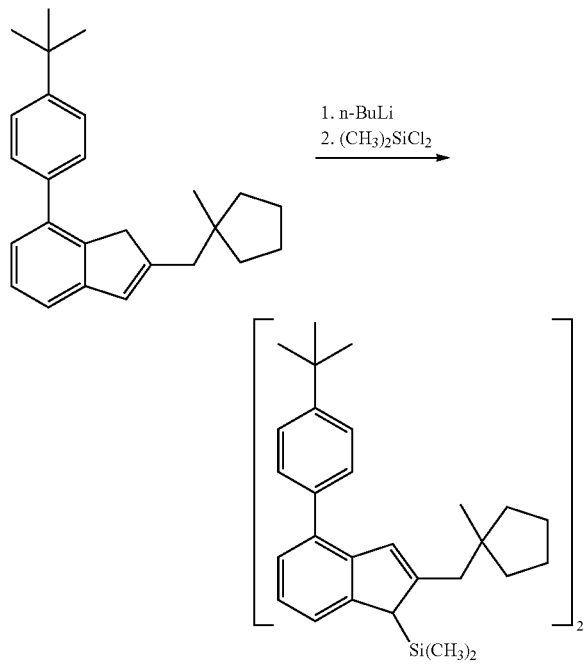

13 g (37.7 mmol) 7-(4-tert-Butyl-phenyl)-2-((1-methyl-cyclopentyl)methyl)-1H-indene were dissolved in 228 ml of toluene and 67 ml of THF in a 500 ml-round bottom flask. 15.8 ml of n-butyl lithium (2.5 M in toluene, 1.05 eq.) were added at room temperature and the solution was stirred 1 h at 80° C. After cooling to 40° C. 2.27 ml (0.5 eq.) of dimethyl-dichlorosilane were added in one portion and the mixture was stirred at 60° C. for 20 h. After cooling to room temperature 120 ml of water were added and the phases were separated. The aqueous layer was extracted once with 60 ml of toluene and the combined organic layers were washed once with 100 ml of saturated NaCl-solution, dried over Magnesium sulphate and the solvent was evaporated in a vacuum. The crude product was purified via a column chromatography to yield 9.4 g (67%) of the desired product.

Dimethylsilandiylbis[2-[(1-methylcyclopentyl)methyl]-4-(tert-butylphenyl)-1-indenyl]-zirconium dichloride

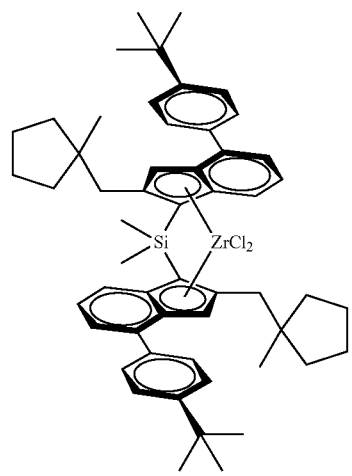

To 9.0 g (12.1 mmol) of Bis[4-(4-tert-butyl-phenyl)-2-[(1-methyl cyclopentyl)-methyl]-1H-inden-1-yl]dimethyl-silane were added 94 ml of dry diethyl ether in a 250 ml round bottom flask. Approx. 20 minutes after adding 9.9 ml of n-butyllithium (2.5 M in toluene, 2.05 eq.) at room temperature the initial suspension transformed into a clear orange solution. The mixture was stirred over night at this temperature and then was cooled to 0° C. 2.82 g (1 eq.) of zirconium tetrachloride were added and after warming to room temperature stirring was continued for 5 h. The crude reaction mixture was filtered over a G4 frit and the residue was washed twice with 10 ml of diethyl ether. The filter cake was extracted once with 30 ml, once with 20, once with 15 and once with 10 ml of hot toluene, from the filtrate 2.95 g of the metallocene with a rac/meso-ratio of 4:1 were obtained. For further r/m enrichment the product was crystallized from toluene.

Example 8

Dimethylsilandiylbis[2-[(1-ethylcyclohexyl)methyl]-4-(4-tert-butylphenyl)-1-indenyl]-zirconium dichloride Aldol condensation between 4-(4-tert-butyl-phenyl)-indan-1-one and 1-ethyl-cyclohexanecarbaldehyde

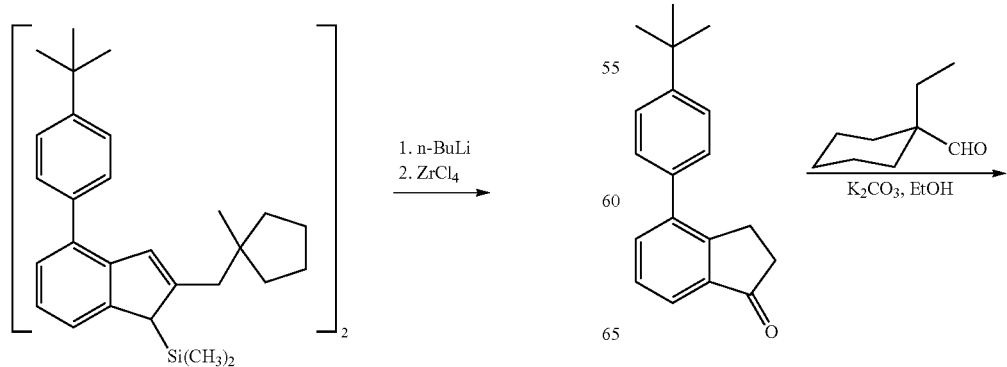

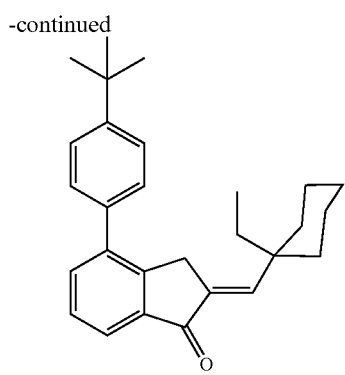

18.6 g (70.4 mmol) of 4-(4-tert-butyl-phenyl)-indan-1-one, 10.3 g (73.5 mmol) of 1-ethyl-cyclohexylcarbaldehyde, 13.0 g (94.1 mmol) of potassium carbonate and 160 ml of ethanol are placed into a round bottom flask. The mixture is heated to a temperature of 76-78° C. with stirring for 50 h. 10% hydrochloric acid is added until no gas evolution is observed anymore and the precipitating salts are dissolved by adding enough water to dissolve them. The aqueous phase is extracted twice with 150 ml of methylene chloride. The combined organic phases are dried over MgSO$_4$ and the solvent is removed in a vacuum to yield 25.9 g of crude product. The crude product was used as-is for the subsequent steps.

Hydrogenation of 4-(4-tert-butyl-phenyl)-2-[(1-ethylcyclohexyl)methylene]-indan-1-one

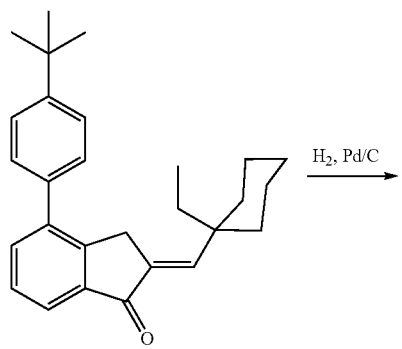

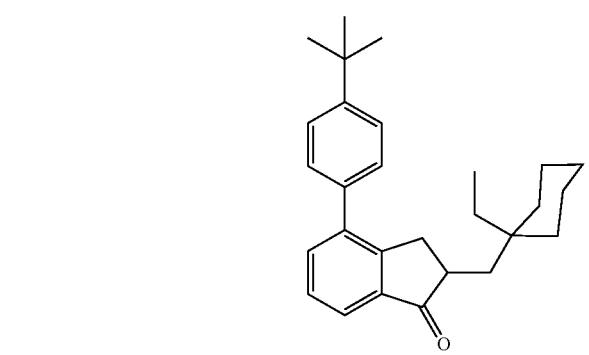

25.0 g of crude 4-(4-tert-butyl-phenyl)-2-(1-ethylcyclohexylmethylene)-indan-1-one (GC: ~83% purity) are dissolved in 250 ml of ethyl acetate in a flask with gas inlet and stirrer. 1.75 g of palladium on activated carbon (10 wt-% palladium) are added. The system is evacuated and refilled with argon three times to remove oxygen and then evacuated and refilled with hydrogen three times. The stirrer is started and the reaction mixture is vigorously stirred to help the diffusion of hydrogen gas into the liquid reaction mixture. The hydrogen uptake is monitored and stirring is continued until the hydrogen uptake ceases. Filtering the crude reaction mixture over a paper filter and removing the solvent in a vacuum leaves crude 4-(4-tert-butyl-phenyl)-2-(1-ethyl-cyclohexylmethyl)-indan-1-one (yield 24.4 g, GC: ~82% purity). The obtained crude product was used without further purification for the subsequent reduction/elimination-sequence.

7-(4-tert-Butyl-phenyl)-2-[(1-ethylcyclohexyl)methyl]-1H-indene

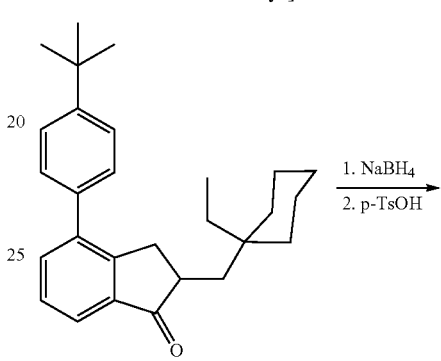

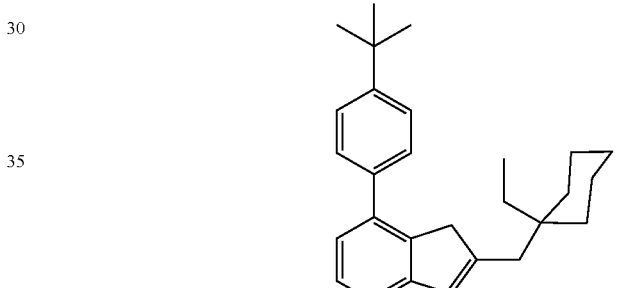

24.0 g of crude 4-(4-tert-butyl-phenyl)-2-[(1-ethylcyclohexyl)methyl]indan-1-one (~82% purity), 2.4 g (63.4 mmol) of NaBH$_4$ and 60 ml of toluene are charged in a flask equipped with reflux condenser, dropping funnel and magnetic stirring bar. The mixture is warmed to 50° C. and 12 ml of methanol are slowly added with stirring and stirring is continued for 2.5 h to ensure a complete reaction. Excess NaBH$_4$ is carefully hydrolyzed with approx. 35 ml of 2n H$_2$SO$_4$. The organic phase is separated and the water phase is washed with another 30 ml of toluene. The combined organic phases are twice extracted with 2n H$_2$SO$_4$ and dried over anhydrous MgSO$_4$. Most of the solvent is removed in a vacuum and replaced by fresh toluene up to a total volume of 90 ml and 0.26 g of p-toluenesulfonic acid are added. The reaction flask is fitted with a water separator and the reaction mixture is heated to reflux for 1.5 h. The conversion can be monitored by TLC. Once the dehydration is complete, the solution is washed with a saturated NaHCO$_3$ solution and dried over anhydrous MgSO$_4$. The solvent is thoroughly removed in a vacuum and 22.4 g of a brown oil is obtained. Purification of the indene is carried out via a column chromatography. Yield: 15.3 g (~81%) of 7-(4-tert-Butyl-phenyl)-2-[(1-ethylcyclohexyl)methyl]-1H-indene.

Bis[4-(4-tert-butyl-phenyl)-2-[(1-ethylcyclohexyl)methyl]-1H-inden-1-yl]-dimethyl-silane

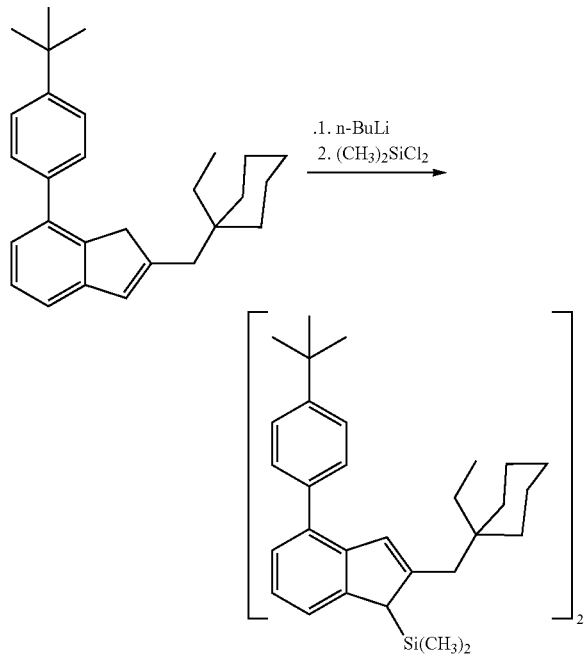

15 g (40.3 mmol) 7-(4-tert-Butyl-phenyl)-2-((1-ethyl cyclohexyl)methyl)-1H-indene were dissolved in 245 ml of toluene and 72 ml of THF in a 1000 ml-round bottom flask. 16.9 ml of n-butyl lithium (2.5 M in toluene, 1.05 eq.) were added at room temperature and the solution was stirred 1 h at 80° C. After cooling to 40° C. 2.43 ml (0.5 eq.) of dimethyl-dichlorosilane were added in one portion and the mixture was stirred at 60° C. for 20 h. After cooling to room temperature 150 ml of water were added and the phases were separated. The aqueous layer was extracted once with 60 ml of toluene and the combined organic layers were washed once with 150 ml of saturated NaCl-solution, dried over magnesium sulphate and the solvent was evaporated in a vacuum. The crude product was purified via a column chromatography to yield 10.0 g (62%) of the desired product.

Dimethylsilandiylbis[2-[(1-ethylcyclohexyl)methyl]-4-(tert-butylphenyl)-1-indenyl]-zirconium dichloride

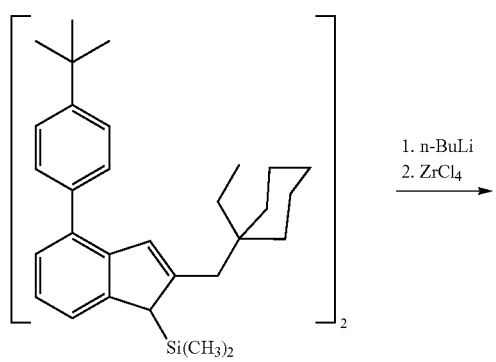

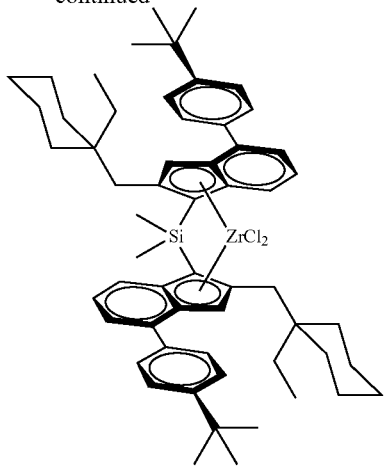

To 9.8 g (12.2 mmol) of Bis[4-(4-tert-butyl-phenyl)-2-[(1-ethyl-cyclohexyl)methyl]-1H-inden-1-yl]-dimethylsilane were added 95 ml of dry diethyl ether in a 250 ml round bottom flask. Approx. 20 minutes after adding 10.0 ml of n-butyllithium (2.5 M in toluene, 2.05 eq.) at room temperature the initial suspension transformed into a clear orange solution. The mixture was stirred over night at this temperature and then was cooled to 0° C. 2.84 g (1 eq.) of zirconium tetrachloride were added and after warming to room temperature stirring was continued for 5 h. The crude reaction mixture was filtered over a G4 frit and the residue was washed twice with 10 ml of diethyl ether. The filter cake was extracted once with 30 ml, once with 20, once with 15 and once with 10 ml of hot toluene, from the filtrate 2.80 g of the metallocene with a rac/meso-ratio of 5:1 were obtained. For further r/m enrichment the product was crystallized from toluene.

Preparation of Methylaluminoxane Treated Silica

Example 9

To a stirred suspension of 293 g of silica (Grace XPO2107, dried at 180° C. and 1 mbar for 16 hours, LOD<0.5 wt % and LOI=2.6 wt %) in 1500 mL of toluene is added slowly 300 mL of a 30 wt-% solution of methylaluminoxane in toluene (Albemarle Corporation) at room temperature. During the addition the temperature must not exceed 30° C. After the addition is complete, the mixture is stirred for two hours at room temperature and separated by filtration. The residue is washed with two 1500 mL portions of toluene and three 1500 mL portions of isohexane and dried in vacuum to constant weight. The methylaluminoxane treated silica is obtained as a free-flowing powder in a yield of 408 g.

Example 10

There is no Example 10 in this application. In order to make it easier for the reader to correlate the metallocenes made in Examples 1 thru 8, to the catalysts made in Examples 11 through 18, example 10 has been omitted. In this manner, the metallocene of Example 1 is used to prepare the catalyst in Example 11, similarly, the metallocene of Comparative Example 4 is now used to produce the catalyst of Comparative Example 14, etc.

Preparation of Supported Metallocene Catalysts

Comparative Example 11

10.0 g of the methylaluminoxane treated silica prepared in Example 9 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 326 mg of rac-Dimethylsilanediylbis(2-(cyclohexylmethyl)-4-(4-tert-butyl-phenyl)-1-indenyl)-zirconium dichloride (prepared in Comparative Example 1) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 12.0 g.

Comparative Example 12

10.0 g of the methylaluminoxane treated silica prepared in Example 9 are placed in a flitted glass filter as a column with a smooth surface. A minimal amount of toluene is added and the treated silica is carefully stirred with a spatula to remove any air pockets in the column. The excess toluene is removed by filtration leaving a smooth surface. In a separate flask 307 mg of rac-Dimethylsilanediylbis(2-(tert-butylmethyl)-4-(4-tert-butylphenyl)-1-indenyl)-zirconium dichloride (prepared in Comparative Example 2) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 11.4 g.

Comparative Example 13

10.0 g of the methylaluminoxane treated silica prepared in Example 9 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 363 mg of rac-Dimethylsilanediylbis(2-(1-adamantylmethyl)-4-(4-tert-butylphenyl)-1-indenyl)-zirconium dichloride (prepared in Comparative Example 3) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added, on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing reddish powder in a yield of 11.8 g.

Comparative Example 14

10.0 g of the methylaluminoxane treated silica prepared in Example 9 are placed in a fitted glass filter as a column with a smooth surface. A minimal amount of toluene is added and the treated silica is carefully stirred with a spatula to remove any air pockets in the column. The excess toluene is removed by filtration leaving a smooth surface. In a separate flask 267 mg of rac-Dimethylsilanediylbis(2-methyl-4-(4-tert-butylphenyl)-1-indenyl)-zirconium dichloride (prepared in Comparative Example 4) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing orange powder in a yield of 11.9 g.

Comparative Example 15

10.0 g of the methylaluminoxane treated silica prepared in Example 9 are placed in a fitted glass filter as a column with a smooth surface. A minimal amount of toluene is added and the treated silica is carefully stirred with a spatula to remove any air pockets in the column. The excess toluene is removed by filtration leaving a smooth surface. In a separate flask 277 mg of rac-Dimethylsilanediyl(2-methyl-4-(4-tert-butylphenyl)indenyl)(2-isopropyl-4-(4-tert-butylphenyl)indenyl)zirconium dichloride (prepared in Comparative Example 5) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing orange powder in a yield of 11.9 g.

Example 16

10.0 g of the methylaluminoxane treated silica prepared in Example 9 are placed in a flitted glass filter as a column with a smooth surface. A minimal amount of toluene is added and the treated silica is carefully stirred with a spatula to remove any air pockets in the column. The excess toluene is removed by filtration leaving a smooth surface. In a separate flask 336 mg of rac-Dimethylsilandiylbis[2-[(1-methylcyclohexyl)methyl]-4-(tert-butylphenyl)-1-indenyl]-zirconium dichloride (prepared in Example 6) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing orange powder in a yield of 11.6 g.

Example 17

10.0 g of the methylaluminoxane treated silica prepared in Example 9 are placed in a fitted glass filter as a column with a smooth surface. A minimal amount of toluene is added and the treated silica is carefully stirred with a spatula to remove any air pockets in the column. The excess toluene is removed by filtration leaving a smooth surface. In a separate flask 326 ng of rac-Dimethylsilandiylbis[2-[(1-methylcyclopentyl)methyl]-4-(tert-butylphenyl)-1-indenyl]-zirconium dichloride (prepared in Example 7) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing orange powder in a yield of 11.3 g.

Example 18

10.0 g of the methylaluminoxane treated silica prepared in Example 9 are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 346 mg of rac-Dimethylsilandiylbis[2-[(1-ethylcyclohexyl)methyl]-4-(tert-butylphenyl)-1-indenyl]-zirconium dichloride (prepared in Example 8) are mixed with 27 mL of toluene and 13.6 mL of a 30 wt-% solution of methylaluminoxane in toluene (Albemarle Corporation). The slurry is stirred at room temperature for one hour to give an orange solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing orange powder in a yield of 11.5 g.

Example 19

The reader will note that in the tables comparing results, Example 19 and Comparative Example 20 are separated from the comparisons made between all other inventive Examples and Comparative Examples. The reason for this is that the catalysts for both inventive Example 18 and Comparative Example 19 were prepared by a special process previously revealed by the inventors in U.S. Pat. No. 7,169,864 that has been demonstrated to increase the activity of metallocene catalysts over standard preparation methods. It would be inaccurate to compare catalysts made by the '864 method to those made by standard metallocene preparation methods.

To a stirred suspension of 100 g of silica (Grace XPO8001, dried at 180° C. and 1 mbar for 16 hours, LOD<0.5 wt % and LOI=2.5 wt %) in 480 mL of toluene is added slowly 250 mL of a 30 wt-% solution of methylaluminoxane in toluene (Albemarle Corporation) at room temperature. For safety reasons not related to the efficacy of the process or the catalyst, during the addition the temperature should not exceed 30° C. After the addition is complete, the mixture is stirred for half an hour at room temperature and then heated and allowed to reflux for four hours. After cooling down to room temperature the solvent is separated by filtration. The residue is washed with two 500 mL portions of toluene and three 500 mL portions of isohexane and dried in vacuum to constant weight. The methylaluminoxane treated silica is obtained as a free-flowing powder in a yield of 180 g.

10.0 g of the methylaluminoxane treated silica are placed in a fitted glass filter as a column with a smooth surface. A minimal amount of toluene is added and the treated silica is carefully stirred with a spatula to remove any air pockets in the column. The excess toluene is removed by filtration leaving a smooth surface. In a separate flask 336 mg of rac-Dimethylsilandiylbis[2-[(1-methylcyclohexyl)methyl]-4-(tert-butylphenyl)-1-indenyl]-zirconium dichloride (prepared in Example 6) are mixed with 10 mL of toluene and 33.4 mL of a 10 wt-% solution of triisobutylaluminum in heptane (Akzo Nobel). The slurry is stirred at room temperature for one hour. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing powder in a yield of 12 g.

Comparative Example 20

To a stirred suspension of 100 g of silica (Grace XPO8001, dried at 180° C. and 1 mbar for 16 hours, LOD<0.5 wt % and LOI=2.5 wt %) in 480 mL of toluene is added slowly 250 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 500 mL portions of toluene and three 500 mL portions of isohexane and dried in vacuum to constant weight. The methylaluminoxane treated silica is obtained as a free-flowing powder in a yield of 180 g.

10.0 g of the methylaluminoxane treated silica are placed in a fritted glass filter as a column with a smooth surface. A minimal amount of toluene is added and the treated silica is carefully stirred with a spatula to remove any air pockets in the column. The excess toluene is removed by filtration leaving a smooth surface. In a separate flask 326 mg of rac-Dimethylsilanediylbis(2-(cyclohexylmethyl)-4-(4-tert-butyl-phenyl)-1-indenyl)-zirconium dichloride (prepared in Comparative Example 1) are mixed with 10 mL of toluene and 33.4 mL of a 10 wt-% solution of triisobutylaluminum in heptane (Akzo Nobel). The slurry is stirred at room temperature for one hour. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is washed twice with isohexane (20 mL) and dried in a nitrogen purge to constant weight. The catalyst is obtained as free-flowing powder in a yield of 11.8 g.

Polymerizations:

Polymerization Procedure (Batch Propylene Homo- and Co-Polymerization):

A dry and nitrogen purged 5 dm$^3$ autoclave equipped with a stirrer is charged with if desired 100 g of metallocene polymer seed bed. Optionally, a certain amount of hydrogen is metered in. Triisobutylaluminum (1 cm$^3$ of a 10 wt.-% solution in heptane), liquid propylene (one-half of the total amount used for the run), and optionally, a certain amount of ethylene are metered in and the mixture is stirred for at least 5 minutes (stirrer speed 200 rpm) at 20° C. Then supported metallocene catalyst, suspended in 5 cm$^3$ of white oil, is injected with liquid propylene (one-half of total amount used for the run). The reactor is heated to the internally measured run temperature (65, 60 or 30° C.) within 11 minutes. The polymerization reaction is allowed to proceed at the run temperature for either 15 or 60 minutes. During the 60 min copolymerization runs the reactor pressure was maintained by continuous feeding of ethylene and propylene. The polymerization is stopped by releasing the monomer and cooling down the reactor. The polymer is discharged and dried under reduced pressure.

TABLE 1

Polymerisations

| Poly. Example | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 1 | Comp 11 | — | 1838 | — | 61 | 65 | 60 | 478 | 7,800 |
| 2 | Comp 11 | 50 | 1837 | — | 55 | 65 | 60 | 1117 | 19,900 |
| 3 | Comp 11 | — | 1192 | 25 | 30 | 60 | 60 | 183 | 6,100 |
| 4 | Comp 11 | — | 1182 | 38 | 30 | 60 | 60 | 135 | 4,500 |
| 5 | Comp 11 | — | 1836 | 60 | 75 | 65 | 15 | 190 | 10,100 |
| 6 | Comp 11 | — | 1185 | 75 | 30 | 60 | 60 | 108 | 3,600 |
| 7 | Comp 11 | — | 1115 | 110 | 30 | 60 | 60 | 98 | 3,300 |
| 8 | Comp 11 | — | 1767 | 120 | 75 | 65 | 15 | 195 | 10,400 |
| 9 | Comp 11 | — | 1700 | 180 | 75 | 65 | 15 | 210 | 11,200 |
| 10 | Comp 11 | — | 55 | 100 | 50 | 60 | 60 | | |
| 11 | Comp 11 | — | 55 | 125 | 50 | 60 | 60 | | |
| 12 | Comp 11 | — | 55 | 142 | 50 | 60 | 60 | | |
| 13 | Comp 12 | — | 1837 | — | 105 | 65 | 60 | 422 | 4,000 |
| 14 | Comp 12 | 50 | 1836 | — | 26 | 65 | 60 | 457 | 17,500 |
| 15 | Comp 12 | — | 55 | 142 | 50 | 60 | 60 | | |
| 16 | Comp 13 | — | 1837 | — | 97 | 65 | 60 | 410 | 4,200 |
| 17 | Comp 13 | 50 | 1836 | — | 30 | 65 | 60 | 490 | 17,500 |
| 18 | Comp 13 | — | 55 | 142 | 50 | 60 | 60 | | |
| 19 | Comp 14 | — | 1830 | — | 105 | 65 | 60 | 517 | 4,920 |
| 20 | Comp 14 | 50 | 1830 | — | 56 | 65 | 60 | 667 | 11,910 |
| 21 | Comp 14 | — | 55 | 142 | 50 | 60 | 60 | | |
| 22 | Comp 15 | — | 1836 | — | 104 | 65 | 60 | 215 | 2,070 |
| 23 | Comp 15 | 50 | 1834 | — | 61 | 65 | 60 | 581 | 9,520 |
| 24 | Comp 15 | — | 55 | 142 | 50 | 60 | 60 | | |
| 25 | Ex 16 | — | 1830 | — | 100 | 65 | 60 | 820 | 8,200 |
| 26 | Ex 16 | 50 | 1831 | — | 41 | 65 | 60 | 1125 | 27,400 |
| 27 | Ex 16 | — | 1189 | 25 | 30 | 60 | 60 | 242 | 8,050 |
| 28 | Ex 16 | — | 1240 | 40 | 30 | 60 | 60 | 238 | 7,900 |
| 29 | Ex 16 | — | 1845 | 60 | 75 | 65 | 15 | 211 | 11,250 |
| 30 | Ex 16 | — | 1264 | 80 | 32 | 60 | 60 | 206 | 6,400 |
| 31 | Ex 16 | — | 1010 | 100 | 28 | 60 | 60 | 188 | 6,700 |
| 32 | Ex 16 | — | 1800 | 120 | 75 | 65 | 15 | 248 | 13,200 |
| 33 | Ex 16 | — | 1610 | 170 | 75 | 65 | 15 | 296 | 15,800 |
| 34 | Ex 16 | — | 55 | 100 | 50 | 60 | 60 | | |
| 35 | Ex 16 | — | 55 | 125 | 50 | 60 | 60 | | |
| 36 | Ex 16 | — | 55 | 142 | 50 | 60 | 60 | | |
| 37 | Ex 17 | — | 1820 | — | 98 | 65 | 60 | 808 | 8,100 |
| 38 | Ex 17 | 50 | 1835 | — | 40 | 65 | 60 | 1013 | 25,300 |
| 39 | Ex 17 | — | 55 | 142 | 30 | 60 | 60 | | |
| 40 | Ex 18 | — | 1800 | — | 100 | 65 | 60 | 790 | 7,900 |
| 41 | Ex 18 | 50 | 1820 | — | 39 | 65 | 60 | 824 | 21,100 |
| 42 | Ex 18 | — | 55 | 142 | 30 | 60 | 60 | | |
| 43 | Ex 19 | — | 1835 | — | 45 | 65 | 60 | 443 | 9,800 |
| 44 | Ex 19 | 50 | 1835 | — | 15 | 65 | 60 | 923 | 61,500 |
| 45 | Ex 19 | — | 55 | 142 | 30 | 60 | 60 | 260 | 8,700 |
| 46 | Ex 19 | — | 1809 | 60 | 50 | 65 | 15 | 173 | 13,850 |

TABLE 1-continued

| | | | | | | Polym. | Polym. | | Productivity |
|---|---|---|---|---|---|---|---|---|---|
| Poly. Example | Catalyst from | H2 [mg] | C3 [g] | C2 [g] | Catalyst [mg] | Temp. [° C.] | Time [min] | Yield [g] | [g polymer/g catalyst*hour] |
| 47 | Ex 19 | — | 1752 | 120 | 50 | 65 | 15 | 245 | 19,600 |
| 48 | Ex 19 | — | 1696 | 180 | 30 | 65 | 15 | 175 | 23,000 |
| 49 | Ex 19 | — | 1628 | 240 | 30 | 65 | 5 | 145 | 58,000 |
| 50 | Ex 19 | 14 | 234 | 558 | 30 | 65 | 45 | 320 | 14,200 |
| 51 | Ex 19 | 25 | 1806 | 60 | 50 | 65 | 15 | 250 | 20,000 |
| 52 | Ex 19 | 25 | 1749 | 120 | 50 | 65 | 15 | 285 | 22,800 |
| 53 | Ex 19 | 25 | 1697 | 180 | 30 | 65 | 15 | 170 | 36,000 |
| 54 | Ex 19 | 25 | 1630 | 240 | 30 | 65 | 5 | 140 | 56,000 |
| 55 | Ex 19 | 25 | 1224 | 5 | 51 | 70 | 15 | 333 | 26,300 |
| 56 | Ex 19 | 25 | 1225 | 15 | 51 | 70 | 15 | 314 | 24,500 |
| 57 | Ex 19 | 25 | 1225 | 25 | 52 | 70 | 15 | 276 | 21,200 |
| 58 | Ex 19 | 25 | 1223 | 35 | 53 | 70 | 15 | 283 | 21,200 |
| 59 | Comp 20 | — | 1830 | — | 45 | 65 | 60 | 362 | 8,000 |
| 60 | Comp 20 | 50 | 1840 | — | 16 | 65 | 60 | 518 | 32,400 |
| 61 | Comp 20 | — | 55 | 142 | 30 | 60 | 60 | | |

TABLE 2

Polymer Properties:

| Poly. Example | Catalyst From Example | C2 [wt %] | Tm [deg C.] | MFR 2.16 [g/10'] | MFR 5 [g/10'] | Mw [kg/mol] | Mw/Mn |
|---|---|---|---|---|---|---|---|
| 1 | Comp 11 | — | 151 | 0.14 | 0.4 | 846 | 3.4 |
| 2 | Comp 11 | — | 151 | 11 | 34 | 235 | 2.6 |
| 3 | Comp 11 | 1.3 | 140 | 0.2 | 0.9 | 582 | 2.7 |
| 4 | Comp 11 | 1.7 | 137 | 0.3 | 1.2 | 544 | 2.5 |
| 5 | Comp 11 | 2.1 | 135 | 0.5 | 1.7 | 523 | 2.9 |
| 6 | Comp 11 | 3.8 | 123 | 0.8 | 3.0 | 413 | 2.6 |
| 7 | Comp 11 | 5.7 | 111 | 0.6 | 2.5 | 454 | 2.9 |
| 8 | Comp 11 | 4.3 | 118 | 0.8 | 3.1 | 422 | 2.9 |
| 9 | Comp 11 | 6.5 | 103 | 0.4 | 1.5 | 491 | 2.8 |
| 10 | Comp 11 | 39.7 | amorphous | 6.9 | 21 | 280 | 2.7 |
| 11 | Comp 11 | 49.1 | amorphous | 11.5 | 35 | 188 | 2.8 |
| 12 | Comp 11 | 56.0 | amorphous | 16.7 | 51.5 | 166 | 2.6 |
| 13 | Comp 12 | — | 151 | <0.1 | 0.2 | 763 | 2.7 |
| 14 | Comp 12 | — | 150 | 18 | 55 | 172 | 2.3 |
| 15 | Comp 12 | 57.1 | amorphous | 0.5 | 1.7 | 440 | 2.7 |
| 16 | Comp 13 | — | 152 | <0.1 | <0.1 | 920 | 2.6 |
| 17 | Comp 13 | — | 153 | 11 | 30 | 241 | 2.6 |
| 18 | Comp 13 | 56.0 | amorphous | <0.1 | 0.2 | 760 | 2.7 |
| 19 | Comp 14 | — | 151 | 0.35 | 1.8 | 730 | 4.0 |
| 20 | Comp 14 | — | 151 | 4.3 | 12 | 216 | 3.9 |
| 21 | Comp 14 | 49.5 | amorphous | 25.4 | 81.0 | 170 | 3.3 |
| 22 | Comp 15 | — | 153 | 1.2 | 4.0 | 387 | 2.8 |
| 23 | Comp 15 | — | 155 | 45.3 | 152 | 146 | 2.4 |
| 24 | Comp 15 | 53.2 | amorphous | 0.2 | 0.7 | 632 | 2.9 |
| 25 | Ex 16 | — | 152 | <0.1 | <0.1 | 910 | 2.9 |
| 26 | Ex 16 | — | 153 | 11 | 35 | 232 | 2.8 |
| 27 | Ex 16 | 1.4 | 140 | 0.1 | 0.3 | 682 | 2.8 |
| 28 | Ex 16 | 1.5 | 138 | 0.1 | 0.4 | 678 | 2.5 |
| 29 | Ex 16 | 2.4 | 133 | 0.1 | 0.3 | 692 | 3.1 |
| 30 | Ex 16 | 4.1 | 121 | 0.2 | 0.4 | 659 | 2.7 |
| 31 | Ex 16 | 6.0 | 110 | 0.1 | 0.3 | 684 | 2.6 |
| 32 | Ex 16 | 4.5 | 118 | 0.2 | 0.4 | 649 | 2.6 |
| 33 | Ex 16 | 7.2 | 102 | 0.1 | 0.3 | 662 | 2.6 |
| 34 | Ex 16 | 41.3 | amorphous | 0.1 | 0.4 | 659 | 2.9 |
| 35 | Ex 16 | 51.9 | amorphous | 0.2 | 0.8 | 614 | 2.5 |
| 36 | Ex 16 | 56.0 | amorphous | 0.1 | 0.6 | 676 | 2.7 |
| 37 | Ex 17 | — | 153 | 0.1 | 0.2 | 683 | 2.8 |
| 38 | Ex 17 | — | 153 | 16 | 61 | 202 | 2.9 |
| 39 | Ex 17 | 54.0 | amorphous | 0.2 | 0.7 | 646 | 2.9 |
| 40 | Ex 18 | — | 151 | 0.2 | 0.8 | 629 | 2.6 |
| 41 | Ex 18 | — | 152 | 21 | 76 | 189 | 3.3 |
| 42 | Ex 18 | 52.1 | amorphous | 0.2 | 0.7 | 648 | 3.1 |
| 43 | Ex 19 | — | 153 | <0.1 | 0.3 | 726 | 3.2 |
| 44 | Ex 19 | — | 153 | 15 | — | 215 | 2.9 |
| 45 | Ex 19 | 55.3 | amorphous | 0.1 | 0.4 | 682 | 2.8 |
| 46 | Ex 19 | 2.1 | 133 | 0.12 | 0.6 | 581 | 2.7 |
| 47 | Ex 19 | 6.8 | 118 | 0.1 | 0.5 | 568 | 2.5 |

TABLE 2-continued

Polymer Properties:

| Poly. Example | Catalyst From Example | C2 [wt %] | Tm [deg C.] | MFR 2.16 [g/10'] | MFR 5 [g/10'] | Mw [kg/mol] | Mw/Mn |
|---|---|---|---|---|---|---|---|
| 48 | Ex 19 | 10.1 | 102 | 0.1 | 0.3 | 606 | 3.2 |
| 49 | Ex 19 | 12.4 | 92 | 0.1 | 0.4 | 641 | 2.7 |
| 50 | Ex 19 | 57.4 | — | 0.1 | 0.4 | 709 | 2.9 |
| 51 | Ex 19 | 2.3 | 134 | 8.8 | 31 | 267 | 2.7 |
| 52 | Ex 19 | 4.3 | 119 | 2.5 | 9.4 | 306 | 3.3 |
| 53 | Ex 19 | 7.1 | 103 | 1.6 | 7.4 | 355 | 3.3 |
| 54 | Ex 19 | 9.3 | 91 | 1.4 | 4.7 | 382 | 3.2 |
| 55 | Ex 19 | 0.4 | 153 | 15 | — | 209 | 2.7 |
| 56 | Ex 19 | 1.2 | 147 | 12 | — | 210 | 2.8 |
| 57 | Ex 19 | 2.0 | 142 | 10 | — | 227 | 2.8 |
| 58 | Ex 19 | 2.8 | 139 | 9 | — | 232 | 2.9 |
| 59 | Comp 20 | — | 151 | 0.1 | 0.4 | 729 | 3.5 |
| 60 | Comp 20 | — | 151 | 12 | 37 | 225 | 2.8 |
| 61 | Comp 20 | 56.0 | amorphous | 18 | 55 | 149 | 2.9 |

TABLE 3

Propylene, NO Hydrogen, NO Ethylene

| Test Run | Catalyst Example | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 1 | Comp 11 | — | 1838 | — | 61 | 65 | 60 | 478 | 7,800 |
| 13 | Comp 12 | — | 1837 | — | 105 | 65 | 60 | 422 | 4,000 |
| 16 | Comp 13 | — | 1837 | — | 97 | 65 | 60 | 410 | 4,200 |
| 19 | Comp 14 | — | 1830 | — | 105 | 65 | 60 | 517 | 4,920 |
| 22 | Comp 15 | — | 1836 | — | 104 | 65 | 60 | 215 | 2,070 |
| 25 | Ex 16 | — | 1830 | — | 100 | 65 | 60 | 820 | 8,200 |
| 37 | Ex 17 | — | 1820 | — | 98 | 65 | 60 | 808 | 8,100 |
| 40 | Ex 18 | — | 1800 | — | 100 | 65 | 60 | 790 | 7,900 |
| 43 | Ex 19 | — | 1835 | — | 45 | 65 | 60 | 443 | 9,800 |
| 59 | Comp 20 | — | 1830 | — | 45 | 65 | 60 | 362 | 8,000 |

| Test Run | C2 [wt %] | Tm [deg C.] | MFR 2.16 [g/10'] | MFR 5 [g/10'] | Mw [kg/mol] | Mw/Mn |
|---|---|---|---|---|---|---|
| 1 | — | 151 | 0.14 | 0.4 | 846 | 3.4 |
| 13 | — | 151 | <0.1 | 0.2 | 763 | 2.7 |
| 16 | — | 152 | <0.1 | <0.1 | 920 | 2.6 |
| 19 | — | 151 | 0.35 | 1.8 | 730 | 4.0 |
| 22 | — | 153 | 1.2 | 4.0 | 387 | 2.8 |
| 25 | — | 152 | <0.1 | <0.1 | 910 | 2.9 |
| 37 | — | 153 | 0.1 | 0.2 | 683 | 2.8 |
| 40 | — | 151 | 0.2 | 0.8 | 629 | 2.6 |
| 43 | — | 153 | <0.1 | 0.3 | 726 | 3.2 |
| 59 | — | 151 | 0.1 | 0.4 | 729 | 3.5 |

TABLE 4

Propylene, Hydrogen, NO Ethylene

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 2 | Comp 11 | 50 | 1837 | — | 55 | 65 | 60 | 1117 | 19,900 |
| 14 | Comp 12 | 50 | 1836 | — | 26 | 65 | 60 | 457 | 17,500 |
| 17 | Comp 13 | 50 | 1836 | — | 30 | 65 | 60 | 490 | 17,500 |
| 20 | Comp 14 | 50 | 1830 | — | 56 | 65 | 60 | 667 | 11,910 |
| 23 | Comp 15 | 50 | 1834 | — | 61 | 65 | 60 | 581 | 9,520 |
| 26 | Ex 16 | 50 | 1831 | — | 41 | 65 | 60 | 1125 | 27,400 |
| 38 | Ex 17 | 50 | 1835 | — | 40 | 65 | 60 | 1013 | 25,300 |
| 41 | Ex 18 | 50 | 1820 | — | 39 | 65 | 60 | 824 | 21,100 |
| 44 | Ex 19 | 50 | 1835 | — | 15 | 65 | 60 | 923 | 61,500 |

TABLE 4-continued

| | | | | Propylene, Hydrogen, NO Ethylene | | | | | |
|---|---|---|---|---|---|---|---|---|---|
| 60 | Comp 20 | 50 | 1840 | — | 16 | 65 | 60 | 518 | 32,400 |

| Test Run | C2 [wt %] | Tm [deg C.] | MFR 2.16 [g/10'] | MFR 5 [g/10'] | Mw [kg/mol] | Mw/Mn |
|---|---|---|---|---|---|---|
| 2 | — | 151 | 11 | 34 | 235 | 2.6 |
| 14 | — | 150 | 18 | 55 | 172 | 2.3 |
| 17 | — | 153 | 11 | 30 | 241 | 2.6 |
| 20 | — | 151 | 4.3 | 12 | 216 | 3.9 |
| 23 | — | 155 | 45.3 | 152 | 146 | 2.4 |
| 26 | — | 153 | 11 | 35 | 232 | 2.8 |
| 38 | — | 153 | 16 | 61 | 202 | 2.9 |
| 41 | — | 152 | 21 | 76 | 189 | 3.3 |
| 44 | — | 153 | 15 | — | 215 | 2.9 |
| 60 | — | 151 | 12 | 37 | 225 | 2.8 |

TABLE 5

Propylene/Ethylene ratio ~48, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 3 | Comp 11 | — | 1192 | 25 | 30 | 60 | 60 | 183 | 6,100 |
| 27 | Ex 16 | — | 1189 | 25 | 30 | 60 | 60 | 242 | 8,050 |

| Test Run | C2 [wt %] | Tm [deg C.] | MFR 2.16 [g/10'] | MFR 5 [g/10'] | Mw [kg/mol] | Mw/Mn |
|---|---|---|---|---|---|---|
| 3 | 1.3 | 140 | 0.2 | 0.9 | 582 | 2.7 |
| 27 | 1.4 | 140 | 0.1 | 0.3 | 682 | 2.8 |

TABLE 6

Propylene/Ethylene ratio ~31, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 4 | Comp 11 | — | 1182 | 38 | 30 | 60 | 60 | 135 | 4,500 |
| 28 | Ex 16 | — | 1240 | 40 | 30 | 60 | 60 | 238 | 7,900 |
| 5 | Comp 11 | — | 1836 | 60 | 75 | 65 | 15 | 190 | 10,100 |
| 29 | Ex 16 | — | 1845 | 60 | 75 | 65 | 15 | 211 | 11,250 |

| Test Run | C2 [wt %] | Tm [deg C.] | MFR 2.16 [g/10'] | MFR 5 [g/10'] | Mw [kg/mol] | Mw/Mn |
|---|---|---|---|---|---|---|
| 4 | 1.7 | 137 | 0.3 | 1.2 | 544 | 2.5 |
| 28 | 1.5 | 138 | 0.1 | 0.4 | 678 | 2.5 |
| 5 | 2.1 | 135 | 0.5 | 1.7 | 523 | 2.9 |
| 29 | 2.4 | 133 | 0.1 | 0.3 | 692 | 3.1 |

TABLE 7

Propylene/Ethylene ratio ~16, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 6 | Comp 11 | — | 1185 | 75 | 30 | 60 | 60 | 108 | 3,600 |
| 30 | Ex 16 | — | 1264 | 80 | 32 | 60 | 60 | 206 | 6,400 |

TABLE 7-continued

Propylene/Ethylene ratio ~16, No Hydrogen

| Test Run | C2 [wt %] | Tm [deg C.] | MFR 2.16 [g/10'] | MFR 5 [g/10'] | Mw [kg/mol] | Mw/Mn |
|---|---|---|---|---|---|---|
| 6 | 3.8 | 123 | 0.8 | 3.0 | 413 | 2.6 |
| 30 | 4.1 | 121 | 0.2 | 0.4 | 659 | 2.7 |

TABLE 8

Propylene/Ethylene ratio ~15, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 8 | Comp 11 | — | 1767 | 120 | 75 | 65 | 15 | 195 | 10,400 |
| 32 | Ex 16 | — | 1800 | 120 | 75 | 65 | 15 | 248 | 13,200 |

| Test Run | C2 [wt %] | Tm [deg C.] | MFR 2.16 [g/10'] | MFR 5 [g/10'] | Mw [kg/mol] | Mw/Mn |
|---|---|---|---|---|---|---|
| 8 | 4.3 | 118 | 0.8 | 3.1 | 422 | 2.9 |
| 32 | 4.5 | 118 | 0.2 | 0.4 | 649 | 2.6 |

TABLE 9

Propylene/Ethylene ratio ~10, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 7 | Comp 11 | — | 1115 | 110 | 30 | 60 | 60 | 98 | 3,300 |
| 31 | Ex 16 | — | 1010 | 100 | 28 | 60 | 60 | 188 | 6,700 |

| Test Run | C2 [wt %] | Tm [deg C.] | MFR 2.16 [g/10'] | MFR 5 [g/10'] | Mw [kg/mol] | Mw/Mn |
|---|---|---|---|---|---|---|
| 7 | 5.7 | 111 | 0.6 | 2.5 | 454 | 2.9 |
| 31 | 6.0 | 110 | 0.1 | 0.3 | 684 | 2.6 |

TABLE 10

Propylene/Ethylene ratio ~9.4, No Hydrogen

| Test Run | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 9 | Comp 11 | — | 1700 | 180 | 75 | 65 | 15 | 210 | 11,200 |
| 33 | Ex 16 | — | 1610 | 170 | 75 | 65 | 15 | 296 | 15,800 |

| Test Run | C2 [wt %] | Tm [deg C.] | MFR 2.16 [g/10'] | MFR 5 [g/10'] | Mw [kg/mol] | Mw/Mn |
|---|---|---|---|---|---|---|
| 9 | 6.5 | 103 | 0.4 | 1.5 | 491 | 2.8 |
| 33 | 7.2 | 102 | 0.1 | 0.3 | 662 | 2.6 |

TABLE 11

Propylene/Ethylene ratio ~0.55, No Hydrogen

| Poly. Example | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 10 | Comp 11 | — | 55 | 100 | 50 | 60 | 60 | | |
| 34 | Ex 16 | — | 55 | 100 | 50 | 60 | 60 | | |

| Poly. Example | C2 [wt %] | Tm [deg C.] | MFR 2.16 [g/10'] | MFR 5 [g/10'] | Mw [kg/mol] | Mw/Mn |
|---|---|---|---|---|---|---|
| 10 | 39.7 | amorphous | 6.9 | 21 | 280 | 2.7 |
| 34 | 41.3 | amorphous | 0.1 | 0.4 | 659 | 2.9 |

TABLE 12

Propylene/Ethylene ratio ~0.44, No Hydrogen

| Poly. Example | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 11 | Comp 11 | — | 55 | 125 | 50 | 60 | 60 | | |
| 35 | Ex 16 | — | 55 | 125 | 50 | 60 | 60 | | |

| Poly. Example | C2 [wt %] | Tm [deg C.] | MFR 2.16 [g/10'] | MFR 5 [g/10'] | Mw [kg/mol] | Mw/Mn |
|---|---|---|---|---|---|---|
| 11 | 49.1 | amorphous | 11.5 | 35 | 188 | 2.8 |
| 35 | 51.9 | amorphous | 0.2 | 0.8 | 614 | 2.5 |

TABLE 13

Propylene/Ethylene ratio ~.38, No Hydrogen

| Poly. Example | Catalyst from | H2 [mg] | C3 [g] | C2 [g] | Catalyst [mg] | Polym. Temp. [° C.] | Polym. Time [min] | Yield [g] | Productivity [g polymer/g catalyst*hour] |
|---|---|---|---|---|---|---|---|---|---|
| 12 | Comp 11 | — | 55 | 142 | 50 | 60 | 60 | | |
| 15 | Comp 12 | — | 55 | 142 | 50 | 60 | 60 | | |
| 18 | Comp 13 | — | 55 | 142 | 50 | 60 | 60 | | |
| 21 | Comp 14 | — | 55 | 142 | 50 | 60 | 60 | | |
| 24 | Comp 15 | — | 55 | 142 | 50 | 60 | 60 | | |
| 36 | Ex 16 | — | 55 | 142 | 50 | 60 | 60 | | |
| 39 | Ex 17 | — | 55 | 142 | 30 | 60 | 60 | | |
| 42 | Ex 18 | — | 55 | 142 | 30 | 60 | 60 | | |
| 45 | Ex 19 | — | 55 | 142 | 30 | 60 | 60 | 260 | 8,700 |
| 61 | Comp 20 | — | 55 | 142 | 30 | 60 | 60 | | |

| Poly. Example | C2 [wt %] | Tm [deg C.] | MFR 2.16 [g/10'] | MFR 5 [g/10'] | Mw [kg/mol] | Mw/Mn |
|---|---|---|---|---|---|---|
| 12 | 56.0 | amorphous | 16.7 | 51.5 | 166 | 2.6 |
| 15 | 57.1 | amorphous | 0.5 | 1.7 | 440 | 2.7 |
| 18 | 56.0 | amorphous | <0.1 | 0.2 | 760 | 2.7 |
| 21 | 49.5 | amorphous | 25.4 | 81.0 | 170 | 3.3 |
| 24 | 53.2 | amorphous | 0.2 | 0.7 | 632 | 2.9 |
| 36 | 56.0 | amorphous | 0.1 | 0.6 | 676 | 2.7 |
| 39 | 54.0 | amorphous | 0.2 | 0.7 | 646 | 2.9 |
| 42 | 52.1 | amorphous | 0.2 | 0.7 | 648 | 3.1 |
| 45 | 55.3 | amorphous | 0.1 | 0.4 | 682 | 2.8 |
| 61 | 56.0 | amorphous | 18 | 55 | 149 | 2.9 |

Table 1 and Table 2 represent the raw data presented by sixty-one polymerization test runs. The remaining tables 3-13 break that data out by the ratio of propylene to ethylene (or if it is a propylene homopolymer) and whether hydrogen was used in the polymerization process. Only those results can be directly compared, where essentially the same polymerisation conditions, like temperature, polymerisation time etc. were applied. Further more many of the tables contain two sets of data that are not comparable with each other. The difference between those data sets is the way the catalyst preparation was performed. As explained above, the catalysts of Comparative Examples 11-15 and Examples 16-18 were prepared by a different catalyst preparation procedure than Comparative Example 20 and Example 19 and hence different polymerisation conditions are reflected by these sets of data. These data sets can only be compared among themselves.

Propylene Homopolymers

Analysis 1: Production of Propylene Polymers without the Ethylene Comonomer and without Hydrogen.

Table 3 shows the results of four experimental Metallocene catalysts conforming to the requirements of the invention compared to six comparative examples.

The individual catalyst comparisons of the first set of comparable results between inventive samples 16, 17 and 18 and comparative examples 11 to 15 show in general a higher activity of all the inventive catalysts over the comparative catalysts. Even the inventive catalyst with the lowest productivity (Ex. 18) shows a 13% increase in activity compared to the highest activity comparative catalyst (Comp. 11). When the melting points are compared it is obvious that similar melting points are obtained, and the highest melting point of 153° C. is obtained by one inventive example (Ex. 17) as well as by one comparative example (Comp. 15). The direct comparison of these two examples shows that the activity of the inventive example 17 is almost fourfold higher than the activity of comparative example 15. Since the molecular weight of the inventive example 17 is almost twice as high as the comparative example 15, this is a dramatic improvement.

A general comparison of the molecular weight shows that the highest molecular weights of 920 kg/mol and 910 kg/mol are reached by the comparative example 13 and the inventive example 16, respectively. These molecular weights can be considered equal within the experimental error. At the same time the activity of the inventive example 16 is almost twice as high as the activity of the comparative example 13, while the melting points of these two examples both are 152° C.

It is also most important to note that the metallocenes of Comparative Examples 1 through 3, and the corresponding catalysts of Comparative Examples 11 through 13, would fall under the claims of the inventor's co-pending patent application PCT/US2007/022614 (the "genus application"), which the inventors have, inter alia, directed to the genus of β-branched hydrocarbons in the 2-position, but these Comparative Example do not fall under the claims of the instant species application. Table 3 shows that, in the case of propylene without a hydrogen moderator, the species catalysts of the current invention, on average, are an astonishing 51.2% more active than the comparative catalysts claimed under the genus application. Further, the species catalysts of the present invention also demonstrate the more desirable properties of a higher $T_m$ and MFR 2.16 and MFR 5 values over the tested catalysts that would fall under the claims of the co-pending genus application.

The superiority of the catalysts of the current species invention over the catalysts of the genus application is again demonstrated when hydrogen is introduced as a moderator. In this case, Table 4 shows that the activity of the species catalyst of the present invention increases, on average, a remarkable 34.4% over those of the catalyst of the genus application. Once again, the products of the species catalysts of the current invention show improvements in the desirable properties of a $T_m$ and MFR 2.16 and MFR 5 values over those products made from the catalyst of the genus application (see also Analysis 2).

The second set of comparable results consists of the catalyst derived from example 19 and comparative example 20. The catalyst preparation of these two catalysts differs from the one of the already discussed results and hence they need to be compared separately. Clearly it can be seen that the inventive example shows a superior performance compared to the comparative example 20. The productivity of the inventive example 19 is around 22% increased compared to the comparison example 20, while the molecular weights and the MFR values are comparable. The melting point of the inventive example of 153° C. is two degrees higher than the one of the comparative example 20.

Hence, independent of the catalyst preparation procedure it can be seen that the inventive examples show dramatic improvements over the comparative examples.

Analysis 2: Production of Propylene Polymers without the Ethylene Comonomer and with the Presence of Hydrogen.

Table 4 shows the results of four experimental Metallocene catalysts conforming to the requirements of the invention compared to six comparative examples. However, in this case, hydrogen was added during the polymerization process to enhance catalyst productivity and to regulate the Molecular Weight.

The individual catalyst comparisons of the first set of comparable results between inventive samples 16, 17 and 18 and comparative examples 11 to 15 show in general a higher activity of all the inventive catalysts over the comparative catalysts. Even the inventive catalyst with the lowest productivity (Ex. 18) shows a 6% increase in activity compared to the highest activity comparative catalyst (Comp. 11), while the inventive example 16 even exhibits a 37% increase in productivity over comparative example 11. This is a dramatic improvement. When comparing the molecular weights, the highest molecular weight of the comparative examples is given with 241 kg/mol for comparative example 13, while the highest molecular weight of the inventive examples is 232 kg/mole of example 16. These values can be considered equal within the experimental error, hence the inventive example 16 is reaching a similar molecular weight, but at a much higher productivity level (56% increase compared to Comp. 13). The melting point for this set of comparable results is ranging between 150 and 155° C. The inventive catalyst not only show a higher activity than all the comparative catalyst, they also provide with 152° C.-153° C. melting points of in the upper region of this range. The only catalyst that is able to achieve a higher melting point is comparative catalyst 15 with 155° C., but this is achieved at the lowest activity (9,520 g/g h, 36% lower than inventive example 16) and the lowest molecular weight (146 kg/g, 37% lower than inventive example 16) of all the catalyst in this set of results.

The second set of comparable results consists of the catalyst derived from example 19 and comparative example 20. The catalyst preparation of these two catalysts differs from the one of the already discussed results and hence they need to be compared separately. The inventive catalyst 19 clearly shows a dramatically improved performance over the comparative catalyst 20. The productivity of the inventive catalyst 19 is almost doubled compared to the one of the comparative catalyst 20, while obtaining almost identical molecular weights and MFR values. The melting point obtained with the inventive catalyst 19 with 153° C. by 2° C. higher than the melting point of the comparative catalyst 20.

Propylene/Ethylene Copolymers

The properties of products made from the inventive catalysts were tested at various levels of an ethylene/propylene mix to form copolymers. With the introduction of a new variable, the propylene to ethylene ration, far fewer datapoints were taken for the copolymers at each ratio because resources became limited. In each case the inventive catalyst from example 16 was tested, usually against the comparative catalyst from example 11.

Analysis 3: Production of Propylene/Ethylene Copolymers with a Propylene/Ethylene Ratio of Approximately 48 and without the Presence of Hydrogen.

In this case, only one inventive catalyst (example 16) was tested against one comparative catalyst, (comparative example 11), the results being presented in Table 5. The inventive catalyst showed significant improvements over the comparative catalyst. The inventive catalyst 16 showed a 31% increase in productivity over the comparative example 11. Comparing the MFR 2.16 values shows that the MFR of the inventive example is with 0.1 g/10' only half of the MFR of the comparative example, which is also reflected in the 17% increase in molecular weight compared to the comparative example 11. The melting points and the incorporated C2 level are identical for these two catalysts within experimental error and hence the inventive catalysts show a significant improvement in performance compared to the inventive example.

Analysis 4: Production of Propylene/Ethylene Copolymers with a Propylene/Ethylene Ratio of Approximately 31 and without the Presence of Hydrogen.

In this case, the inventive catalyst 16 and the comparative catalyst 11 were tested under two different polymerisation conditions. The first set of conditions is defined by a polymerization temperature of 60° C. and a polymerization time of 60 minutes, while the second set of conditions is determined by a polymerization temperature of 65° C. and a polymerization time of only 15 minutes. The results are summarized in table 6.

Under the first set of conditions the inventive catalyst shows a 76% increase in productivity compared to the comparative example 11. While the C2-incorporation and the melting point of the polymers are similar, the MFR 2.16 value of the inventive example 16 is only one-third of the comparative example 11. This is also reflected in a 25% increase of the molecular weight compared to the comparative example 11.

The second set of conditions again shows the superior performance of the inventive catalyst. The productivity of the inventive example 16 shows an 11% increase compared to the comparative example 11. The slightly lower melting point of 133° C. for the inventive catalyst 16 is a result of the higher C2-incorporation of the inventive catalyst under this set of conditions (2.4 compared to 2.1% for the comparative example 11). The MFR 2.16 value of the inventive example 16 is only one-fifth of the comparative example 11. This is also reflected in a 32% increase of the molecular weight compared to the comparative example 11.

Analysis 5: Production of Propylene/Ethylene Copolymers with a Propylene/Ethylene Ratio of Approximately 16 and without the Presence of Hydrogen.

In this case, one inventive catalyst (examples 16) and one comparative catalyst (comparative example 11) were tested, the results being presented in Table 7. The productivity of the inventive example 16 shows a 78% increase compared to comparative example 11. Also the molecular weight of the inventive example 16 shows an increase for the inventive catalyst, namely 59% compared to the comparative example 11. This is also reflected in the values for the MFR 2.16, which is for the inventive example only one-fourth of the comparative example 11. Since the C2-incorporation of the inventive catalyst 16 is slightly higher than for the comparative catalyst 11, it is not surprising, that the melting point for the inventive example is slightly lower. Under these conditions the superiority of the inventive catalyst is clearly visible.

Analysis 6: Production of Propylene/Ethylene Copolymers with a Propylene/Ethylene Ratio of Approximately 15 and without the Presence of Hydrogen.

In this case, the inventive catalyst 16 and the comparative catalyst 11 were tested, the results being presented in Table 8. As with all the analyses before, the inventive catalyst 16 in this example achieves better productivity (27%). This is achieved at a similar C2-incorporation and the same melting point of 118° C. as the comparative example 11.

The molecular weight of the inventive example is significantly enhanced by 54% compared to the comparative example 11. This fact can also be seen in the value of the MFR 2.16 for the inventive example 16, that is only one-fourth of the value of the comparative catalyst.

Analysis 7: Production of Propylene/Ethylene Copolymers with a Propylene/Ethylene Ratio of Approximately 10 and without the Presence of Hydrogen.

In this case, one inventive catalyst (examples 16) and one comparative catalyst (comparative example 11), were tested, the results being presented in Table 9. The inventive catalyst shows a large enhancement of the productivity and the molecular weight compared to the comparative catalyst 11, while showing a similar C2-incorporation and a similar melting point. The productivity is doubled compared to the comparative catalyst 11 and the molecular weight is increased by a factor of 1.5. This is also reflected by the MFR 2.16 value, which is for the inventive example 16 only one-sixth of the value obtained for the comparative catalyst 11.

Analysis 8: Production of Propylene/Ethylene Copolymers with a Propylene/Ethylene Ratio of Approximately 9 and without the Presence of Hydrogen.

The inventive catalyst 16 and the comparative catalyst 11 were tested, and the results are presented in Table 10. As with all the analysis before, the inventive catalyst 16 in this example achieves a better productivity by 41%. This is achieved at a similar C2-incorporation and the slightly lower melting point (1° C.) of inventive example 11 can be rationalised by the higher C2-incorporation of 7.2% compared to 6.5% of the comparative example 11. The molecular weight of the inventive catalyst 16 is increased by 35% compared to the comparative catalyst 11. The higher molecular weight is also reflected in the MFR 2.16 value, which is only one-fourth of the value of the comparative catalyst 11.

Analysis 9: Production of Propylene/Ethylene Copolymers with a Propylene/Ethylene Ratio of Approximately 0.55 and without the Presence of Hydrogen.

Table 11 shows the results of the inventive catalyst 16 and the comparative example 11 at a propylene/ethylene ratio of approximately 0.55. The productivity of these samples could not be determined because in all of these examples and comparative examples amorphous propylene/ethylene rubbers have been produced. Such polymers generally stick to the autoclace walls and to the stirrer and a quantitative discharge of the autoclave was not possible which makes the determination of the productivities unreliable. Commercially, polymers containing such rubber components are produced in a two step polymerisation where in a first step a homo polymer is produced and in a second step the rubber is produced. This measure reduces the stickiness of the material and allows the commercial production and use of such important materials for applications where low temperature toughness is required (applications like bumpers for cars, frigerator and deep freezer food packaging, crates and pails).

Under the specified conditions the C2-incorporation of the catalysts is quite similar, although the inventive catalyst 16 shows a slightly higher value of 41.3% compared to 39.7% for the comparative catalyst 11. The example of the inventive catalyst shows a dramatic improvement over the comparative examples in gains of molecular weight, and reductions in the MFR values. The molecular weight of the comparative example 11 is more than two times lower than the one obtained with the inventive catalyst 11 (280 kg/mol vs. 659 kg/mol). This result is also reflected in the MFR 2.16 values, which is 0.1 g/10' for the inventive catalyst and 6.9 g/10' for the comparative example 11. Hence the inventive catalyst shows a much superior performance under these conditions, since it delivers a polymer with a much higher molecular weight at a similar C2 incorporation.

Analysis 10: Production of Propylene/Ethylene Copolymers with a Propylene/Ethylene Ratio of Approximately 0.44 and without the Presence of Hydrogen.

In this case, one inventive catalyst (examples 16) and one comparative catalyst (comparative example 11), were tested, the results being presented in Table 12. The productivity of these samples could not be determined because in all of these examples and comparative examples amorphous propylene/ethylene rubbers have been produced. Such polymers generally stick to the autoclave walls and to the stirrer and a quantitative discharge of the autoclave was not possible which makes the determination of the productivities unreliable. Commercially, polymers containing such rubber components are produced in a two step polymerisation where in a first step a homo polymer is produced and in a second step the rubber is produced. This measure reduces the stickiness of the material and allows the commercial production and use of such important materials for applications where low temperature toughness is required (applications like bumpers for cars, frigerator and deep freezer food packaging, crates and pails).

As with Analysis 9, the inventive catalyst in this example achieves a much higher molecular weight, while still creating a product with comparable C2-incorporation. The molecular weight of the inventive catalyst 11 is by a factor 2.3 higher than the molecular weight of the comparative catalyst. This result is also reflected in the MFR 2.16 values, which is 0.2 g/10' for the inventive catalyst and 11.5 g/10' for the comparative example 11. Hence the inventive catalyst shows a much superior performance under these conditions, since it delivers a polymer with a much higher molecular weight at a similar C2 incorporation.

Analysis 11: Production of Propylene/Ethylene Copolymers with a Propylene/Ethylene Ratio of Approximately 0.38 and without the Presence of Hydrogen.

In this case, four inventive catalysts and six comparative catalysts, were tested, the results being presented in Table 13. The productivity of many of these samples could not be determined because in all of these examples and comparative examples amorphous propylene/ethylene rubbers have been produced. Such polymers generally stick to the autoclave walls and to the stirrer and a quantitative discharge of the autoclave was not possible which makes the determination of the productivities unreliable. Commercially, polymers containing such rubber components are produced in a two step polymerisation where in a first step a homo polymer is produced and in a second step the rubber is produced. This measure reduces the stickiness of the material and allows the commercial production and use of such important materials for applications where low temperature toughness is required (applications like bumpers for cars, frigerator and deep freezer food packaging, crates and pails). A generally applicable commercial catalyst has to show a high versatility, meaning a high performance under all the conditions relevant for producing commercially available materials. Under the conditions applied here this means that copolymers with very low MFR 2.16 values below 0.5 g/10' have to be obtained in order to obtain materials where toughness at very low temperatures is required. All the inventive catalysts fulfill this requirement, even more, they are able in all cases to obtain an MFR 2.16 value of 0.2 g/10' or lower (example 16, 17, 18 and also 19). The only comparative catalyst that obtains a lower MFR 2.16 (<0.1 g/10') is the one from comparative example 13. Since a MFR 2.16 value of <0.1 g/10' does not mean a commercial advantage compared to values of up to 0.5 g/10' and this catalyst has been shown to have a much lower productivity under all other conditions tested, it can be rationalized, that it has not such a high versatility as the inventive catalysts.

The molecular weights of the inventive catalysts 16, 17, 18 are all in the range of 600 and 700 kg/mol, and only the comparative examples 13 and 15 can reach such high molecular weights. But as explained before at much lower productivities for all other conditions tested.

Figure 2:
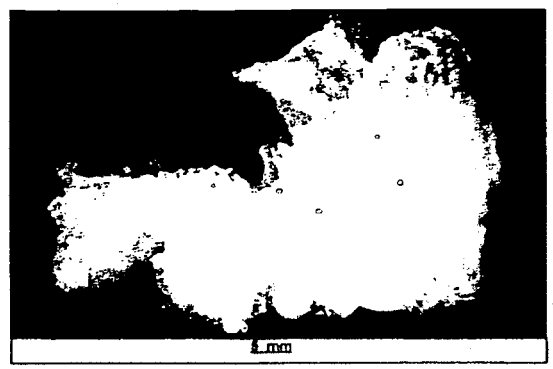
FIG. 2 is a photograph of the copolymer obtained in Comparative Example 20.
Figure 3:
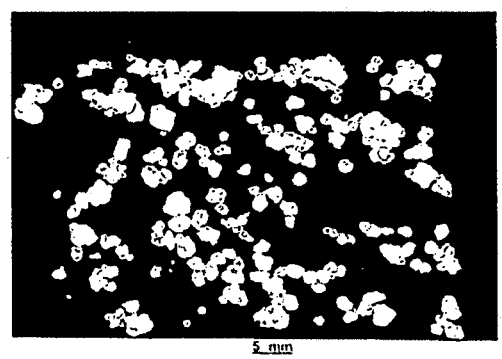
FIG. 3 is a photograph of the copolymer obtained in Example 19.

The second set of comparable results consists of the catalyst derived from example 19 and comparative example 20. The catalyst preparation of these two catalysts differs from the one of the already discussed results and hence they need to be compared separately. This second set of conditions showed an unexpected result. As explained earlier under the conditions applied here sticky materials are obtained and hence the reproducible determination of the yield is not possible. In the case of inventive example 19 the copolymer obtained was not sticky and it showed a nice morphology, as shown in the photograph of FIG. 3. This photo shows the copolymer rubber obtained in polymerisation example 45 using the catalyst from Example 19. The yield could be determined to be 8,700 g/g h. The comparative example 20 produced a sticky polymer, shown in FIG. 2. This photo shows the copolymer rubber obtained in polymerisation Example 61 using catalyst from Comparative Example 20. As with many analyses before, the inventive example 19 was producing a much higher molecular weight and a much lower MFR value than the comparative example 20 at comparable C2-introduction. The molecular weight obtained for the inventive example 19 is by a factor 4.6 higher than that of the comparative example 20. This is also reflected by a much lower MFR value of 0.1 g/10' compared to 18 g/10' for the comparative example 20.

Conclusion of the Analysis:

The different polymerization conditions tested represent the most applied conditions to obtain commercially relevant polypropylene-based materials. The inventive catalysts have shown under all conditions higher productivities than the corresponding comparative catalysts and most of the time better or at least similar properties of the resulting materials. Hence the inventive catalysts show a much higher versatility than the state-of-the-art catalysts and a better performance under all commercially relevant polymerization conditions.

While the above description contains many specifics, these specifics should not be construed as limitations of the invention, but merely as exemplifications of embodiments thereof. Those skilled in the art will envision many other embodiments within the scope and spirit of the invention as defined by the claims appended hereto.

What is claimed is:

1. A bridged metallocene having the general Formula 1 below,

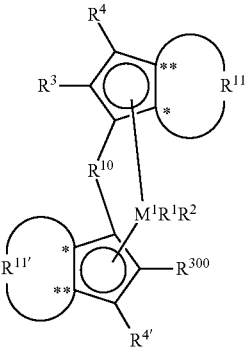

(Formula 1)

where M¹ is a metal of Group IVb of the Periodic Table of the Elements,

R¹ and R² are identical or different and are selected from the group consisting of a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms and an aryl group of from 6 to about 14 carbon atoms, and wherein R¹ and R² optionally form one or more ring system(s), R⁴ and R⁴' are identical or different and are selected from the group consisting of a hydrogen atom and a linear, cyclic or branched hydrocarbon group optionally containing one or more hetero atoms selected from the group consisting of Si, B, Al, O, S, N, P, F, Cl and Br, $R^{10}$ is a bridging group wherein $R^{10}$ is selected from:

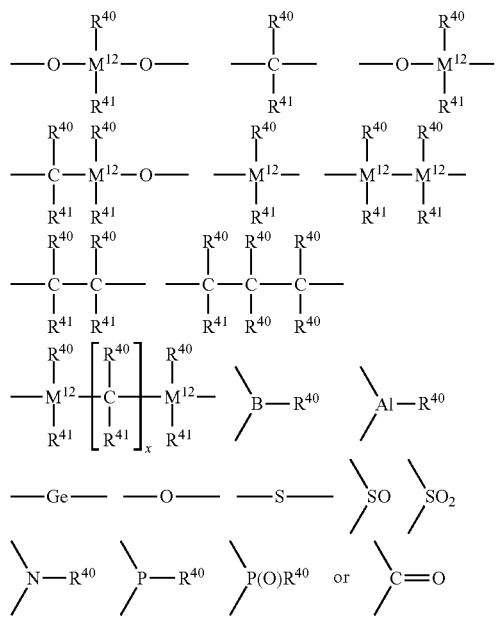

where $R^{40}$ and $R^{41}$, even when bearing the same index, are identical or different and optionally contain heteroatoms selected from the group consisting of Si, B, Al, O, S, N, P, Cl and Br, and are selected from the group consisting of a hydrogen atom, an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, an alkyl(aryl)silyl group, an arylsilyl group, and an arylalkenyl group of from 8 to about 40 carbon atoms, and wherein $R^{40}$ and $R^{41}$ together with the atoms connecting them optionally form one or more cyclic systems, x is an integer from 1 to 18, $M^{12}$ is silicon, germanium or tin, and $R^{10}$ optionally links two units of the formula 1 to one another, $R^{11}$ and $R^{11'}$ are identical or different and are each a divalent $C_2$-$C_{40}$ group which together with the cyclopentadienyl ring forms a further saturated or unsaturated ring system having a ring size of from 5 to 7 atoms, where $R^{11}$ and $R^{11'}$ optionally contain the heteroatoms Si, Ge, N, P, O or S within the ring system fused onto the cyclopentadienyl ring, and $R^{300}$ has the structure

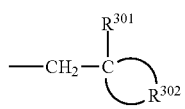

where $R^{301}$ is a linear, cyclic or branched hydrocarbon group selected from the group consisting of an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group and an arylsilyl group, wherein each of the groups optionally contains one or more hetero atoms selected from the group consisting of Si, B, Al, O, S, N and P, and optionally contain halogen atoms selected from the group consisting of F, Cl and Br, and where $R^{302}$ is a hydrocarbon group selected from the group consisting of a substituted or unsubstituted alkyl group of from 2 to about 20 carbon atoms, and an substituted or unsubstituted alkenyl group of from 3 to about 20 carbon atoms, and wherein those groups optionally contain one or more hetero atoms selected from the group consisting of Si, B, Al, O, S, N and P, and/or halogen atoms selected from the group consisting of F, Cl and Br, and further wherein $R^{302}$ forms a monocyclic ring with the β carbon atom, and $R^3$ has the meaning of $R^{300}$, but $R^3$ need not be identical to $R^{300}$, or $R^3$ is a linear, cyclic or branched hydrocarbon group which optionally contains one or more hetero atoms selected from the group consisting of Si, B, Al, O, S, N, P, F, Cl and Br, or $R^3$ is selected from the group consisting of an alkyl group of from 1 to about 20 carbon atoms, an alkylalkenyl group of from 3 to about 20 carbon atoms, an alkylaryl group of from 7 to about 40 carbon atoms, and an alkylarylalkenyl group of from 9 to about 40 carbon atoms, with the proviso that, in any case, $R^3$ is not branched in the α-position.

2. The metallocene of claim 1 wherein R¹ and R² are identical or different and are selected from the group consisting of an alkyl group of from 1 to about 10 carbon atoms, an alkoxy group of from 1 to about 10 carbon atoms, an aryloxy group of from 6 to about 10 carbon atoms, and a halogen atom, and wherein R¹ and R² together optionally form one or more ring system(s), and wherein M¹ is zirconium or hafnium.

3. The metallocene of claim 1 wherein R¹ and R² are identical or different and are methyl, chlorine or phenolate.

4. The metallocene of claim 1 wherein R⁴ and/or R⁴' are selected from the group consisting of a hydrogen atom, an alkyl group of from 1 to 20 carbon atoms, an alkenyl group of from 2 to 20 carbon atoms, an aryl group of from 6 to 20 carbon atoms, an arylalkyl group of from 7 to 40 carbon atoms, an alkylaryl group of from 8 to about 40 carbon atoms, an arylalkenyl group of from 8 to about 40 carbon atoms, a substituted or unsubstituted alkylsilyl group, an alkyl(aryl)silyl group, and an arylsilyl group.

5. The metallocene of claim 1 wherein $R^4$ and/or $R^{4'}$ are selected from the group consisting of a hydrogen atom, an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 8 to about 20 carbon atoms, an arylalkenyl group of from 8 to about 20 carbon atoms, a substituted or unsubstituted alkylsilyl group, an alkyl(aryl)silyl group, and an arylsilyl group.

6. The metallocene of claim 1 wherein $R^4$ and $R^{4'}$ are both hydrogen.

7. The metallocene of claim 1 wherein $R^{10}$ is $R^{40}R^{41}Si=$, $R^{40}R^{41}Ge=$, $R^{40}R^{41}C=$ or $-(R^{40}R^{41}C-CR^{40}R^{41})-$, where $R^{40}$ and $R^{41}$ are identical or different and each is selected from the group consisting of a hydrogen atom, an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms, a substituted or unsubstituted alkylsilyl group, an alkyl(aryl)silyl group, and an arylsilyl group.

8. The metallocene of claim 1 wherein the bridging unit $R^{10}$ is $R^{40}R^{41}Si=$ or $R^{40}R^{41}Ge=$, where $R^{40}$ and $R^{41}$ are identical or different and each is selected from the group consisting of methyl, ethyl, propyl, butyl, pentyl, hexyl, heptyl, octyl, nonyl, decyl, undecyl, dodecyl, cyclopentyl, cyclopentadienyl, cyclohexyl, phenyl, naphthyl, benzyl, trimethylsilyl and 3,3,3-trifluoropropyl.

9. The metallocene of claim 1 wherein the groups $R^{11}$ and $R^{11'}$ identical or different and each is selected from the group consisting of a divalent group selected from those given in Formulae 1 ($\alpha, \beta, \gamma, \delta, \phi$, and v and Formulae 1 $\alpha', \beta', \gamma', \delta', \phi'$, and v', respectively, wherein the asterisks "*" and "*" in Formula 1 and Formulae 1$\alpha$-v and 1$\alpha'$-v', respectively, denote the chemical bonds joining $R^{11}$ and $R^{11'}$ to the cyclopentadienyl rings

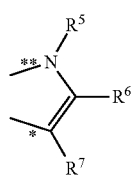

Formula 1α

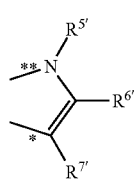

Formula 1α'

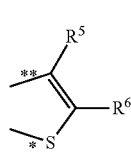

Formula 1β

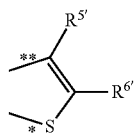

Formula 1β'

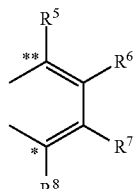

Formula 1γ

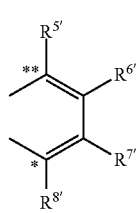

Formula 1γ'

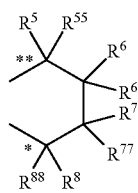

Formula 1δ

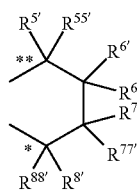

Formula 1δ'

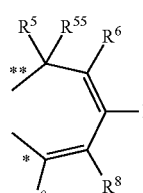

Formula 1φ

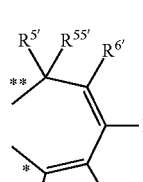

Formula 1φ'

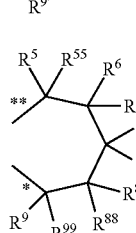

Formula 1v

-continued

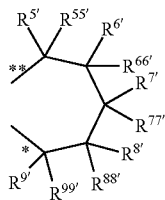

Formula 1v' wherein $R^5$, $R^6$, $R^7$, $R^8$, and $R^9$ and also $R^{5'}$, $R^{6'}$, $R^{7'}$, $R^{8'}$ and $R^{9'}$ as well as $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are identical or different and are each selected from the group consisting of a hydrogen atom, and a linear, cyclic or branched hydrocarbon group with or without heteroatoms selected from the group consisting of Si, B, Al, O, S, N, P, F, Cl and Br, and wherein said $R^5$, $R^6$, $R^7$, $R^8$, $R^9$, $R^{5'}$, $R^{6'}$, $R^{7'}$, $R^{8'}$, $R^{9'}$, $R^{55}$, $R^{66}$, $R^{77}$, $R^{88}$, $R^{99}$, $R^{55'}$, $R^{66'}$, $R^{77'}$, $R^{88'}$ and $R^{99'}$ are individually selected from the group consisting of an alkyl group of from 2 to about 20 carbon atoms, an alkenyl group of from 2 to about 20 carbon atoms, an aryl group of from 6 to about 40 carbon atoms, an aryl alkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl group, an alkyl (aryl)silyl group, and an arylsilyl group, and wherein two adjacent radicals $R^5$, $R^6$ or $R^{5'}$, $R^{6'}$ or $R^6$, $R^7$ or $R^{6'}$, $R^{7'}$ or $R^7$, $R^8$ or $R^{7'}$, $R^{8'}$ or $R^8$, $R^9$ or $R^{8'}$, $R^{9'}$ as well as $R^{55}$, $R^{66}$ or $R^{55'}$, $R^{66'}$ or $R^{66}$, $R^{77}$ or $R^{66'}$, $R^{77'}$ or $R^{77}$, $R^{88}$ or $R^{77'}$, $R^{88'}$ or $R^{88}$, $R^{99}$ or $R^{88'}$, $R^{99'}$ in each case optionally forms a saturated or unsaturated hydrocarbon ring system.

10. The metallocene of claim 9 wherein $R^{11}$ and $R^{11'}$ identical or different and $R^{11}$ is a divalent group according to Formula 1γ and $R^{11'}$ is selected from the divalent groups in Formulae 1α', β', and γ', or $R^{11}$ and $R^{11'}$ identical or different and are selected from the group consisting of divalent groups according to Formula 1α and 1α', Formula 1β and 1β' Formula 1γ and 1γ', Formula 1δ and 1δ', Formula 1φ and 1φ', and Formula 1v and 1v', respectively.

11. The metallocene of claim 9 wherein $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are each a hydrogen atom and $R^5$, $R^6$, $R^7$, $R^8$ and $R^9$ and also $R^{5'}$, $R^{6'}$, $R^{7'}$, $R^{8'}$ and $R^9$ are identical or different and each is selected from the group consisting of a hydrogen atom, a substituted or unsubstituted alkylsilyl or arylsilyl group, a linear, cyclic or branched alkyl group of from 1 to about 10 carbon atoms, and an aryl group of from 6 to about 40 carbon atoms wherein each of the groups optionally contains one or more hetero atoms selected from the group consisting of Si, B, Al, O, S, N, P, F, Cl and Br, or wherein the two adjacent radicals $R^5/R^6$ and $R^{5'}/R^{6'}$ form a hydrocarbon ring system, or $R^5$ and $R^{5'}$ are identical or different and are each a substituted or unsubstituted aryl group of from 6 to about 40 carbon atoms.

12. The metallocene of claim 9 wherein $R^{55}$, $R^{66}$, $R^{77}$, $R^{88}$ and $R^{99}$ and $R^{55'}$, $R^{66'}$, $R^{77'}$, $R^{88'}$ and $R^{99'}$ are each a hydrogen atom and $R^5$, $R^6$, $R^7$, $R^8$ and $R^9$ and $R^{5'}$, $R^{6'}$, $R^{7'}$, $R^{8'}$ and $R^{9'}$ are identical or different and each is selected from the group consisting of a hydrogen atom, a linear, cyclic or branched alkyl group of from 1 to about 10 carbon atoms, an aryl group of from 6 to about 40 carbon atoms, and wherein the two adjacent radicals $R^5$, $R^6$ and also $R^{5'}$, $R^{6'}$ together form a ring system, or $R^5$ and $R^{5'}$ are identical or different and are each a substituted or unsubstituted aryl group of from 6 to about 40 carbon atoms.

13. The metallocene of claim 1 wherein $R^{301}$ is a linear, cyclic or branched hydrocarbon group which is optionally halogenated and wherein $R^{302}$ is selected from the group consisting of a substituted or unsubstituted alkyl group of from 2 to about 20 carbon atoms, and a substituted or unsubstituted alkenyl group of from 3 to about 20 carbon atoms, wherein any of those groups optionally contains one or more hetero atoms selected from the group consisting of Si, B, Al, O, S, N and P, and optionally contains halogen atoms selected from the group consisting of F, Cl and Br, with the proviso that $R^{302}$ is a mono-cyclic ring which includes the β-carbon atom.

14. The metallocene of claim 13 wherein $R^{301}$ is selected from the group consisting of an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, an alkoxy group of from 1 to about 20 carbon atoms, an aryloxy group of from 6 to about 20 carbon atoms, and an arylalkenyl group of from 8 to about 40 carbon atoms and wherein $R^{302}$ is a substituted or unsubstituted alkyl group of from 3 to about 7 carbon atoms, and that group optionally contains one or more hetero atoms selected from the group consisting of Si, B, Al, O, S, N and P, and optionally contains halogen atoms selected from the group consisting of F, Cl and Br, with the proviso that $R^{302}$ is a mono-cyclic ring which includes the β-carbon atom.

15. The metallocene of claim 1 wherein $R^{300}$ contains more than 6 carbon atoms.

16. The metallocene of claim 1 wherein $R^3$ is chosen from the same set that described $R^{300}$, but $R^3$ need not be identical to $R^{300}$, or $R^3$ is a linear, cyclic or branched hydrocarbon group of from 1 to about 20 carbon atoms, with the proviso that $R^3$ is not branched in the α-position.

17. The metallocene of claim 16 wherein $R^3$ is selected from the group consisting of an alkyl group of from 1 to 20 carbon atoms, an alkylaryl group of from 7 to about 20 carbon atoms, an alkylalkenyl group of from 3 to about 20 carbon atoms and an alkylarylalkenyl group of from 9 to about 20 carbon atoms.

18. The metallocene of claim 1 wherein $R^3$ and $R^{300}$ are identical or $R^3$ is selected from the group consisting of a methyl group, a linear, cyclic or branched hydrocarbon group of from 7 to about 10 carbon atoms which is optionally halogenated, an alkylaryl group of from 7 to about 10 carbon atoms and an alkylalkenyl group of from 3 to about 10 carbon atoms, with the proviso that $R^3$ is not cyclic or branched in α-position.

19. The metallocene of claim 1 wherein $R^3$ is chosen from the same set that described $R^{300}$, but need not be identical to $R^{300}$.

20. The metallocene of claim 19 wherein $R^3$ and $R^{300}$ each contain more than 6 carbon atoms.

21. A process for olefin polymerisation comprising contacting one or more olefins each having from 2 to about 20 carbon atoms under olefin polymerisation reaction conditions with a catalyst system including a bridged metallocene component having formula 1

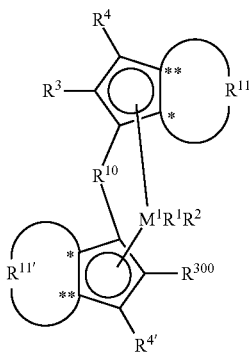

(Formula 1)

where $M^1$ is a metal of Group IVb of the Periodic Table of the Elements, $R^1$ and $R^2$ are identical or different and are selected from the group consisting of a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms and an aryl group of from 6 to about 14 carbon atoms and $R^1$ and $R^2$ optionally form one or more ring system(s), $R^4$ and $R^{4'}$ are identical or different and are selected from the group consisting of a hydrogen atom and a linear, cyclic or branched hydrocarbon group optionally containing one or more hetero atoms selected from the group consisting of Si, B, Al, O, S, N, P, F, Cl and Br, $R^{10}$ is a bridging group wherein $R^{10}$ is selected from

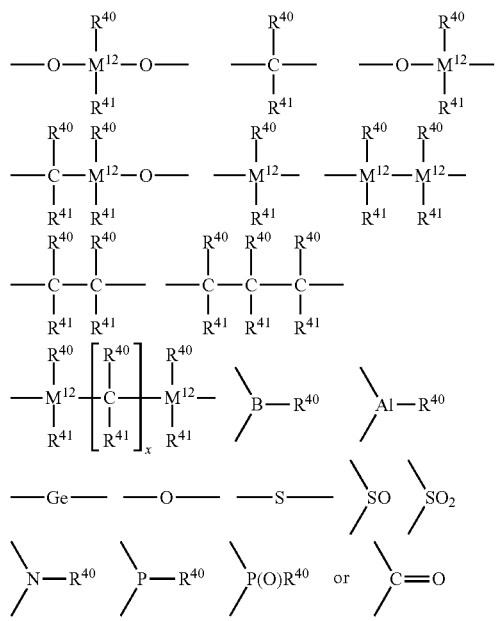

where $R^{40}$ and $R^{41}$, even when bearing the same index, are identical or different and optionally contain heteroatoms selected from the group consisting of Si, B, Al, O, S, N, P, Cl and Br, and are selected from the group consisting of a hydrogen atom, an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, an alkyl(aryl)silyl group, an arylsilyl group, and an arylalkenyl group of from 8 to about 40 carbon atoms and wherein $R^{40}$ and $R^{41}$ together with the atoms connecting them optionally form one or more cyclic systems, x is an integer from 1 to 18, $M^{12}$ is silicon, germanium or tin, and $R^{10}$ optionally links two units of the formula 1 to one another, $R^{11}$ and $R^{11'}$ are identical or different and are each a divalent $C_2$-$C_{40}$ group which together with the cyclopentadienyl ring forms a further saturated or unsaturated ring system having a ring size of from 5 to 7 atoms, where $R^{11}$ and $R^{11'}$ optionally contain the heteroatoms Si, Ge, N, P, O or S within the ring system fused onto the cyclopentadienyl ring, and $R^{300}$ has the structure:

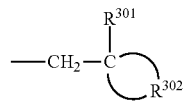

where $R^{301}$ is a linear, cyclic or branched hydrocarbon group selected from the group consisting of an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group and an arylsilyl group, wherein each of the groups optionally contain one or more hetero atoms Si, B, Al, O, S, N or P, and optionally contain halogen atoms selected from the group consisting of F, Cl and Br, and where $R^{302}$ is a hydrocarbon group which is selected from the group consisting of a substituted or unsubstituted alkyl group of from 2 to about 20 carbon atoms, and an substituted or unsubstituted alkenyl group of from 3 to about 20 carbon atoms, wherein those groups optionally contain one or more hetero atoms selected from the group consisting of Si, B, Al, O, S, N and P, and optionally contain halogen atoms selected from the group consisting of F, Cl and Br, and further wherein $R^{302}$ forms a monocyclic ring with the β carbon atom, and $R^3$ has the meaning of $R^{300}$, but $R^3$ need not be identical to $R^{300}$, or $R^3$ is a linear, cyclic or branched hydrocarbon group which optionally contains one or more hetero atoms selected from the group consisting of Si, B, Al, O, S, N, P, F, Cl and Br, or $R^3$ is selected from the group consisting of an alkyl group of from 1 to about 20 carbon atoms, an alkylalkenyl group of from 3 to about 20 carbon atoms, an alkylaryl group of from 7 to about 40 carbon atoms, and an alkylarylalkenyl group of from 9 to about 40 carbon atoms, with the proviso that $R^3$, in any case, is not branched in the α-position.

22. The process of claim 21 wherein $R^1$ and $R^2$ are identical or different and are selected from the group consisting of an alkyl group of from 1 to about 10 carbon atoms, an alkoxy group of from 1 to about 10 carbon atoms, an aryloxy group of from 6 to about 10 carbon atoms, and a halogen atom, and wherein $R^1$ and $R^2$ together optionally form one or more ring system(s), and wherein $M^1$ is zirconium or hafnium.

23. The process of claim 21 wherein $R^1$ and $R^2$ are identical or different and are methyl, chlorine or phenolate.

24. The process of claim 21 wherein $R^4$ and/or $R^{4'}$ are selected from the group consisting of a hydrogen atom, an alkyl group of from 1 to 20 carbon atoms, an alkenyl group of from 2 to 20 carbon atoms, an aryl group of from 6 to 20 carbon atoms, an arylalkyl group of from 7 to 40 carbon atoms, an alkylaryl group of from 8 to about 40 carbon atoms, an arylalkenyl group of from 8 to about 40 carbon atoms, a substituted or unsubstituted alkylsilyl group, an alkyl(aryl)silyl group, and an arylsilyl group.

25. The process of claim 21 wherein $R^4$ and/or $R^{4'}$ are selected from the group consisting of a hydrogen atom, an alkyl group of from 1 to about 10 carbon atoms, an alkenyl group of from 2 to about 10 carbon atoms, an aryl group of from 6 to about 10 carbon atoms, an arylalkyl group of from 7 to about 20 carbon atoms, an alkylaryl group of from 8 to about 20 carbon atoms, an arylalkenyl group of from 8 to about 20 carbon atoms, a substituted or unsubstituted alkylsilyl group, an alkyl(aryl)silyl group, and an arylsilyl group.

26. The process of claim 21 wherein $R^4$ and $R^{4'}$ are both hydrogen.

27. The process of claim 21 wherein $R^{10}$ is $R^{40}R^{41}Si=$, $R^{40}R^{41}Ge=$, $R^{40}R^{41}C=$, or $-(R^{40}R^{41}C-CR^{40}R^{41})-$, where $R^{40}$ and $R^{41}$ are identical or different and each is selected from the group consisting of a hydrogen atom, an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms, a substituted or unsubstituted alkylsilyl group, an alkyl(aryl)silyl group, and an arylsilyl group.

28. The process of claim 21 wherein the bridging unit $R^{10}$ is $R^{40}R^{41}Si=$ or $R^{40}R^{41}Ge=$, where $R^{40}$ and $R^{41}$ are identical or different and each is selected from the group consisting of methyl, ethyl, propyl, butyl, pentyl, hexyl, heptyl, octyl, nonyl, decyl, undecyl, dodecyl, cyclopentyl, cyclopentadienyl, cyclohexyl, phenyl, naphthyl, benzyl, trimethylsilyland 3,3,3-trifluoropropyl.

29. The process of claim 21 wherein the groups $R^{11}$ and $R^{11'}$ are identical or different and each is selected from the group consisting of a divalent group selected from those given in Formulae 1 ($\alpha$, $\beta$, $\gamma$, $\delta$, $\phi$, and $v$ and Formulae 1$\alpha'$, $\beta'$, $\gamma'$, $\delta'$, $\phi'$, and $v'$, respectively, wherein the asterisks "*" and "**" in Formula 1 and Formulae 1$\alpha$-v and 1$\alpha'$-v', respectively, denote the chemical bonds joining $R^{11}$ and $R^{11'}$ to the cyclopentadienyl rings

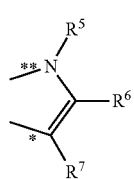

Formula 1α

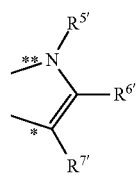

Formula 1α'

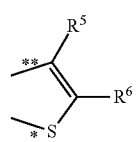

Formula 1β

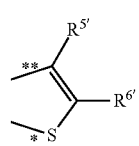

Formula 1β'

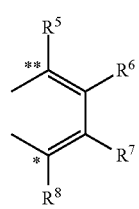

Formula 1γ

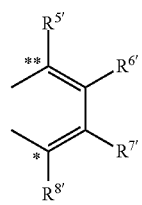

Formula 1γ'

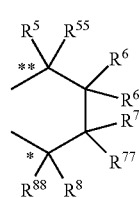

Formula 1δ

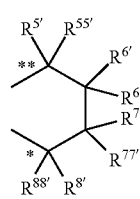

Formula 1δ'

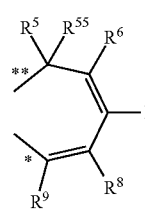

Formula 1φ

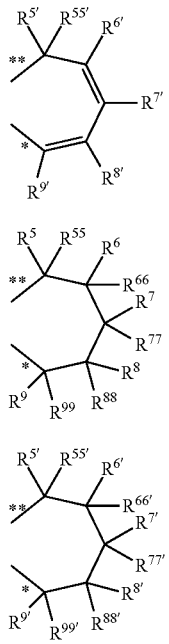

Formula 1φ'

Formula 1v

Formula 1v' wherein $R^5$, $R^6$, $R^7$, $R^8$, and $R^9$ and also $R^{5'}$, $R^{6'}$, $R^{7'}$, $R^{8'}$ and $R^{9'}$ as well as $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are identical or different and each is selected from the group consisting of a hydrogen atom, and a linear, cyclic or branched hydrocarbon group with or without heteroatoms selected from the group consisting of Si, B, Al, O, S, N, P, F, Cl and Br, and wherein said $R^5$, $R^6$, $R^7$, $R^8$, $R^9$, $R^{5'}$, $R^{6'}$, $R^{7'}$, $R^{8'}$, $R^{9'}$, $R^{55}$, $R^{66}$, $R^{77}$, $R^{88}$, $R^{99}$, $R^{55'}$, $R^{66'}$, $R^{77'}$, $R^{88'}$ and $R^{99'}$ are individually selected from the group consisting of an alkyl group of from 2 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl group, an alkyl(aryl)silyl group and an arylsilyl group, and wherein two adjacent radicals $R^5$, $R^6$ or $R^{5'}$, $R^{6'}$ or $R^6$, $R^7$ or $R^{6'}$, $R^{7'}$ or $R^7$, $R^8$ or $R^{7'}$, $R^{8'}$ or $R^8$, $R^9$ or $R^{8'}$, $R^{9'}$ as well as $R^{55}$, $R^{66}$ or $R^{55'}$, $R^{66'}$ or $R^{66}$, $R^{77}$ or $R^{66'}$, $R^{77'}$ or $R^{77}$, $R^{88}$ or $R^{77'}$, $R^{88'}$ or $R^{88}$, $R^{99}$ or $R^{88'}$, $R^{99'}$ in each case optionally forms a saturated or unsaturated hydrocarbon ring system.

30. The process of claim 29 wherein $R^{11}$ and $R^{11'}$ are identical or different and $R^{11}$ is a divalent group according to Formula 1γ and $R^{11'}$ is selected from the divalent groups in Formulae 1α', β', and γ', or $R^{11}$ and $R^{11'}$ are identical or different and are selected from the group consisting of divalent groups according to Formula 1α, and 1α', Formula 1β and 1β', Formula 1γ and 1γ', Formula 1δ and 1δ', Formula 1φ and 1φ', and Formula 1v and 1v', respectively.

31. The process of claim 29 wherein $R^{55}$, $R^{66}$, $R^{77}$, $R^{88}$ and $R^{99}$ and also $R^{55'}$, $R^{66'}$, $R^{77'}$, $R^{88'}$ and $R^{99'}$ are each a hydrogen atom and $R^5$, $R^6$, $R^7$, $R^8$ and $R^9$ and also $R^{5'}$, $R^{6'}$, $R^{7'}$, $R^{8'}$ and $R^{9'}$ are identical or different and each is selected from the group consisting of a hydrogen atom, a substituted or unsubstituted alkylsilyl or arylsilyl group, a linear, cyclic or branched alkyl group of from 1 to about 10 carbon atoms, and an aryl group of from 6 to about 40 carbon atoms wherein any of the groups optionally contain one or more hetero atoms selected from the group consisting of Si, B, Al, O, S, N, P, F, Cl and Br, and further wherein the two adjacent radicals $R^5/R^6$ and $R^{5'}/R^{6'}$ form a hydrocarbon ring system, or $R^5$ and $R^{5'}$ are identical or different and are each a substituted or unsubstituted aryl group of from 6 to about 40 carbon atoms.

32. The process of claim 29 wherein $R^{55}$, $R^{66}$, $R^{77}$, $R^{88}$ and $R^{99}$ and $R^{55'}$, $R^{66'}$, $R^{77'}$, $R^{88'}$ and $R^{99'}$ are each a hydrogen atom and $R^5$, $R^6$, $R^7$, $R^8$ and $R^9$ and $R^{5'}$, $R^{6'}$, $R^{7'}$, $R^{8'}$ and $R^{9'}$ are identical or different and are each selected from the group consisting of a hydrogen atom, a linear, cyclic or branched alkyl group of from 1 to about 10 carbon atoms, and an aryl group of from 6 to about 40 carbon atoms, and wherein the two adjacent radicals $R^5$, $R^6$ and also $R^{5'}$, $R^{6'}$ together form a ring system, or $R^5$ and $R^{5'}$ are identical or different and are each a substituted or unsubstituted aryl group of from 6 to about 40 carbon atoms.

33. The process of claim 21 wherein $R^{301}$ is a linear, cyclic or branched hydrocarbon group which is optionally halogenated and wherein $R^{302}$ is selected from the group consisting of a substituted or unsubstituted alkyl group of from 2 to about 20 carbon atoms and a substituted or unsubstituted alkenyl group of from 3 to about 20 carbon atoms, wherein any of those groups optionally contains one or more hetero atoms selected from the group consisting of Si, B, Al, O, S, N and P, and optionally contains halogen atoms selected from the group consisting of F, Cl and Br, with the proviso that $R^{302}$ is a mono-cyclic ring which includes the β-carbon atom.

34. The process of claim 33 wherein $R^{301}$ is selected from the group consisting of an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, an alkoxy group of from 1 to about 20 carbon atoms, an aryloxy group of from 6 to about 20 carbon atoms, and an arylalkenyl group of from 8 to about 40 carbon atoms and wherein $R^{302}$ is a substituted or unsubstituted alkyl group of from 3 to about 7 carbon atoms, and that group optionally contains one or more hetero atoms selected from the group consisting of Si, B, Al, O, S, N and P, and optionally contains halogen atoms selected from the group consisting of F, Cl and Br, with the proviso that $R^{302}$ is a mono-cyclic ring which includes the β-carbon atom.

35. The process of claim 21 wherein $R^{300}$ contains more than 6 carbon atoms.

36. The process of claim 21 wherein $R^3$ is chosen from the same set that described $R^{300}$, but $R^3$ need not be identical to $R^{300}$, or $R^3$ is a linear, cyclic or branched hydrocarbon group of from 1 to about 20 carbon atoms, with the proviso that $R^3$ is not branched in the α-position.

37. The process of claim 36 wherein $R^3$ is selected from the group consisting of an alkyl group of from 1 to 20 carbon atoms, an alkylaryl group of from 7 to about 20 carbon atoms, an alkylalkenyl group of from 3 to about 20 carbon atoms and an alkylarylalkenyl group of from 9 to about 20 carbon atoms.

38. The process of claim 21 wherein $R^3$ and $R^{300}$ are identical or $R^3$ is selected from the group consisting of a methyl group or a linear, cyclic or branched hydrocarbon group of from 7 to about 10 carbon atoms which is optionally halogenated, an alkylaryl group of from 7 to about 10 carbon atoms and an alkylalkenyl group of from 3 to about 10 carbon atoms, with the proviso that $R^3$ is not branched in α-position.

39. The process of claim 21 wherein $R^3$ is chosen from the same set that described $R^{300}$, but need not be identical to $R^{300}$.

40. The process of claim 39 wherein $R^3$ and $R^{300}$ each contain more than 6 carbon atoms.

41. The process of claim 21 wherein the olefins include propylene and/or ethylene.

42. The process of claim 21 wherein the olefins include at least one olefin having the formula $R'''—CH=CH—R''$ wherein $R'''$ and $R''$ are identical or different and are each individually a hydrogen atom or a radical having from 1 to about 20 carbon atoms, and $R'''$ and $R''$ together optionally form one or more rings.

43. The process of claim 21 wherein the olefins include one or more compounds selected from the group consisting of ethylene, propylene, 1-butene, 1-pentene, 1-hexene, 4-methyl-1-pentene or 1-octene, styrene, 1,3-butadiene, 1,4-hexadiene, vinylnorbornene, norbornadiene, ethylnorbornadiene, norbornene, tetracyclododecene and methylnorbornene.

44. A bridged metallocene having the general Formula 1a below,

Formula 1a

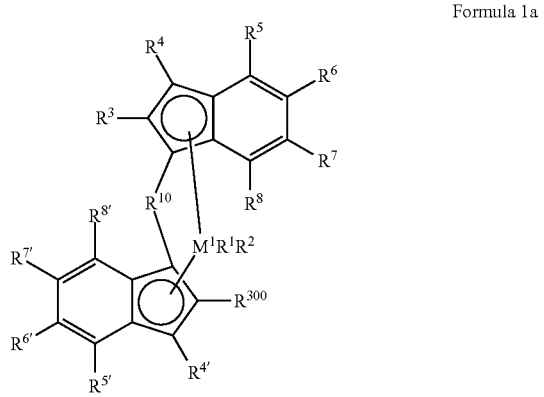

where $M^1$ is a metal of Group IVb of the Periodic Table of the Elements,
$R^1$ and $R^2$ identical or different and are selected from the group consisting of a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms and an aryl group of from 6 to about 14 carbon atoms and $R^1$ and $R^2$ optionally form one or more ring system(s),
$R^4$ and $R^{4'}$ are identical or different and are selected from the group consisting of a hydrogen atom and a linear, cyclic or branched hydrocarbon group optionally containing one or more hetero atoms selected from the group consisting of Si, B, Al, O, S, N, P, F, Cl and Br,
$R^{10}$ is a bridging group wherein $R^{10}$ is selected from:

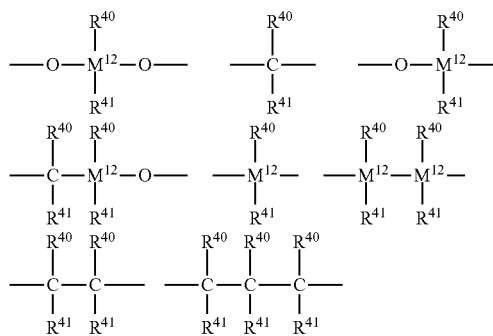

-continued

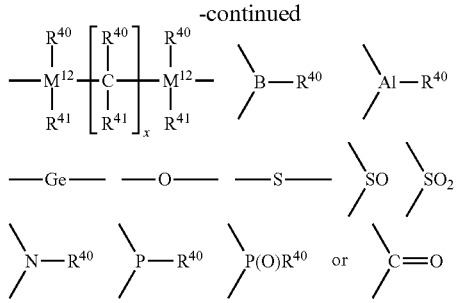

where
$R^{40}$ and $R^{41}$, even when bearing the same index, are identical or different and optionally contain heteroatoms selected from the group consisting of Si, B, Al, O, S, N, P, Cl and Br, and are each selected from the group consisting of a hydrogen atom, an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, an alkyl(aryl)silyl group, an arylsilyl group, or an arylalkenyl group of from 8 to about 40 carbon atoms and wherein $R^{40}$ and $R^{41}$ together with the atoms connecting them optionally form one or more cyclic systems,
x is an integer from 1 to 18,
$M^{12}$ is silicon, germanium or tin, and
$R^{10}$ optionally links two units of the formula 1 to one another, and
$R^{300}$ has the structure:

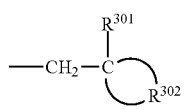

where $R^{301}$ is a linear, cyclic or branched hydrocarbon group selected from the group consisting of an alkyl group of from 1 to about 20 carbon atoms, an alkenyl group of from 2 to about 20 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, an alkoxy group of from 1 to about 20 carbon atoms, an aryloxy group of from 6 to about 20 carbon atoms, or a substituted or unsubstituted alkylsilyl group, an alkyl(aryl)silyl group and an arylsilyl group, wherein the groups optionally contain one or more hetero atoms selected from the group consisting of Si, B, Al, O, S, N and P, and optionally contain halogen atoms selected from the group consisting of F, Cl and Br,
and where $R^{302}$ is a hydrocarbon group selected from the group consisting of a substituted or unsubstituted alkyl group of from 2 to about 20 carbon atoms, and an substituted or unsubstituted alkenyl group of from 3 to about 20 carbon atoms, and the groups optionally contain one or more hetero atoms selected from the group consisting of Si, B, Al, O, S, N and P, and optionally contain halogen atoms selected from the group consisting of F, Cl and Br, wherein $R^{302}$ forms a monocyclic ring with the β carbon atom, $R^3$ has the meaning of $R^{300}$, but $R^3$ need not be identical to $R^{300}$, or $R^3$ is a linear, cyclic or branched hydrocarbon group which optionally contains one or more hetero atoms selected from the group consisting of Si, B, Al, O, S, N, P, F, Cl and Br or $R^3$ is selected from the group consisting of an alkyl group of from 1 to about 20 carbon atoms, an alkylalkenyl group of from 3 to about 20 carbon atoms, an alkylaryl group of from 7 to about 40 carbon atoms, and an alkylarylalkenyl group of from 9 to about 40 carbon atoms, with the proviso that $R^3$, in any case, is not branched in the α-position, and where $R^5$, $R^6$, $R^7$ and $R^8$ and also $R^{5'}$, $R^{6'}$, $R^{7'}$ and $R^{8'}$ are identical or different and are each selected from the group consisting of a hydrogen atom, a linear, cyclic or branched hydrocarbon group or a substituted or unsubstituted alkylsilyl group, an alkyl(aryl)silyl group and an arylsilyl group and wherein each of the groups optionally contains one or more hetero atoms selected from the group consisting of Si, B, Al, O, S, N and P, and optionally contains halogen atoms selected from the group consisting of F, Cl and Br, and further wherein adjacent radicals $R^5$, $R^6$ or $R^6$, $R^7$ or $R^7$, $R^8$ and also $R^{5'}$, $R^{6'}$ or $R^{6'}$, $R^{7'}$ or $R^{7'}$, $R^{8'}$ in each case optionally forms a hydrocarbon ring system.

45. The metallocene of claim 44, wherein $R^5$, $R^6$, $R^7$ and $R^8$ and also $R^{5'}$, $R^{6'}$, $R^{7'}$ and $R^{8'}$ are identical or different and are each selected from the group consisting of a hydrogen atom, a linear, cyclic or branched hydrocarbon group selected from an alkyl group of from 1 to about 20 carbon atoms, an alkenyl group of from 2 to about 20 carbon atoms, an aryl group of from 6 to about 40 carbon atoms, an arylalkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl group, an alkyl(aryl)silyl group and an arylsilyl group, and wherein those groups optionally contain one or more hetero atoms selected from the group consisting of Si, B, Al, O, S, N and P, and optionally contain halogen atoms selected from the group consisting of F, Cl and Br, and further wherein adjacent radicals $R^5$, $R^6$ or $R^6$, $R^7$ or $R^7$, $R^8$ and also $R^{5'}$, $R^{6'}$ or $R^{6'}$, $R^{7'}$ or $R^{7'}$, $R^{8'}$ in each case optionally forms a hydrocarbon ring system.

46. The metallocene of claim 45, wherein the linear, cyclic or branched hydrocarbon groups contain one or more hetero atoms selected from the group consisting of Si, B, Al, O, S, N, P, F, Cl and Br, and/or adjacent radicals $R^5$, $R^6$ or $R^6$, $R^7$ or $R^7$, $R^8$ and also $R^{5'}$, $R^{6'}$ or $R^{6'}$, $R^{7'}$ or $R^{7'}$, $R^{8'}$ in each case optionally forms a hydrocarbon ring system.

47. The metallocene of claim 44, wherein $R^5$, $R^6$, $R^7$ and $R^8$ and also $R^{5'}$, $R^{6'}$, $R^{7'}$ and $R^{8'}$ are identical or different and are each selected from the group consisting of a hydrogen atom, a substituted or unsubstituted alkylsilyl or arylsilyl group, a linear, cyclic or branched alkyl group of from 1 to about 10 carbon atoms, and an aryl group of from 6 to about 40 carbon atoms and wherein the adjacent radicals $R^5$, $R^6$ and also $R^{5'}$, $R^{6'}$ optionally form a saturated or unsaturated hydrocarbon ring system.

48. The metallocene of claim 44, wherein $R^6$, $R^7$, $R^8$ and also $R^{6'}$, $R^{7'}$ and $R^{8'}$ are identical or different and are each selected from the group consisting of a hydrogen atom, a linear, cyclic or branched hydrocarbon group selected from an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl group, an alkyl(aryl)silyl group and an arylsilyl group, and wherein adjacent radicals $R^6$, $R^7$ or $R^7$, $R^8$ as well as $R^{6'}$, $R^{7'}$ or $R^{7'}$, $R^{8'}$ in each case optionally forms a hydrocarbon ring system and further wherein the groups optionally contain one or more hetero atoms selected from the group consisting of Si, B, Al, O, S, N, P, F, Cl and Br, and where $R^5$ and $R^{5'}$ are identical or different and are each a substituted or unsubstituted aryl group of from 6 to about 40 carbon atoms which optionally contains one or more hetero atoms selected from the group consisting of Si, B, Al, O, S, N, P, F, Cl and Br.

49. The metallocene of claim 48, wherein the linear, cyclic or branched hydrocarbon groups contain one or more hetero atoms selected from the group consisting of Si, B, Al, O, S, N, P, F, Cl and Br.

50. The metallocene of claim 44, wherein $R^6$, $R^7$ and $R^8$ and also $R^{6'}$, $R^{7'}$ and $R^{8'}$ are identical or different and are each are selected from the group consisting of a hydrogen atom, a substituted or unsubstituted alkylsilyl, an arylsilyl group, a linear, cyclic or branched alkyl group of from 1 to about 10 carbon atoms, an aryl group of from 6 to about 10 carbon atoms, wherein any of these groups optionally contain one or more hetero atoms selected from the group consisting of Si, B, Al, O, S, N, P, F, Cl and Br, and further wherein $R^5$ and $R^{5'}$ are identical or different and are each a substituted or unsubstituted aryl group of from 6 to about 40 carbon atoms.

51. The metallocene of claim 44, wherein $R^6$, $R^7$ and $R^8$ and also $R^{6'}$, $R^{7'}$ and $R^{8'}$ are identical or different and are each selected from the group consisting of a hydrogen atom, a linear, cyclic or branched alkyl group of from 1 to about 10 carbon atoms, and an aryl group of from 6 to about 10 carbon atoms, and where $R^5$ and $R^{5'}$ are identical or different and are each selected from the group consisting of naphthyl, 4-($C_1$-$C_{10}$-alkyl)phenyl or 4-($C_6$-$C_{20}$-aryl)phenyl, 4-methyl-phenyl, 4-biphenyl, 4-ethyl-phenyl, 4-n-propyl-phenyl, 4-isopropyl-phenyl, 4-tert-butyl-phenyl, 4-sec-butyl-phenyl, 4-cyclohexyl-phenyl, 4-trimethylsilyl-phenyl, 4-adamantyl-phenyl, 4-($C_1$-$C_{10}$-fluoroalkyl)-phenyl, 3-($C_1$-$C_{10}$-alkyl)-phenyl, 3-($C_1$-$C_{10}$-fluoroalkyl)-phenyl, 3-($C_6$-$C_{20}$-aryl)phenyl, 3-biphenyl, 3,5-di-($C_1$-$C_{10}$-alkyl)-phenyl, 3,5-dimethyl-phenyl, 3,5-di-($C_1$-$C_{10}$-fluoroalkyl)-phenyl, 3,5-di (trifluoromethyl)-phenyl, 3,5-($C_6$-$C_{20}$-aryl)phenyl and 3,5-terphenyl.

52. The metallocene of claim 44 wherein the metallocene is a compound selected from the group consisting of:

Dimethylsilandiylbis[2-[(1-methylcyclohexy)methyl]-4-[tert-butylphenyl)-1-indeny]-zirconium dichloride Dimethylsilandiylbis[2-[(1-methylcyclopentyl)methyl]-4-(tert-butylphenyl)-1-indenyl]-zirconium dichloride Dimethylsilandiylbis[2-[(1-methylcyclohepty)methyl]-4-(tert-butylphenyl)-1-indenyl]-zirconium dichloride Dimethylsilandiylbis[2-[(1-methylcyclononyl)methyl]-4-(tert-butylphenyl)-1-indenyl]-zirconium dichloride Dimethylsilandiylbis[2-[(1-methylcyclooctyl)methyl]-4-(tert-butylphenyl)-1-indenyl]-zirconium dichloride Dimethylsilandiylbis[2-[(1-ethylcyclohexyl)methyl]-4-(tert-butylphenyl)-1-indenyl]-zirconium dichloride Dimethylsilandiylbis[2-[(1-ethylcyclopentyl)methyl]-4-(tert-butylphenyl)-1-indenyl]-zirconium dichloride Dimethylsilandiylbis[2-[(1-ethylcycloheptyl)methyl]-4-(tert-butylphenyl)-1-indenyl]-zirconium dichloride Dimethylsilandiylbis[2-[(1-ethylcyclononyl)methyl]-4-(tert-butylphenyl)-1-indenyl]-zirconium dichloride Dimethylsilandiylbis[2-[(1-ethylcyclooctyl)methyl]-4-(tert-butylphenyl)-1-indenyl]-zirconium dichloride Dimethylsilandiylbis[2-[(1-ethylcyclobutyl)methyl]-4-(tert-butylphenyl)-1-indenyl]-zirconium dichloride
Dimethylsilandiylbis[2-[(1-propylcyclohexy)methyl]-4-(tert-butylphenyl)-1-indenyl]-zirconium dichloride
Dimethylsilandiylbis[2-[(1-propylcyclopentyl)methyl]-4-(tert-butylphenyl)-1-indenyl]-zirconium dichloride
Dimethylsilandiylbis[2-[(1-propylcycloheptyl)methyl]-4-(tert-butylphenyl)-1-indenyl]-zirconium dichloride
Dimethylsilandiylbis[2-[(1-propylcyclononyl)methyl]-4-(tert-butylphenyl)-1-indenyl]-zirconium dichloride
Dimethylsilandiylbis[2-[(1-propylcyclooctyl)methyl]-4-(tert-butylphenyl)-1-indenyl]-zirconium dichloride
Dimethylsilandiylbis[2-[(1-propylcyclobutyl)methyl]-4-(tert-butylphenyl)-1-indenyl]-zirconium dichloride
Dimethylsilandiylbis[2-[(1-propylcyclopropyl)methyl]-4-[tert-butylphenyl)-1-indenyl]-zirconium dichloride
Dimethylsilandiylbis[2-[(1-methylcyclohexyl)methyl]-4-(1-naphthyl)-1-indenyl]-zirconium dichloride
Dimethylsilandiylbis[2-[(1-methylcyclopentyl)methyl]-4-(1-naphthyl)-1-indenyl]-zirconium dichloride
Dimethylsilandiylbis[2-[(1-methylcycloheptyl)methyl]-4-(1-naphthyl)-1-indenyl]-zirconium dichloride
Dimethylsilandiylbis[2-[(1-methylcyclononyl)methyl]-4-(1-naphthyl)-1-indenyl]-zirconium dichloride
Dimethylsilandiylbis[2-[(1-methylcyclooctyl)methyl]-4-(1-naphthyl)-1-indenyl]-zirconium dichloride
Dimethylsilandiylbis[2-[(1-ethylcyclohexyl)methyl]-4-(1-naphthyl)-1-indenyl]-zirconium dichloride
Dimethylsilandiylbis[2-[(1-ethylcyclopentyl)methyl]-4-(1-naphthyl)-1-indenyl]-zirconium dichloride
Dimethylsilandiylbis[2-[(1-ethylcycloheptyl)methyl]-4-(1-naphthyl)-1-indenyl]-zirconium dichloride
Dimethylsilaηdiylbis[2-[1-ethylcyclononyl)methyl]-4-(1-naphthyl)-1-indenyl]-zirconium dichloride
Dimethylsilandiylbis[2-[(1-ethylcyclooctyl)methyl]-4-(1-naphthyl)-1-indenyl]-zirconium dichloride
Dimethylsilandiylbis[2-[(1-ethylcyclobutyl)methyl]-4-(1-naphthyl)-1-indenyl]-zirconium dichloride
Dimethylsilandiylbis[2-[(1-propylcyclohexyl)methyl]-4-(1-naphthyl)-1-indenyl]-zirconium dichloride
Dimethylsilandiylbis[2-[(1-propylcyclopentyl)methyl]-4-(1-naphthyl)-1-indenyl]-zirconium dichloride
Dimethylsilandiylbis[2-[(1-propylcycloheptyl)methyl]-4-(1-naphthyl)-1-indenyl]-zirconium dichloride
Dimethylsilandiylbis[2-[(1-propylcyclopropyl)methyl]-4-(1-naphthyl)-1-indenyl]-zirconium dichloride
Dimethylsilandiylbis[2-[(1-propylcyclooctyl)methyl]-4-(1-naphthyl)-1-indenyl]-zirconium dichloride
Dimethylsilandiylbis[2-[(1-propylcyclobutyl)methyl]-4-(1-naphthyl)-1-indenyl]-zirconium dichloride
Dimethylsilandiylbis[2-[(1-propylcyclopropyl)methyl]-4-(1-naphthyl)-1-indenyl]-zirconium dichloride
Dimethylsilandiylbis[2-[(1-methylcyclohexy)methyl]-4-phenyl-1-indenyl]-zirconium dichloride
Dimethylsilandiylbis[2-[(1-methylcyclopentyl)methyl]-4-phenyl-1-indenyl]-zirconium dichloride
Dimethylsilandiylbis[2-[(1-methylcycloheptyl)methyl]-4-phenyl-1-indenyl]-zirconium dichloride
Dimethylsilandiylbis[2-[(1-methylcyclononyl)methyl]-4-phenyl-1-indenyl]-zirconium dichloride
Dimethylsilandiylbis[2-[(1-methylcyclooctyl)methyl]-4-phenyl-1-indenyl]-zirconium dichloride
Dimethylsilandiylbis[2-[(1-ethylcyclohexyl)methyl]-4-phenyl-1-indenyl]-zirconium dichloride
Dimethylsilandiylbis[2-[(1-ethylcyclopentyl)methyl]-4-phenyl-1-indenyl]-zirconium dichloride
Dimethylsilandiylbis[2-[(1-ethylcycloheptyl)methyl]-4-phenyl-1-indenyl]-zirconium dichloride
Dimethylsilandiylbis[2-[(1-ethylcyclononyl)methyl]-4-phenyl-1-indenyl]-zirconium dichloride
Dimethylsilandiylbis[2-[(1-ethylcyclononyl)methyl]-4-phenyl-1-indenyl]-zirconium dichloride
Dimethylsilandiylbis[2-[(1-ethylcyclobutyl)methyl]-4-phenyl-1-indenyl]-zirconium dichloride
Dimethylsilandiylbis[2-[(1-propylcyclohexyl)methyl]-4-phenyl-1-indenyl]-zirconium dichloride
Dimethylsilandiylbis[2-[(1-propylcyclopentyl)methyl]-4-phenyl-1-indenyl]-zirconium dichloride
Dimethylsilandiylbis[2-[(1-propylcycloheptyl)methyl]-4-phenyl-1-indenyl]-zirconium dichloride
Dimethylsilandiylbis[2-[(1-propylcyclononyl)methyl]-4-phenyl-1-indenyl]-zirconium dichloride
Dimethylsilandiylbis[2-[(1-propylcycloocty)methyl]-4-phenyl-1-indenyl]-zirconium dichloride
Dimethylsilandiylbis[2-[(1-propylcyclobutyl)methyl]-4-phenyl-1-indenyl]-zirconium dichloride
Dimethylsilandiylbis[2-[(1-propylcyclopropyl)methyl]-4-phenyl-1-indenyl]-zirconium dichloride
Dimethylsilandiylbis[2-[(1-methylcyclohexyl)methyl]-4-(2-naphthyl)-1-indenyl]-zirconium dichloride
Dimethylsilandiylbis[2-[(1-methylcyclopentyl)methyl]-4-(2-naphthyl)-1-indenyl]-zirconium dichloride
Dimethylsilandiylbis[2-[1-methylcycloheptyl)methyl]-4-(2-naphthyl)-1-indenyl]-zirconium dichloride
Dimethylsilandiylbis[2-[(1-methylcyclononyl)methyl]-4-(2-naphthyl)-1-indenyl]-zirconium dichloride
Dimethylsilandiylbis[2-[(1-methylcyclooctyl)methyl]-4-(2-naphthyl)-1-indenyl]-zirconium dichloride
Dimethylsilandiylbis[2-[(1-ethylcyclohexyl)methyl]-4-(2-naphthyl)-1-indenyl]-zirconium dichloride
Dimethylsilandiylbis[2-[(1-ethylcyclopentyl)methyl]-4-(2-naphthyl)-1-indenyl]-zirconium dichloride
Dimethylsilandiylbis[2-[(1-ethylcycloheptyl)methyl]-4-(2-naphthyl)-1-indenyl]-zirconium dichloride
Dimethylsilandiylbis[2-[(1-ethylcyclononyl)methyl]-4-(2-naphthyl)-1-indenyl]-zirconium dichloride
Dimethylsilandiylbis[2-[(1-ethylcyclooctyl)methyl]-4-(2-naphthyl)-1-indenyl]-zirconium dichloride
Dimethylsilandiylbis[2-[(1-ethylcyclobutyl)methyl]-4-(2-naphthyl)-1-indenyl]zirconium dichloride
Dimethylsilandiylbis[2-[(1-propylcyclohexyl)methyl]-4-(2-naphthyl)-1-indenyl]-zirconium dichloride
Dimethylsilandiylbis[2-[(1-propylcyclopentyl)methyl]-4-(2-naphthyl)-1-indenyl]-zirconium dichloride
Dimethylsilandiylbis[2-[(1-propylcycloheptyl)methyl]-4-(2-naphthyl)-1-indenyl]-zirconium dichloride
Dimethylsilandiylbis[2-[(1-propylcyclononyl)methyl]-4-(2-naphthyl)-1-indenyl]-zirconium dichloride
Dimethylsilandiylbis[2-[(1-propylcyclooctyl)methyl]-4-(2-naphthyl)-1-indenyl]-zirconium dichloride
Dimethylsilandiylbis[2-[(1-propylcyclobutyl)methyl]-4-(2-naphthyl)-1-indenyl]-zirconium dichloride
Dimethylsilandiylbis[2-[(1-propylcyclopropyl)methyl]-4-(2-naphthyl)-1-indenyl]-zirconium dichloride
Dimethylsilandiylbis[2-[(1-methylcyclohexyl)methyl]-4-(4-methyl-phenyl)-1-indenyl]-zirconium dichloride
Dimethylsilandiylbis[2-[(1-methylcyclopentyl)methyl]-4-(4-methyl-phenyl)-1-indenyl]-zirconium dichloride
Dimethylsilandiylbis[2-[(1-methylcycloheptyl)methyl]-4-(4-methyl-phenyl)-1-indenyl]-zirconium dichloride
Dimethylsilandiylbis[2-[(1-methylcyclononyl)methyl]-4-(4-methyl-phenyl)-1-indenyl]-zirconium dichloride Dimethylsilandiylbis[2-[(1-methylcyclooctyl)methyl]-4-(4-methyl-phenyl)-1-indenyl]-zirconium dichloride
Dimethylsilandiylbis[2-[(1-ethylcyclohexyl)methyl]-4-(4-methyl-phenyl)-1-indenyl]-zirconium dichloride
Dimethylsilandiylbis[2-[(1-ethylcyclopentyl)methyl]-4-(4-methyl-phenyl)-1-indenyl]-zirconium dichloride
Dimethylsilandiylbis[2-[(1-ethylcycloheptyl)methyl]-4-(4-methyl-phenyl)-1-indenyl]-zirconium dichloride
Dimethylsilandiylbis[2-[(1-ethylcyclononyl)methyl]-4-(4-methyl-phenyl)-1-indenyl]-zirconium dichloride
Dimethylsilandiylbis[2-[(1-ethylcyclooctyl)methyl]-4-(4-methyl-phenyl)-1-indenyl]-zirconium dichloride
Dimethylsilandiylbis[2-[(1-ethylcyclobutyl)methyl]-4-(4-methyl-phenyl)-1-indenyl]-zirconium dichloride
Dimethylsilandiylbis[2-[(1-propylcyclohexyl)methyl]-4-(4-methyl-phenyl)-1-indenyl]-zirconium dichloride
Dimethylsilandiylbis[2-[(1-propylcyclopentyl)methyl]-4-(4-methyl-phenyl)-1-indenyl]-zirconium dichloride
Dimethylsilandiylbis[2-[(1-propylcycloheptyl)methyl]-4-(4-methyl-phenyl)-1-indenyl]-zirconium dichloride
Dimethylsilandiylbis[2-[(1-propylcyclononyl)methyl]-4-(4-methyl-phenyl)-1-indenyl]-zirconium dichloride
Dimethylsilandiylbis[2-[(1-propylcyclooctyl)methyl]-4-(4-methyl-phenyl)-1-indenyl]-zirconium dichloride
Dimethylsilandiylbis[2-[(1-propylcyclobutyl)methyl]-4-(4-methyl-phenyl)-1-indenyl]-zirconium dichloride
Dimethylsilandiylbis[2-[(1-propylcyclopropyl)methyl]-4-(4-methyl-phenyl)-1-indenyl]-zirconium dichloride
Dimethylsilandiylbis[2-[(1-methyl cyclohexyl)methyl]-4-(3,5-dimethyl-phenyl)-1-indenyl]-zirconium dichloride
Dimethylsilandiylbis[2-[(1-methylcyclopentyl)methyl]-4-(3,5-dimethyl-phenyl)-1-indenyl]-zirconium dichloride
Dimethylsilandiylbis[2-[(1-methylcycloheptyl)methyl]-4-(3,5-dimethyl-phenyl)-1-indenyl]-zirconium dichloride
Dimethylsilandiylbis[2-[(1-methylcyclononyl)methyl]-4-(3,5-dimethyl-phenyl)-1-indenyl]-zirconium dichloride
Dimethylsilandiylbis[2-[(1-methylcyclooctyl)methyl]-4-(3,5-dimethyl-phenyl)-1-indenyl]-zirconium dichloride
Dimethylsilandiylbis[2-[(1-ethylcyclohexyl)methyl]-4-(3,5-dimethyl-phenyl)-1-indenyl]-zirconium dichloride
Dimethylsilandiylbis[2-[(1-ethylcyclopentyl)methyl]-4-(3,5-dimethyl-phenyl)-1-indenyl]-zirconium dichloride
Dimethylsilandiylbis[2-[(1-ethylcycloheptyl)methyl]-4-(3,5-dimethyl-phenyl)-1-indenyl]-zirconium dichloride
Dimethylsilandiylbis[2-[(1-ethylcyclononyl)methyl]-4-(3,5-dimethyl-phenyl)-1-indenyl]-zirconium dichloride
Dimethylsilandiylbis[2-[(1-ethylcyclooctyl)methyl]-4-(3,5-dimethyl-phenyl)-1-indenyl]-zirconium dichloride
Dimethylsilandiylbis[2-[(1-ethylcyclobutyl)methyl]-4-(3,5-dimethyl-phenyl)-1-indenyl]-zirconium dichloride
Dimethylsilandiylbis[2-[(1-propylcyclohexyl)methyl]-4-(3,5-dimethyl-phenyl)-1-indenyl]-zirconium dichloride
Dimethylsilandiylbis[2-[(1-propylcyclopentyl)methyl]-4-(3,5-dimethyl-phenyl)-1-indenyl]-zirconium dichloride
Dimethylsilandiylbis[2-[(1-propylcycloheptyl)methyl]-4-(3,5-dimethyl-phenyl)-1-indenyl]-zirconium dichloride
Dimethylsilandiylbis[2-[(1-propylcyclononyl)methyl]-4-(3,5-dimethyl-phenyl)-1-indenyl]-zirconium dichloride
Dimethylsilandiylbis[2-[(1-propylcyclooctyl)methyl]-4-(3,5-dimethyl-phenyl)-1-indenyl]-zirconium dichloride
Dimethylsilandiylbis[2-[(1-propylcyclobutyl)methyl]-4-(3,5-dimethyl-phenyl)-1-indenyl]-zirconium dichloride
Dimethylsilandiylbis[2-[(1-propylcyclopropyl)methyl]-4-(3,5-dimethyl-phenyl)-1-indenyl]-zirconium dichloride
Dimethylsilandiylbis[2-[(1-methylcyclohexyl)methyl]-4-(4-trimethylsilyl-phenyl)-1-indenyl]-zirconium dichloride
Dimethylsilandiylbis[2-[(1-methylcyclopentyl)methyl]-4-(4-trimethylsilyl-phenyl)-1-indenyl]-zirconium dichloride
Dimethylsilandiylbis[2-[(1-methylcycloheptyl)methyl]-4-(4-trimethylsilyl-phenyl)-1-indenyl]-zirconium dichloride
Dimethylsilandiylbis[2-[(1-methylcyclononyl)methyl]-4-(4-trimethylsilyl-phenyl)-1-indenyl]-zirconium dichloride
Dimethylsilandiylbis[2-[(1-methylcyclooctyl)methyl]-4-(4-trimethylsilyl-phenyl)-1-indenyl]-zirconium dichloride
Dimethylsilandiylbis[2-[(1-ethylcyclohexyl)methyl]-4-(4-trimethylsilyl-phenyl)-1-indenyl]-zirconium dichloride
Dimethylsilandiylbis[2-[(1-ethylcyclopentyl)methyl]-4-(4-trimethylsilyl-phenyl)-1-indenyl]-zirconium dichloride
Dimethylsilandiylbis[2-[(1-ethylcycloheptyl)methyl]-4-(4-trimethylsilyl-phenyl)-1-indenyl]-zirconium dichloride
Dimethylsilandiylbis[2-[(1-ethylcyclononyl)methyl]-4-(4-trimethylsilyl-phenyl)-1-indenyl]-zirconium dichloride
Dimethylsilandiylbis[2-[(1-ethylcyclooctyl)methyl]-4-(4-trimethylsilyl-phenyl)-1-indenyl]-zirconium dichloride
Dimethylsilandiylbis[2-[(1-ethylcyclobutyl)methyl]-4-(4-trimethylsilyl-phenyl)-1-indenyl]-zirconium dichloride
Dimethylsilandiylbis[2-[(1-propylcyclohexyl)methyl]-4-(4-trimethylsilyl-phenyl)-1-indenyl]-zirconium dichloride
Dimethylsilandiylbis[2-[(1-propylcyclopentyl)methyl]-4-(4-trimethylsilyl-phenyl)-1-indenyl]-zirconium dichloride
Dimethylsilandiylbis[2-[(1-propylcycloheptyl)methyl]-4-(4-trimethylsilyl-phenyl)-1-indenyl]-zirconium dichloride
Dimethylsilandiylbis[2-[(1-propylcyclononyl)methyl]-4-(4-trimethylsilyl-phenyl)-1-indenyl]-zirconium dichloride
Dimethylsilandiylbis[2-[(1-propyl-cyclooctyl)methyl]-4-(4-trimethylsilyl-phenyl)-1-indenyl]-zirconium dichloride
Dimethylsilandiylbis[2-[(1-propylcyclobutyl)methyl]-4-(4-trimethylsilyl-phenyl)-1-indenyl]-zirconium dichloride
Dimethylsilandiylbis[2-[(1-propylcyclopropyl)methyl]-4-(4-trimethylsilyl-phenyl)-1-indenyl]-zirconium dichloride
Dimethylsilandiylbis[2-[(1-methylcyclohexyl)methyl]-4-(4-ethyl-phenyl)-1-indenyl]-zirconium dichloride
Dimethylsilandiylbis[2-[(1-methylcyclopentyl)methyl]-4-(4-ethyl-phenyl)-1-indenyl]-zirconium dichloride
Dimethylsilandiylbis[2-[(1-methylcycloheptyl)methyl]-4-(4-ethyl-phenyl)-1-indenyl]-zirconium dichloride
Dimethylsilandiylbis[2-[(1-methylcyclononyl)methyl]-4-(4-ethyl-phenyl)-1-indenyl]-zirconium dichloride
Dimethylsilandiylbis[2-[(1-methylcyclooctyl)methyl]-4-(4-ethyl-phenyl)-1-indenyl]-zirconium dichloride
Dimethylsilandiylbis[2-[(1-ethylcyclohexyl)methyl]-4-(4-ethyl-phenyl)-1-indenyl]-zirconium dichloride
Dimethylsilandiylbis[2-[(1-ethylcyclopentyl)methyl]-4-(4-ethyl-phenyl)-1-indenyl]-zirconium dichloride Dimethylsilandiylbis[2-[(1-ethylcycloheptyl)methyl]-4-(4-ethyl-phenyl)-1-indenyl]-zirconium dichloride
Dimethylsilandiylbis[2-[(1-ethylcyclononyl)methyl]-4-(4-ethyl-phenyl)-1-indenyl]-zirconium dichloride
Dimethylsilandiylbis[2-[(1-ethylcyclooctyl)methyl]-4-(4-ethyl-phenyl)-1-indenyl]-zirconium dichloride
Dimethylsilandiylbis[2-[(1-ethylcyclobutyl)methyl]-4-(4-ethyl-phenyl)-1-indenyl]-zirconium dichloride
Dimethylsilandiylbis[2-[(1-propylcyclohexyl)methyl]-4-(4-ethyl-phenyl)-1-indenyl]-zirconium dichloride
Dimethylsilandiylbis[2-[(1-propylcyclopentyl)methyl]-4-(4-ethyl-phenyl)-1-indenyl]-zirconium dichloride
Dimethylsilandiylbis[2-[(1-propylcycloheptyl)methyl]-4-(4-ethyl-phenyl)-1-indenyl]-zirconium dichloride
Dimethylsilandiylbis[2-[(1-propylcyclononyl)methyl]-4-(4-ethyl-phenyl)-1-indenyl]-zirconium dichloride
Dimethylsilandiylbis[2-[(1-propylcyclooctyl)methyl]-4-(4-ethyl-phenyl)-1-indenyl]-zirconium dichloride
Dimethylsilandiylbis[2-[(1-propylcyclobutyl)methyl]-4-(4-ethyl-phenyl)-1-indenyl]-zirconium dichloride
Dimethylsilandiylbis[2-[(1-propylcyclopropyl)methyl]-4-(4-ethyl-phenyl)-1-indenyl]-zirconium dichloride
Dimethylsilandiylbis[2-[(5-methyl-1,3-dioxan-5-yl)methyl]-4-(tert-butylphenyl)-1-indenyl]-zirconium dichloride
Dimethylsilandiylbis[2-[(5-ethyl-1,3-dioxan-5-yl)methyl]-4-(tert-butylphenyl)-1-indenyl]-zirconium dichloride
Dimethylsilandiylbis[2-[(2,2,5-trimethyl-1,3-dioxan-5-yl)methyl]-4-(tert-butylphenyl)-1-indenyl]-zirconium dichloride
Dimethylsilandiylbis[2-[(2,2,-dimethyl-5-ethyl-1,3-dioxan-5-yl)methyl]-4-(tert-butylphenyl)-1-indenyl]-zirconium dichloride
Dimethylsilandiylbis[2-[(3-methyl-oxetan-3-yl)methyl]-4-(tert-butylphenyl)-1-indenyl]-zirconium dichloride
Dimethylsilandiylbis[2-[(3-ethyl-oxetan-3-yl)methyl]-4-(tert-butylphenyl)-1-indenyl]-zirconium dichloride
Dimethylsilandiylbis[2-[(1-methylcyclohex-3-en-1-yl)methyl]-4-(tert-butylphenyl)-1-indenyl]-zirconium dichloride and
Dimethylsilandiylbis[2-[(1-ethylcyclohex-3-en-1-yl)methyl]-4-(tert-butylphenyl)-1-indenyl]-zirconium dichloride, as well as the analogous zirconiumdimethyl-compounds and zirconium-biphenolates and zirconium-bisphenolates of each of the above.

53. A process for olefin polymerisation comprising contacting one or more olefins each having from 2 to about 20 carbon atoms under olefin polymerisation reaction conditions with a catalyst system including a bridged metallocene component according to claim 44.

54. The process of claim 53 wherein the olefins include propylene and/or ethylene.

55. The process of claim 53 wherein the olefins include at least one olefin having the formula $R'''{-}CH{=}CH{-}R''$ wherein $R'''$ and $R''$ are identical or different and are each individually a hydrogen atom or a radical having from 1 to about 20 carbon atoms, and $R'''$ and $R''$ together optionally form one or more rings.

56. The process of claim 53 wherein the olefins include one or more compounds selected from the group consisting of ethylene, propylene, 1-butene, 1-pentene, 1-hexene, 4-methyl-1-pentene or 1-octene, styrene, 1,3-butadiene, 1,4-hexadiene, vinylnorbornene, norbornadiene, ethylnorbornadiene, norbornene, tetracyclododecene and methylnorbornene.

57. A process for olefin polymerisation comprising contacting one or more olefins each having from 2 to about 20 carbon atoms under olefin polymerisation reaction conditions with a catalyst system including a bridged metallocene component according to claim 52.

58. The process of claim 57 wherein the olefins include propylene and/or ethylene.

59. The process of claim 57 wherein the olefins include at least one olefin having the formula $R'''{-}CH{=}CH{-}R''$ wherein $R'''$ and $R''$ are identical or different and are each individually a hydrogen atom or a radical having from 1 to about 20 carbon atoms, or $R'''$ and $R''$ together optionally form one or more rings.

60. The process of claim 57 wherein the olefins include one or more compounds selected from the group consisting of ethylene, propylene, 1-butene, 1-pentene, 1-hexene, 4-methyl-1-pentene or 1-octene, styrene, 1,3-butadiene, 1,4-hexadiene, vinylnorbornene, norbornadiene, ethylnorbornadiene, norbornene, tetracyclododecene and methylnorbornene.

* * * * *